INVENTORS
RALPH B. BROWN
RALPH H. BETER
JAMES L. MADDOX
BY [signature]
ATTORNEY

BINARY COMPUTER CIRCUIT

INVENTORS
RALPH B. BROWN
RALPH H. BETER
JAMES L. MADDOX
BY Allen V. Hazeltine
ATTORNEY Dec. 13, 1960 R. B. BROWN ET AL 2,964,242

BINARY COMPUTER CIRCUIT

Filed Oct. 31, 1955 11 Sheets-Sheet 3

INVENTORS
RALPH B. BROWN
RALPH H. BETER
JAMES L. MADDOX

BY [signature]
ATTORNEY

Dec. 13, 1960 R. B. BROWN ET AL 2,964,242

BINARY COMPUTER CIRCUIT

Filed Oct. 31, 1955 11 Sheets-Sheet 4

INVENTORS
RALPH B. BROWN
RALPH H. BETER
JAMES L. MADDOX

BY [signature]
ATTORNEY

INVENTORS
RALPH B. BROWN
RALPH H. BETER
JAMES L. MADDOX

BY Allen V. Hazeltine
ATTORNEY

Dec. 13, 1960 R. B. BROWN ET AL 2,964,242

BINARY COMPUTER CIRCUIT

Filed Oct. 31, 1955 11 Sheets-Sheet 6

INVENTORS
RALPH B. BROWN
RALPH H. BETER
JAMES L. MADDOX

BY [signature]
ATTORNEY

Dec. 13, 1960 R. B. BROWN ET AL 2,964,242

BINARY COMPUTER CIRCUIT

Filed Oct. 31, 1955 11 Sheets-Sheet 7

INVENTORS
RALPH B. BROWN
RALPH H. BETER
JAMES L. MADDOX
BY Dean V. Hazeltine
ATTORNEY Dec. 13, 1960 R. B. BROWN ET AL 2,964,242

BINARY COMPUTER CIRCUIT

Filed Oct. 31, 1955 11 Sheets-Sheet 8

INVENTORS
RALPH B. BROWN
RALPH H. BETER
JAMES L. MADDOX

BY [signature]
ATTORNEY

Dec. 13, 1960 R. B. BROWN ET AL 2,964,242

BINARY COMPUTER CIRCUIT

Filed Oct. 31, 1955 11 Sheets-Sheet 9

INVENTORS
RALPH B. BROWN
RALPH H. BETER
JAMES L. MADDOX
BY [signature]
ATTORNEY

INVENTORS
RALPH B. BROWN
RALPH H. BETER
JAMES L. MADDOX
BY Deane V. Hazarine [signature]
ATTORNEY Dec. 13, 1960 R. B. BROWN ET AL 2,964,242

BINARY COMPUTER CIRCUIT

Filed Oct. 31, 1955 11 Sheets-Sheet 11

INVENTORS
RALPH H. BROWN
RALPH B. BETER
JAMES L. MADDOX

BY [signature]

ATTORNEY

United States Patent Office 2,964,242

Patented Dec. 13, 1960

2,964,242

BINARY COMPUTER CIRCUIT

Ralph B. Brown, Ralph H. Beter, and James L. Maddox, Philadelphia, Pa., assignors to Philco Corporation, Philadelphia, Pa., a corporation of Pennsylvania Filed Oct. 31, 1955, Ser. No. 543,841

13 Claims. (Cl. 235—158)

The present invention relates to digital computer circuits and more particularly to an improved arithmetic section of a general purpose binary computer.

A general purpose digital computer conventionally has only one arithmetic section. The prominent feature of a general purpose computer as herein referred to is that the arithmetic section is time-shared: that is, most or all of the arithmetic or logical manipulations in the computer are performed in time sequence in an arithmetic section that is functionally distinguishable from the rest of the computer.

The binary computer and its arithmetic section to be described herein are designed to operate on binary numbers only. These binary numbers, to be processed properly by the described arithmetic section, must be normalized to one: that is, the binary point shall be understood to be located between the first and second binary digits from the left. Negative numbers should be expressed in the form of complements.

Many of the features to be described are applicable in computers that use a binary code to express numbers to a different base, such as decimal numbers. They are applicable also to computers that utilize other representations of negative quantities, or that imply other locations of the ordinal points.

The function of the arithmetic section of a general purpose computer is to perform a sequence of arithmetic or logical operations on the data contained elsewhere in the computer. The operations may be addition, subtraction, etc. The instruction to perform one of these functions is usually communicated by the energization of a conductor or bus associated with suitable switching circuits which will cause the arithmetic section to follow automatically a preselected subroutine which, in turn, will result in the performance of the desired operation. For example, energization of the multiplication program lead or leads causes the arithmetic section to follow a sub-routine involving a series of sensing, adding and shifting steps. Since many of the functions such as multiplication, division, etc. require many steps in the sub-routine, and since other functions, such as shifting, require a varying number of steps, it is necessary to provide some means for keeping track of the number of steps that have been performed.

Therefore one object of the present invention is to provide a novel step-counter circuit which, in conjunction with other circuits of the arithmetic section simplifies certain of the functions, for example division, normally performed by computers and which permits the present computer circuits to perform a function not usually provided by other known forms of computers, i.e. to extract the square root of a number directly.

Computers now in existence can be programmed to extract the square root of a number by resorting to an approximation formula made up of a programmed sequence of iteration steps which reach the final root by a series of approximations. Finding a root in this manner may require, among other operations, a large number of multiplication steps. In a twenty digit computer each of these multiplication steps may involve a sub-routine of twenty steps. Obviously such methods of finding roots is time consuming and uneconomical in high-speed computers. In some computers expensive memory storage space is allotted to storing constants in order to minimize the number of square root operations required in solving certain problems.

We have discovered a novel method of taking the square root of a binary number in approximately the same number of steps as are required to perform one multiplication or division step. This method reduces the root-extraction time by a factor of ten or more. Moreover the root is accurate to the same number of significant digits as the numbers supplied to the computer. In addition to our discovery of the novel method of extracting the root of a binary number, we have discovered a new and straightforward circuit for implementing this method. Subsequent to our discovery our novel method was independently discovered and later described in an article in Electronic Engineering, July 1955, by E. H. Lenaerts. However, this article does not describe any practical circuit for executing the method automatically.

Therefore it is a further object of the present invention to provide a novel means for and a method of taking the square root of a binary number.

In binary digital computers it is usually convenient to express negative numbers in two's complement form. The fact that the number is negative is indicated by the value assigned to one of the digits, usually the first. For example, in a twenty digit computer the first digit may indicate the sign of the number and the next nineteen digits will indicate the magnitude of the number. The sub-routines followed in the division function, and in multiplication with round-off, may vary depending on whether both numbers are positive or whether one or both are negative.

Therefore it is a further object of this invention to provide novel sign sensing circuits associated with the registers of the arithmetic section which are arranged to store the proper sign digits or to alter the sub-routine where necessary depending on the sign of the numbers to be operated upon.

Still another object of the invention is to provide novel means for rounding off the product obtained during the multiplication function.

In the computer of the present invention all numbers are normalized to a value less than one. Therefore it is a further object of the present invention to provide novel overflow sensing circuits for interrupting the operation of the computer if the capacity of the accumulator has been or will be exceeded.

Still another object of the present invention is to provide novel means for shortening the time required to perform a sub-routine step if the novel sensing circuits of the present invention indicate that no carry or borrow ripple will be present.

These and other objects of the present invention are achieved by employing as a step counter a double rank shifting register with means for inserting a "one" at selected points in the master rank of this register. Furthermore, single rank input and output registers and a double rank accumulator register are provided. An adder-subtracter circuit is permanently connected to the input register and also to the slave rank of the accumulator register.

The novel double rank step counter employed in the present invention has the added advantage that the "one" digit progresses down the slave rank register at the same rate that the root is developed in the output register during the square root process. Therefore the root is developed by the simple expedient of transferring "ones"

from the step counter to the output register through appropriate gating circuits. The novel step counter employed in the present invention also permits the trial divisor to be developed by transferring the partially developed root in the output register and the "one" in the step counter to the input register through appropriate gates provided for the purpose. Since no modifications are required in the step counter, the output register and the input register in order to perform the square root function, the ability of the computer to perform other functions such as multiplication, addition, etc. is not impaired. In terms of circuit differences, the present invention provides the following components not generally found in computers of this general class:

(*a*) A double rank shifting register which functions as a step counter
(*b*) Gating circuits between the step counter and the output register, and
(*c*) Gating circuits which connect the step counter and the output register to the input register The present invention also employs auxiliary sign registers or bi-stable circuits associated with both ranks of the accumulator register and with the output register. Appropriate gate circuits connect these auxiliary sign bi-stable circuits in the main registers. The control of the cycle time is provided by placing an extra delay multivibrator in the multivibrator timing chain and then providing means for bypassing this extra delay multivibrator if it is sensed that no carry or borrow ripple can occur.

For a better understanding of the present invention together with other and further objects thereof, reference should now be made to the following detailed description which is to be read in conjunction with the accompanying drawings in which:

Figs. 1A, 1B and 1C together form a complete logic diagram of the novel arithmetic section of a computer in accordance with the present invention;

Figure 1A:
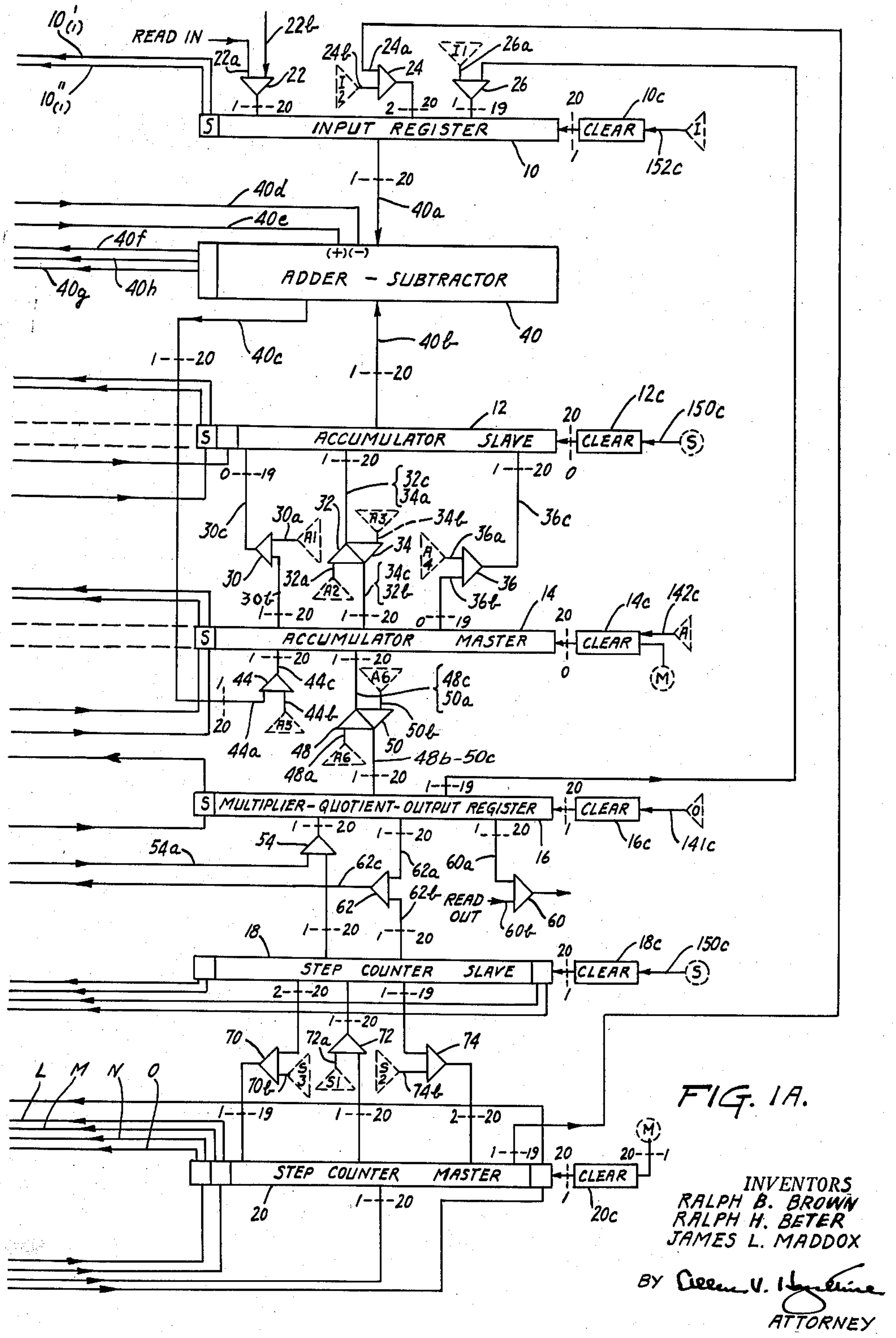
Figure 1B:
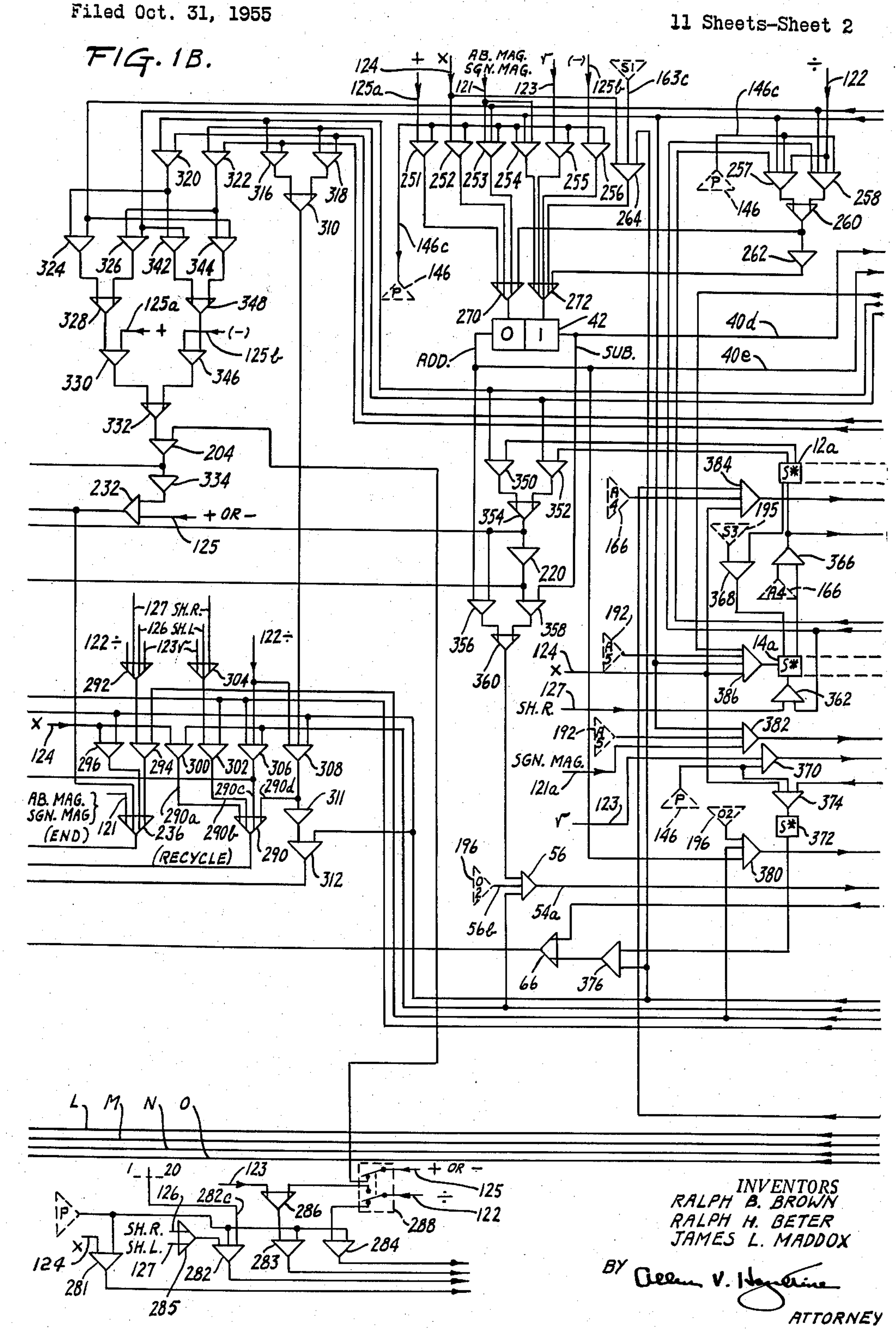
Figures 6, 7, 8:
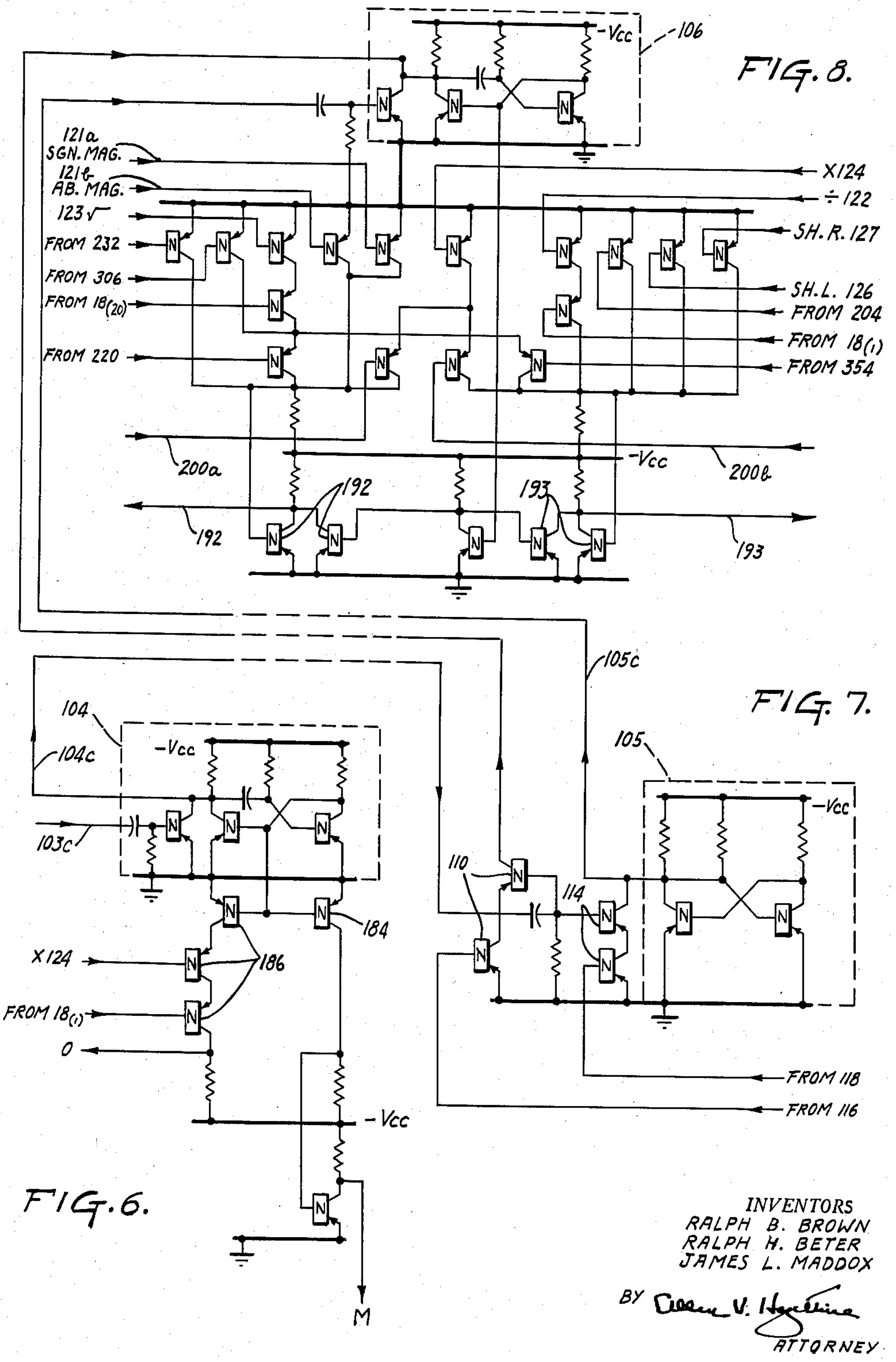
Figure 9:
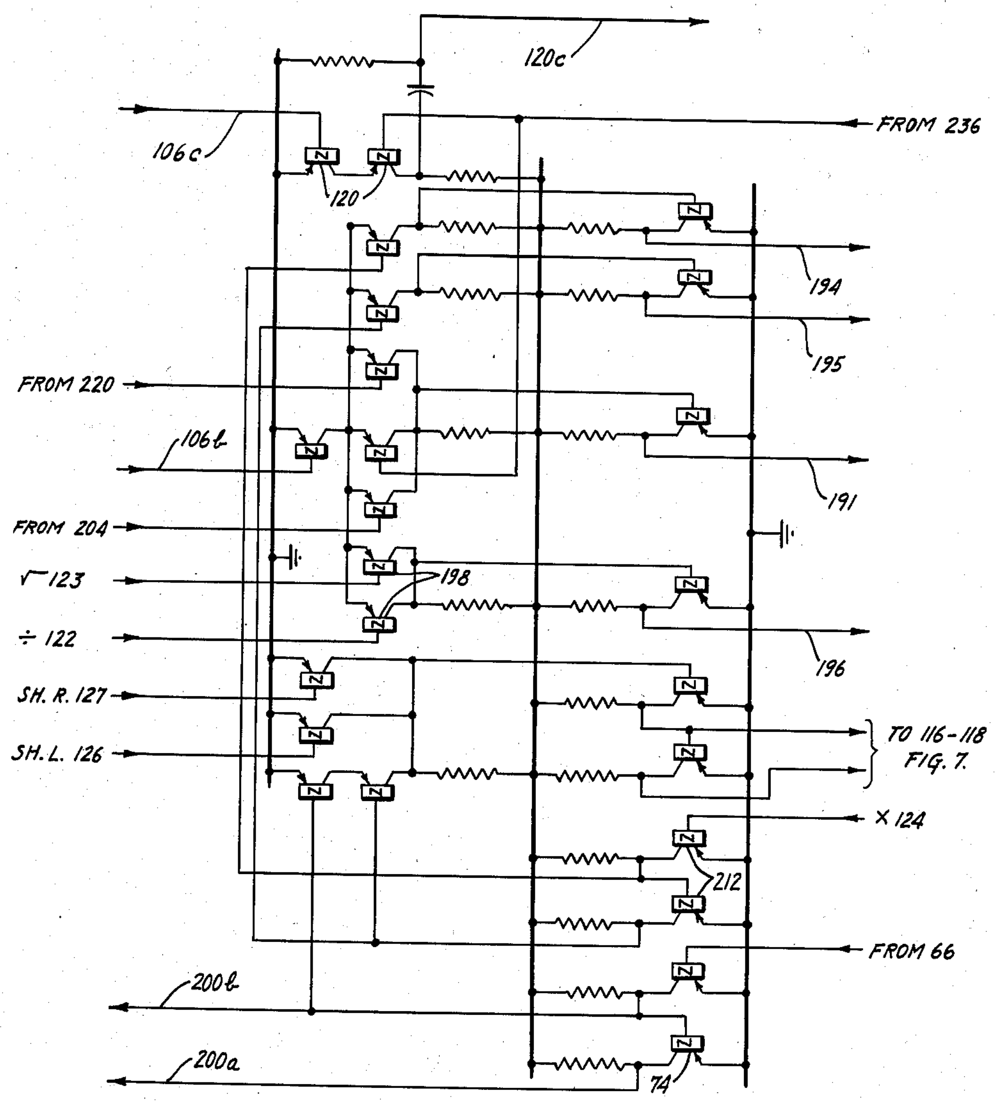
Figure 10:
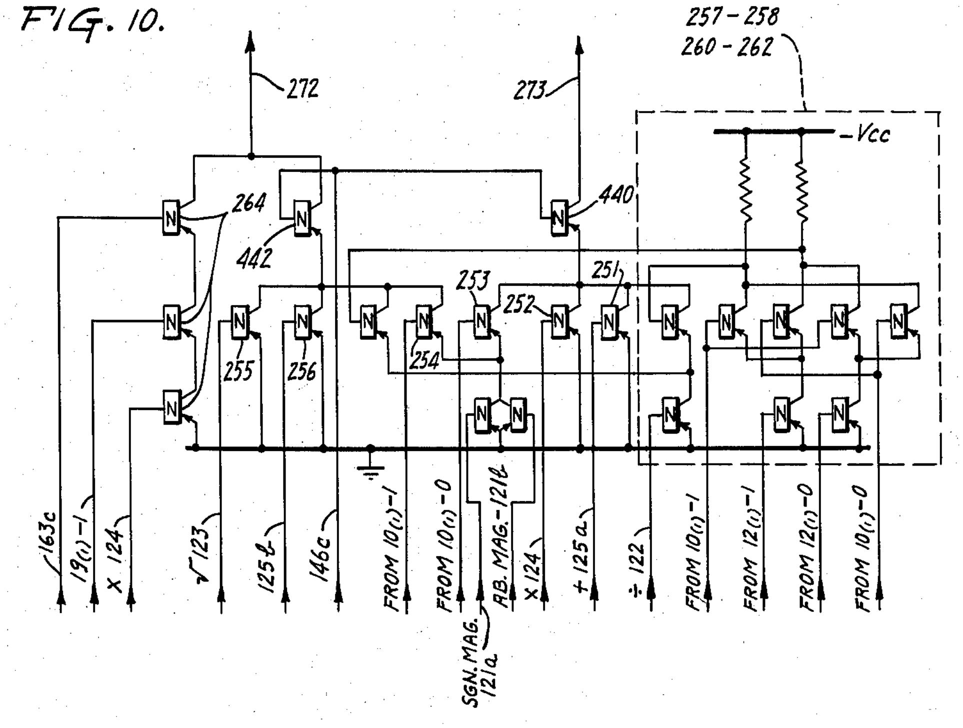
Figure 11:
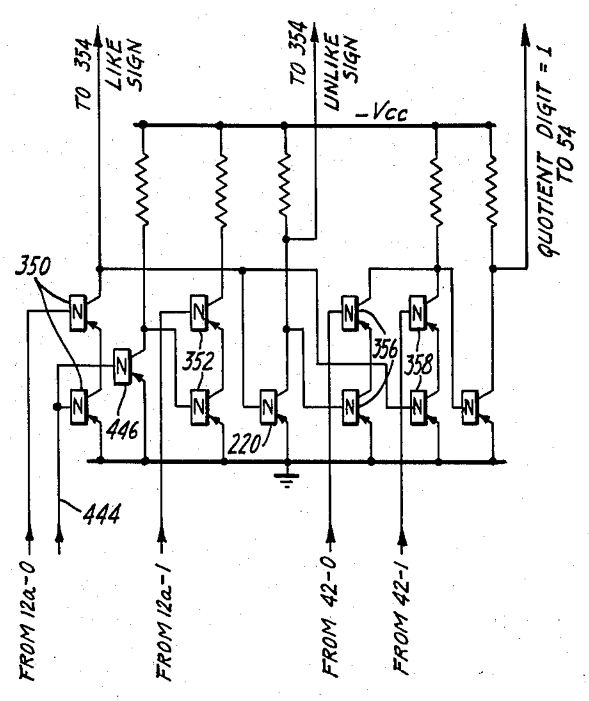
Figure 13:
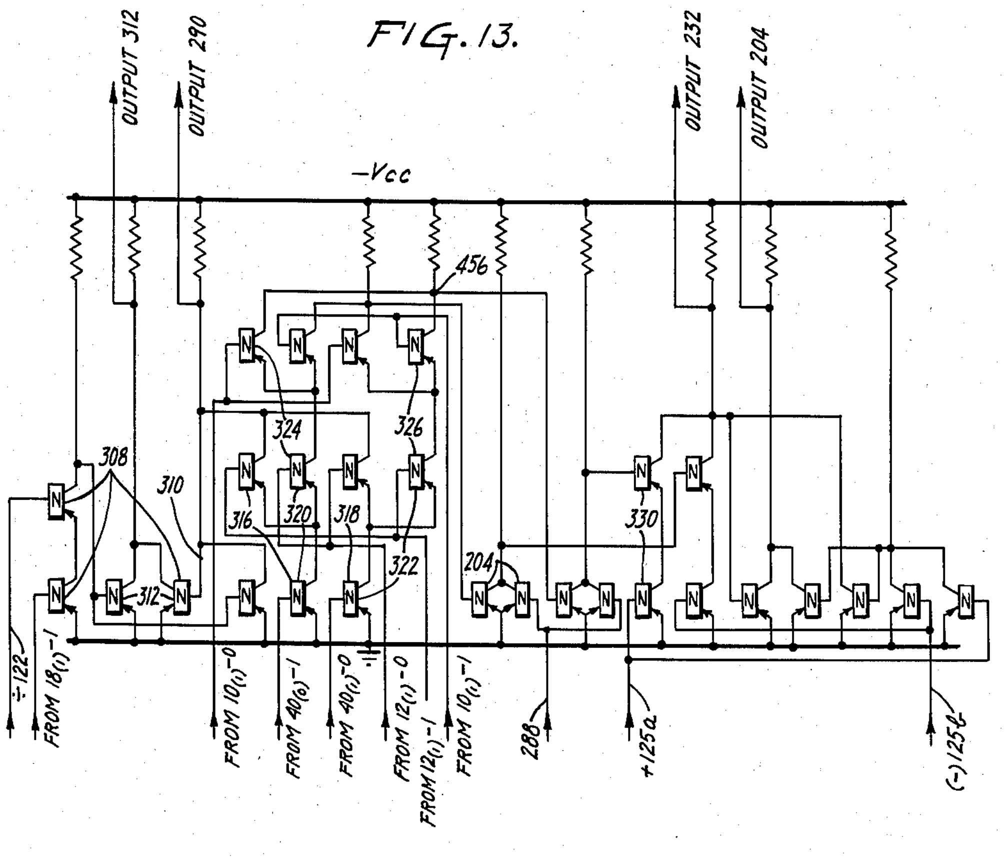
Figure 12:
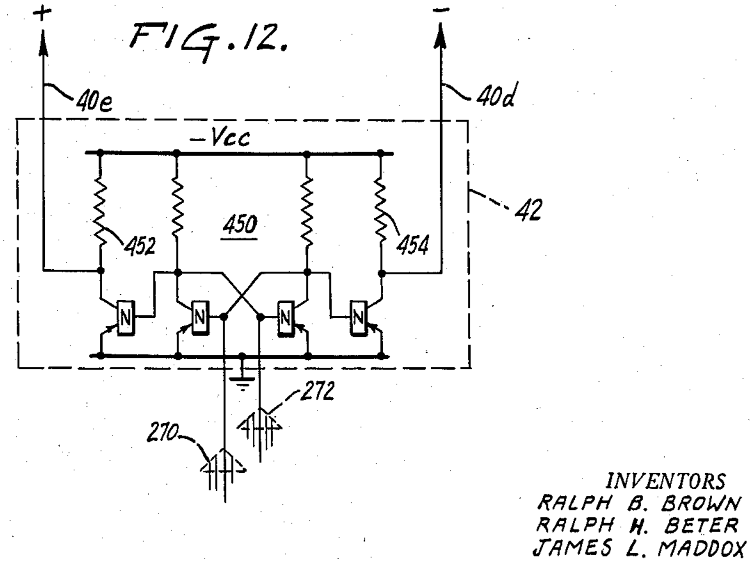
Figures 14, 15:
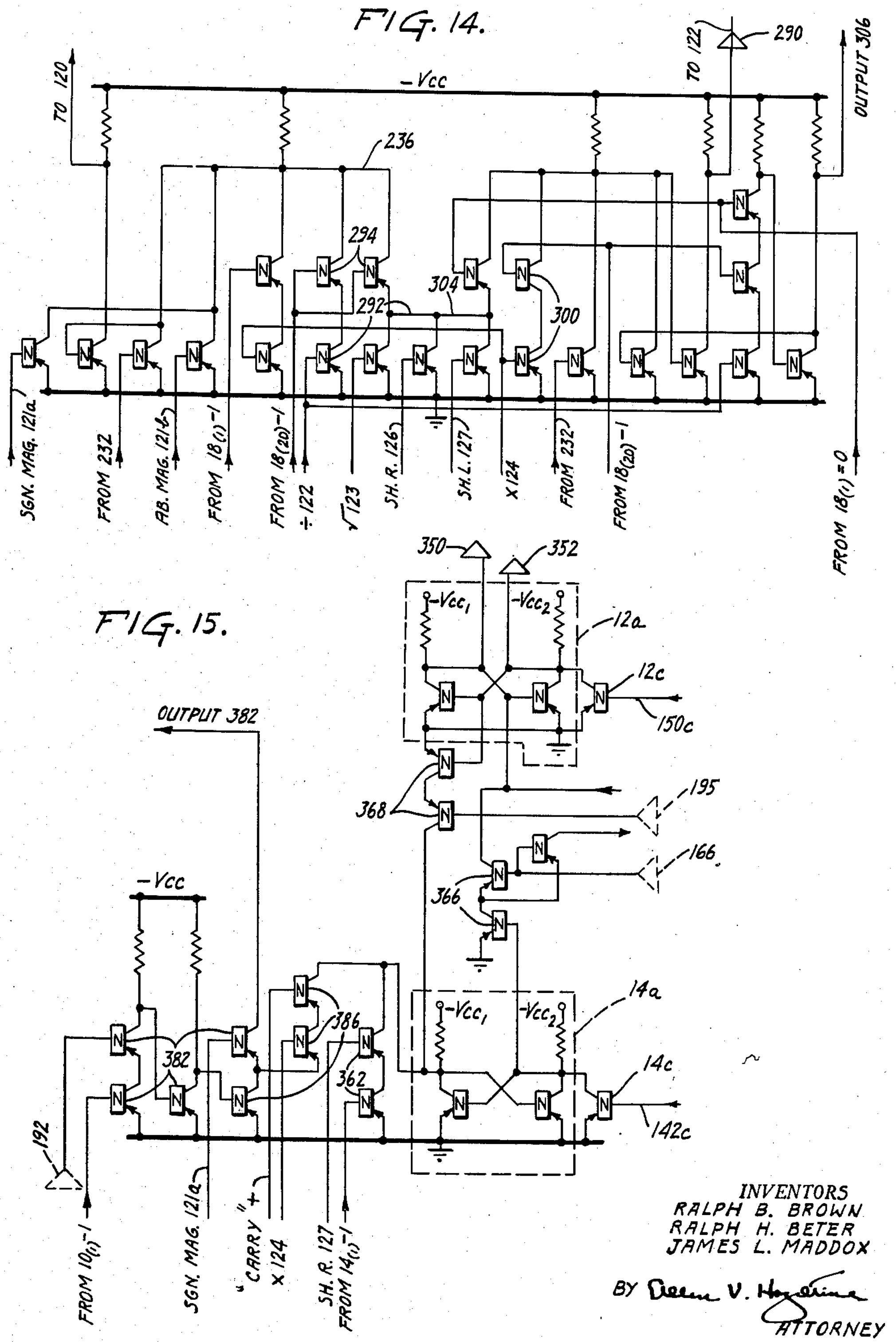
Figure 16:
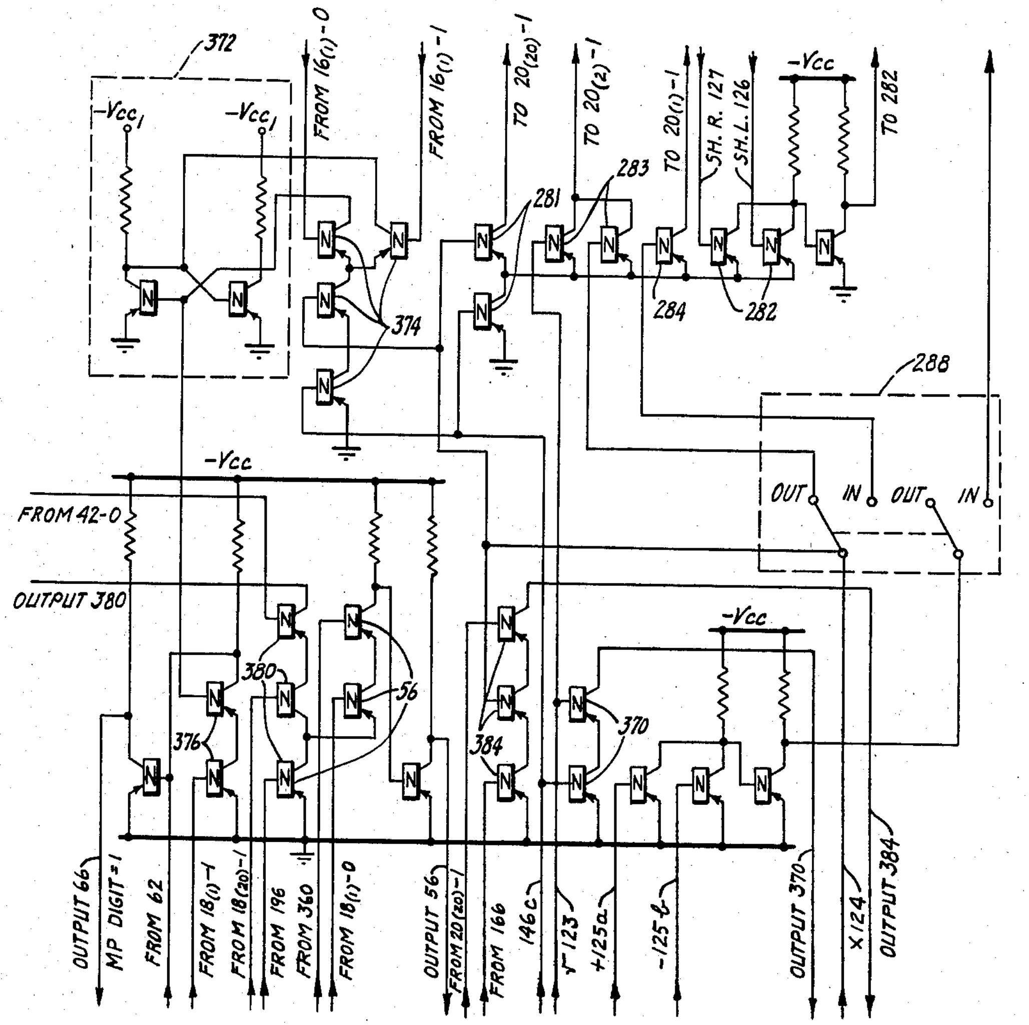

Figs. 4, 5, 6 and 7 are circuit diagrams of multivibrators 102, 103, 104 and 105 and the gate circuits associated therewith;

Fig. 8 is a circuit diagram of multivibrator 106 and a portion of the gate circuits associated therewith;

Fig. 9 is a circuit diagram of additional gate circuits associated with multivibrator 106;

Fig. 10 is a circuit diagram of the portion of the circuit which controls bi-stable circuit 42 of Fig. 1B;

Fig. 11 is a circuit diagram of the sign sensing circuit located just below bi-stable circuit 42 of Fig. 1B;

Fig. 12 is a circuit diagram of bi-stable circuit 42;

Fig. 13 is a circuit diagram of the overflow sensing circuit appearing in the upper left hand corner of Fig. 1B;

Fig. 14 is a circuit diagram of the end of operation-recycle control circuits located in the left center of Fig. 1B;

Fig. 15 is a circuit diagram of the novel auxiliary sign sensing circuits employed in the present inventions; and Fig. 16 is a detailed circuit diagram of the portion of the circuit appearing in the lower left hand corner of Fig. 1B.

Figure 1C:
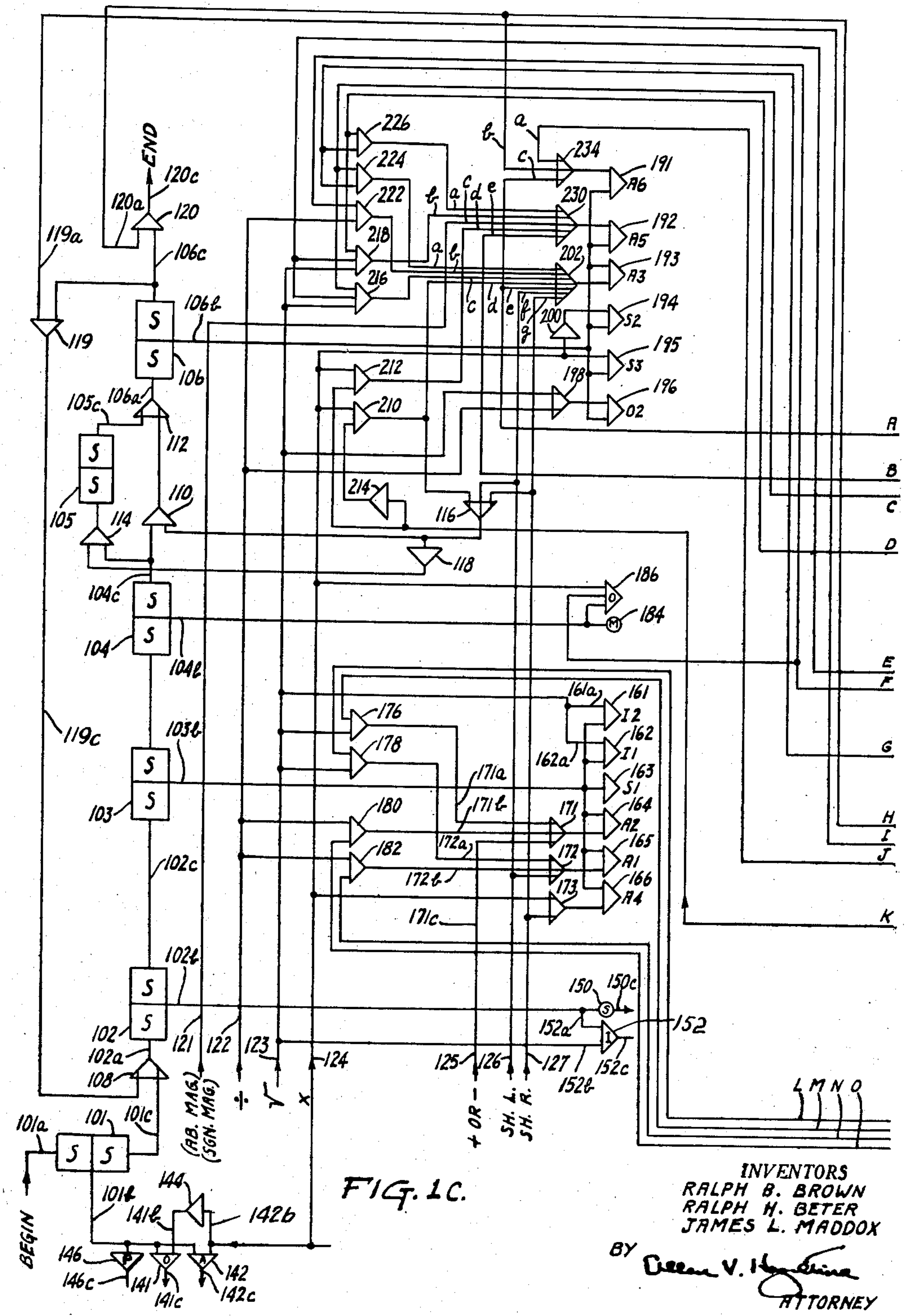

The logic diagram of Figs. 1A, 1B and 1C is essentially a block diagram of the arithmetic section of a computer in accordance with the present invention. It is possible to substitute known forms of gate circuits or registers for the blocks in the logic diagram. However, in actually constructing a circuit some economy of parts may be realized by combining one or more of the gate circuits to perform the functions of all the combined gates. Also, in the logic diagram it is assumed that the "no signal" condition exists when the output conductor is at or near "zero" or ground potential. In actually constructing the circuit it is sometimes more convenient to provide a "no signal" condition in which the output conductor is normally at a high potential but drops to near "zero" potential to indicate the presence of certain information. For these reasons the preferred form of circuity does not always correspond exactly to the blocks of the logic diagram. However, the differences are slight and are easily understood by those familiar with basic electronic circuits such as "and" gates, "or" gates or the like. And "and" gate is a form of coincidence circuit having two or more input leads, all of which must be energized at the same time in order to produce an output signal. An "or" gate is a form of combining circuit having two or more input leads, the circuit being so arranged that energization of any one or more than one input lead will produce an output signal. "Or" gates may comprise simple networks of passive circuit elements or they may include active elements such as vacuum tubes or transistors to provide greater isolation between the several input leads. In general, the circuits of the present invention operate with D.C. signals rather than pulse signals or A.C. signals. This fact should be kept in mind in considering the operation of the several inverter circuits shown in the drawings. Each of these inverters is assumed to provide an output signal in the absence of an input signal and to provide no output signal in the presence of an input signal. It should be noted that this assumption is consistent with the "signal" and "no signal" conditions assumed above. The buffer circuits shown in the drawings differ from the inverters in the respect that they provide an output signal if and only if an input signal is supplied. It may be convenient to consider the inverters as single stage amplifiers and the buffers as two-stage amplifiers although they do not always appear in this form in the circuit diagram. The preferred form of the present invention illustrated in the drawings employs parallel, direct coupled, asynchronous logic with a synchronous type of sub-routine. In the preferred embodiment of the invention, transfer of data is by transfer of "ones" only, after a preceding clearing step, unless otherwise mentioned. In certain portions of the system which will be mentioned later, transfer of "ones" only is essential to the operation of the circuit. It is only in these specifically mentioned circuits that the invention is to be limited to this form of data transfer. In the description which follows it will be assumed that each register has a capacity of twenty digits unless otherwise noted. It is to be understood, however, that a greater or a smaller number may be employed. In fact the capacity may be reduced to as few as four bits without in any way altering the logic diagram or the mode of operation about to be described. The number four results from the fact that the first, second and last steps of the operations about to be described may differ from each other and from the intermediate steps.

The logic diagram has been divided into three sections, an Arithmetic Section of Fig. 1A, an Arithmetic Control Section of Fig. 1C and a Sensing Section shown in Fig. 1B. Actual arithmetic operations take place in the arithmetic section of Fig. 1A under the control of the circuits of Figs. 1B and 1C. It will be remembered that the entire circuit of the present invention was referred to as the "arithmetic section" of the computer. In the description which follows, the same term has been employed to describe that portion of the entire circuit which performs the actual arithmetic operations. It is believed that no confusion will result from the double use of this term. Turning now to Fig. 1A, the arithmetic section comprises six registers, 10, 12, 14, 16, 18 and 20, each composed of twenty bi-stable elements for registering the twenty binary digits. In the preferred form of the invention the bi-stable elements comprise transistor trigger circuits of the Eccles-Jordan type. Circuits of this type are also known as scale-of-two or lock-over circuits. One stable state is arbitrarily selected to represent the value "zero" and the other stable state is selected to represent the value "one." The side that is not conducting, i.e. the side which is at a high potential when the circuit is set in the stable state representing a "one," is hereinafter referred to as its "one" side of the bi-stable circuit. For convenience it will be assumed that the twenty bi-stable elements of input register 10 are numbered $\mathbf{10}_{(1)}$, $\mathbf{10}_{(2)}$, $\mathbf{10}_{(3)}$, . . . $\mathbf{10}_{(20)}$. The bi-stable circuits of accumulator 12 will also be referred to as bistable circuits $\mathbf{12}_{(1)}$, $\mathbf{12}_{(2)}$, etc.

Register 10 forms the input register of the arithmetic section. Registers 12 and 14 form the slave rank and master rank, respectively, of a double rank accumulator. Register 16 forms the output register and also serves as the multiplier register during multiplication and as the quotient register during division. Regicters 18 and 20 form the slave and master ranks, respectively, of the two rank step counter. Registers 10, 12, 14, 16, 18 and 20 are provided with clearing circuits 10*c*, 12*c*, 14*c*, 18*c* and 20*c* respectively which, when energized, will clear the associated register, that is will set all bi-stable circuits to their "zero" state. Only a single connection from a clearing circuit to the corresponding register is shown but it should be understood that, in the parallel transfer arrangement assumed in Fig. 1, a separate connection is required to each bi-stable circuit in the register.

The input register 10 is provided with three sets of "and" gate circuits 22, 24, and 26 for transferring information into input register 10. Circuit 22 includes twenty individual "and" gates, one for each bi-stable circuit in the register. Circuits 24 and 26 contain only nineteen individual gates since no connection is made by circuit 24 to the leftmost (hereinafter called the first) bi-stable circuit in register 10 and no connection is made by circuit 26 to the rightmost (hereinafter called the last) bi-stable circuit in register 10. The broken lines crossing the connections from gate circuits 22, 24 and 26 and having the numerals at either end schematically indicate these multiple connections. The numerals refer to the identifying subscripts of the bi-stable circuits and are inclusive.

Gate circuit 22 is provided with two inputs 22*a* and 22*b*. Information in binary form from a memory system or input system may be supplied to input 22*b*. This information will be transferred to the input register if a control or "read in" pulse is supplied to input 22*a*.

Gate circuit 24 is provided with two inputs, one from the control section of Fig. 1C to input 24*b* and the other from step counter master ranks 20 to input 24*a*. Input 24*b* may be a single input to all individual gates but input 24*a* comprises a separate connection for each gate in the circuit. The input of the first gate in the circuit, hereinafter designated gate $\mathbf{24}_{(1)}$ is obtained from the bi-stable circuit $\mathbf{20}_{(1)}$ in step counter master rank 20. The output of gate $\mathbf{24}_{(1)}$ is connected to the bi-stable circuit $\mathbf{10}_{(2)}$ in input register 10. Thus digits are transferred from step counter master rank 20 to input register 10 with a one digit right shift. Throughout Fig. 1A, a one digit right shift is represented by pointing the apex of the triangle representing the "and" gate toward the right. A one digit left shift is represented by pointing the apex of the triangle representing the "and" gate toward the left. If an "and" gate is connected to transfer a digit with no shift, the apex points either up or down depending on the direction of transfer.

Gate circuit 26 has one input 26*a* which is common to all gates of this circuit and which is supplied with a control signal by the arithmetic control section of Fig. 1C. A second input of each of the nineteen "and" gates represented by circuit 26 is connected to a corresponding bi-stable circuit in output register 16. When a control signal is supplied to input 26*a* gate circuit 26 will set to the "ones" state all bi-stable circuits in input register 10 which correspond to bi-stable circuits in output register 16 which are in the state representing a "one." In the interest of brevity this and similar operations will hereinafter be referred to as the parallel transfer of "ones" only with no shift, or simply as the transfer of "ones" with no shift, since all transfers within the circuit are parallel transfers. The word "transfer" is used in this specification in the sense of copying from one register to another. When a "one" is transferred from one register to another through gate circuit 26, for example, it is not removed from its original register but remains there until the original register is cleared. Therefore the parallel transfer of all the "one" digits from output register 16 to input register 10 does not clear output register 16, it merely copies into input register 10 the "ones" digits which were present in output register 16.

The double rank accumulator register is made up of the accumulator slave rank 12, the accumulator master rank 14 and "and" gate circuits 30, 32, 34 and 36. The master rank 14 and slave rank 12 of the accumulator each have 21 bi-stable circuits instead of the 20 found in the other registers. The extra bi-stable circuits are shown at 14*a* and 12*a* in Fig. 1B. In designating the connections to the "and" gate circuits 30, 32, 34 and 36, the extra bi-stable circuits are referenced by the subscript "zero." The extra bi-stable circuits 12*a* and 14*a* in the accumulator are not used in computation; rather they form a part of the sensing circuits of Fig. 1B which, together with the circuits of Fig. 1C, control the operation of the gates in the circuit of Fig. 1A. As shown in Fig. 1A, "and" gate circuit 30 connects the bi-stable circuits of master rank 14 to slave rank 12 with a one digit left shift. It should be noted that gate $\mathbf{30}_{(1)}$ connects bi-stable circuit $\mathbf{14}_{(1)}$ to bi-stable circuit 12*a*. Input 30*a* is supplied with a control signal from the circuit of Fig. 1C. Input 30*b* comprises twenty individual leads which are connected to bi-stable circuits $\mathbf{14}_{(1)}$ to $\mathbf{14}_{(20)}$, respectively. The twenty individual leads comprising input 36*b* of "and" gate circuit 36 are connected to bi-stable circuits 14*a* and $\mathbf{14}_{(1)}$ to $\mathbf{14}_{(19)}$, respectively. Input 36*a* is supplied with a control or "transfer" signal from the circuits of Fig. 1C. The output connection 36*c* of gate circuit 36 again comprises 20 individual leads which are connected to bi-stable circuits $\mathbf{12}_{(1)}$ to $\mathbf{12}_{(20)}$, respectively. Thus gate circuit 36 provides for transfer of "ones" digits from master rank 14 to slave rank 12 with a one digit right shift.

"And" gate circuits 32 and 34 together form a two-way gate for the transfer of "ones" digits between accumulator slave rank 12 and accumulator master rank 14 with no shift. The connection from these two gate circuits to slave rank 12 is given the double number 32*c*—34*a* since it serves as one input to "and" gate cuit 34 and as the output connection of "and" gate circuit 32. The connection 32*c*—34*a* again includes 20 leads which connect with bi-stable circuits $\mathbf{12}_{(1)}$ to $\mathbf{12}_{(20)}$ individually. Similarly the connection 34*c*—32*b* to master rank 14 serves as an input to "and" gate circuit 32 and as the output for "and" gate circuit 34. Connection 34*c*—32*b* is made to bi-stable circuits $\mathbf{14}_{(1)}$ to $\mathbf{14}_{(20)}$ individually. Inputs 32*a* and 34*b* are supplied with control signals from the circuit of Fig. 1C.

Input register 10 and accumulator slave rank 12 are connected directly to an adder-substractor circuit 40. Again this is a parallel connection from the bi-stable circuits $\mathbf{10}_{(1)}$ through $\mathbf{10}_{(20)}$ and $\mathbf{12}_{(1)}$ through $\mathbf{12}_{(20)}$ to corresponding circuits in adder-subtractor 40.

Figure 2:
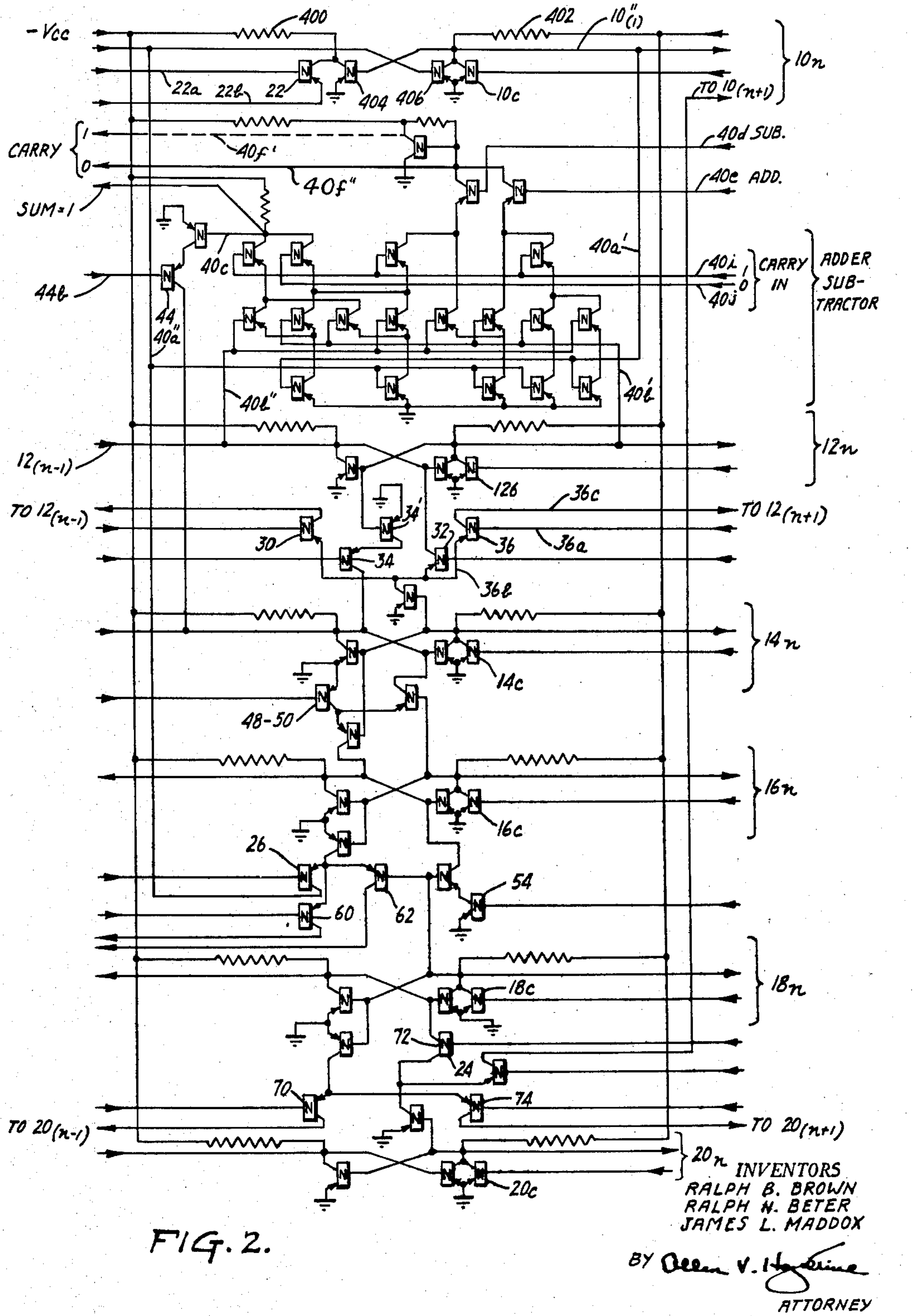
Fig. 2 is a circuit diagram of one digit column of the circuit of Fig. 1A.

One preferred form of adder-subtracter circuit is shown in Fig. 2 but the invention is not to be limited to this circuit since other forms of such circuits are known.

The adder-subtracter circuit 40 may be set to cause either the sum or the difference of the numbers supplied by way of connection 40*a* and 40*b* to appear at connection 40*c*. Again, output 40*c* comprises 20 leads, each representing one digit of a twenty digit number. Adder-subtracter 40 is set to provide the sum or the difference by appropriate signals from ad-subtract bi-stable circuit 42 shown in Fig. 1B. In Fig. 1A, the signals are supplied to inputs 40*d* and 40*e*. It should be noted that there are no gates in input leads 40*a* and 40*b*, so that the output signal of adder-subtracter 40, appearing at 40c, always indicates the sum (or difference) of the numbers present in input register 10 and slave rank 12. It is to be understood, however, that there may be a short period after a number is changed in one or both of the registers 10 or 12 before the correct sum (or difference) is registered at 40c owing to the settling time required by any circuit and particularly to the carry (or borrow) ripple which may be present in an adder-subtracter circuit.

Output 40c is connected to one input 44a of "and" gate circuit 44. The output 44c of "and" gate circuit 44 connects to bi-stable circuits $14_{(1)}$ to $14_{(20)}$, respectively, of accumulator master rank 14. The second input 44b of "and" gate circuit 44 is supplied with a control signal from the circuits of Fig. 1C. "And" gate circuit 44 permits the output of adder-subtracter 40 to be transferred to accumulator master rank 14 with no digit shift upon the application of a transfer signal to input 44b.

Transfer of data between accumulator master rank 14 and output register 16 is accomplished through "and" gate circuits 48 and 50. Again, connection 48c—50a serves as one input to gate circuit 50 and as the output for gate circuit 48. This connection is made to bi-stable circuits $14_{(1)}$ to $14_{(20)}$, respectively, of accumulator master rank 14. Connection 48b—50c to bi-stable circuits $16_{(1)}$ to $16_{(20)}$ of the output register 16 forms the output of gate circuit 50 and one input of gate circuit 48. Inputs 48a and 50b are supplied with control signals from the circuit of Fig. 1C.

Bi-stable circuits $16_{(1)}$ through $16_{(19)}$ are also connected to bi-stable circuits $10_{(1)}$ through $10_{(19)}$, respectively, through gate circuit 26 which has been described above. Bi-stable circuits $18_{(1)}$ to $18_{(20)}$ in the step counter slave rank 18 are connected to the bi-stable circuits $16_{(1)}$ through $16_{(20)}$, respectively, of output register 16 through "and" gate circuit 54. A second input 54a to "and" gate circuit 54 is connected to the output of an "and" gate circuit 56 in the circuit of Fig. 1B. Thus transfer of digits from step counter slave rank 18 to output register 16 is under the control of "and" gate 56.

A "readout" gate circuit 60, having inputs 60a connected to bi-stable circuits $16_{(1)}$ through $16_{(20)}$, respectively, is provided for transferring information from output register 16 to some external circuit such as a memory section or an output indicating device of the computer. Transfer of information by way of gate circuit 60 is controlled by a "read out" signal supplied to input 60b of gate circuit 60.

Bi-stable circuits $16_{(1)}$ through $16_{(20)}$ are connected to input 62a of "and" gate circuit 62. The second input 62b of gate circuit 62 is connected to bi-stable circuits $18_{(1)}$ to $18_{(20)}$ instep counter slave rank 18. The output 62c of "and" gate circuit 62 may be a single lead since the function of this gate circuit is to provide an output signal if any corresponding pair of bi-stable circuits are both registering "ones." It will be shown later that there will never be more than one pair at any one time in which both bi-stable circuits in the pair are registering "ones." The output of gate circuit 62 is connected to one input of "or" gate 66 in the circuit of Fig. 1B.

Step counter slave rank 18 and step counter master rank 20 are connected by three gate circuits 70, 72 and 74. The connection of these gate circuits will not be described in detail since they are similar to the gate circuits connecting the two ranks of the accumulator. Gate circuit 70 provides for transfer of "ones" from slave rank 18 to master rank 20 with a one digit left shift. Gate circuit 74 provides for transfer of "ones" in the same direction but with a one digit right shift. Gate circuit 72 provides for transfer of "ones" from master rank 20 to slave rank 18 with no shift. Control signals for gate circuits 70, 72 and 74 are supplied to inputs 70b, 72a and 74b from the circuits of Fig. 1C. The connection of step counter master rank 20 to input register 10 through gate circuit 24 has already been described.

Step counter slave rank 18, step counter master rank 20 and gate circuits 70, 72 and 74 together form a novel non-coded type of step counter. The function of the step counter is to count or keep track of the number of steps that have been performed in a microprogram or subroutine operation. In previous types of step counters the count normally appeared as a code representing the step currently being performed. In the step counter of the present invention the count is represented by the position of a "one" along step counter master rank 20 and step counter slave rank 18. The use of a single "one" to indicate the count simplifies the selection of the multiplier digits during the multiplication process and, together with other novel connections such as gate circuits 24 and 26, permits the computer to extract the square root of a number. Another advantage of the novel step counter of the present invention is that one bi-stable circuit of each rank of the step counter is associated with a corresponding digit column of the computer. Thus, if it is necessary for some reason to increase the capacity of the registers described above from twenty to say twenty-five digits, the only modification required in the step counter is the addition of five more bi-stable circuits in each rank and five sets of gates connecting these bi-stable circuits. In one form of the invention presently under construction one bi-stable element from each of the registers of Fig. 1A and the corresponding gates from each of the gate circuits are all mounted on a single card. A twenty digit arithmetic section is then assembled by assembling twenty such cards. In this form of construction the changes required in the step counter by a change in the digit capacity of the computer are made automatically by the addition or subtraction of the appropriate number of cards. Although the double rank step counter just described is preferred because of its simplicity, it lies within the scope of the invention to employ the more conventional form of binary coded step counter followed by a decoder network having a plurality of outputs which are energized in succession, one at a time.

The circuits described above comprise the entire data transfer circuits of the arithmetic section. Other connections are made to the elements of Fig. 1A for the purpose of sensing or control. These connections will be described presently.

As mentioned above, the circuit of the present invention employs asynchronous logic with a synchronous type of subprogram. The circuit is caused to perform a given operation such as multiplication in response to a "begin" signal. When it has completed the operation it provides an "end of operation" signal. The operation that the circuit will perform in response to the "begin" signal will depend upon other signals received by the circuit from a programming circuit (not shown). The programming circuit may be simply a set of switches which connect a power supply to selected program leads as corresponding switches are operated one at a time. For example, if one program lead is energized the circuit will perform multiplication. Energization of different program leads will cause the circuit to perform square root, addition, subtraction, etc. The energization of the program leads is usually under the control of a portion of the computer known as "computer control." These circuits are outside the scope of the arithmetic section described herein.

Each operation, whether addition, multiplication, division, etc., is performed by operating the various gates and clearing circuits in a particular sequence or cycle. In some operations, for example division, several substantially identical cycles are employed. In general these cycles are made up of the following four steps:

(a) Clearing the slave ranks and/or input register
(b) Transferring data from the master ranks and/or output register to the slave ranks and/or input register
(c) Clearing the master ranks and/or the output register (*d*) Transferring data from the slave ranks and/or adder-subtracter to the master ranks Fig. 1C shows certain of the program leads and the circuits for controlling the gates of Fig. 1A in the desired sequence to perform an ordered operation. One basic part of the arithmetic control section of Fig. 1C is the timing multivibrator chain comprising single shot multivibrators 101, 102, 103, 104, 105 and 106. The "begin" signal is supplied to input 101*a* of the first multivibrator 101 in the chain. Each of the multivibrators, with the exception of multivibrator 105, is arranged to provide two output signals, one at or just following the time that it is energized and the other at the time it returns to its initial state, this time being controlled by the constants of the multivibrator circuit. Multivibrator 105 provides only the second of these two signals. The first mentioned signals of the several multivibrators appear at output leads 101*b*, 102*b*, 103*b*, 104*b* and 106*b*, respectively. The second mentioned signals appear at outputs 101*c* through 106*c*, respectively. Output 101*c* is connected to input 102*a* of multivibrator 102 through a two input "or" gate 108. The outputs of multivibrators 102 and 103 are connected to the inputs of multivibrators 103 and 104, respectively, so that multivibrators 101 through 104 operate in sequence in response to a "begin" pulse. The output 104*c* of multivibrator 104 is connected through two alternative paths to the input 106*a*. One path is through "and" gate 110 and "or" gate 112 and involves substantially no delay. The second path is by way of "and" gate 114, multivibrator 105 and "or" gate 112. This path has a delay introduced by multivibrator 105. Multivibrator 105 is provided to allow for ripple time in the adder-subtracter circuit 40. Under certain conditions is is known that no ripple will take place. Therefore, when these conditions exist, the cycle time may be shortened by bypassing multivibrator 105 by way of "and" gate 110 and "or" gate 112. Selection of one of two alternative paths is made by connecting one input of each of "and" gates 110 and 114 to the output 104*c* of multivibrator 104, the other input of gate 110 to "or" gate 116, and the second input of "and" gate 114 to the output of inverter 118. The input to inverter 118 is also connected to the output of "or" gate 116. Thus only one of "and" gates 110 and 114 is operative at any one time. The circuits which supply signals to "or" gate 116 will be described later.

The output 106*c* of multivibrator 106 is supplied to one input of each of two "and" gates 120 and 119. These gates are the "end of operation" gate and the "recycle" gate, respectively. If the end of the operation is to be indicated, input 120*a* is energized to permit an "end of operation" signal to be supplied to output 120*c*. If the operation is not complete, input 119*a* is energized so that a "recycle" signal is supplied by way of output 119*a* and "or" gate 108 to the input 102*a* of multivibrator 102. It should be noted that multivibrator 101 is actuated only by the "begin" signal and that only multivibrators 102 through 106 are actuated on cycles after the first. Again, the description of the circuits supplying the signals to inputs 120*a* and 119*a* will be deferred until a later point in the specification.

It should be apparent to those skilled in the art that the function of the portion of Fig. 1C just described is to provide a sequence of control pulses on leads 101*b*, 102*b*, 103*b*, 104*b* and 106*b*. It lies within the scope of the present invention to replace the multivibrator chain just described with one or several tapped delay lines, or with any other suitable timing device.

The circuit of Fig. 1C includes seven program selection leads 121 through 127, respectively. Other program selection leads will be found in the circuit of Fig. 1B which will be described later. Energization of the following program leads will cause the circuits of Fig. 1C to supply to the gate circuits of Fig. 1A the necessary signals to perform the function set after the number.

121—determined absolute magnitude or signed magnitude
122—divide
123—take square root
124—multiply
125—add or subtract
126—shift left
127—shift right The selection between determining absolute magnitude or signed magnitude and between the add or subtract function is made by applying appropriate programming signals to program selection leads found in the circuit of Fig. 1B.

The portion of the Fig. 1C not yet described has as its function the directing of the timing signals from the multivibrator chain to the gate circuits selected by the energization of one, and only one, of the leads 121 through 127. Output 101*b* of multivibrator 101 is connected to one input of each of two "and" gates 141 and 142. The second input 142*b* of "and" gate 142 is connected to the multiplication program selection lead 124. The second input 141*b* of "and" gate 141 is connected to the same program lead through inverter 144. This connection is such that gate 141 provides an output signal at lead 141*c* in response to a signal on lead 101*b* at all times when the multiplication program lead 124 is not energized but is prevented from providing an output signal when lead 124 is energized. "And" gate 142 provides a signal at output 142*c* when leads 101*b* and 124 are energized but not otherwise. Leads 141*c* and 142*c* are connected respectively to clearing circuits 16*c* and 14*c* of Fig. 1A. As an aid in following this connection the letters O and A have been placed inside the triangles representing the "and" gates 141 and 142 and broken line triangles bearing the corresponding letter designations have been shown in Fig. 1A. The output 101*b* of multivibrator 101 is also connected through a non-inverting buffer 146 to lead 146*c*. The signal on lead 145*c* controls program selection circuits in Fig. 1B.

Turning now to multivibrator 102, the output lead 102*b* is connected through a non-inverting buffer stage 150 to output lead 150*c* which connects, in turn, to clearing circuits 12*c* and 18*c* of Fig. 1A. These clearing circuits are associated with the slave ranks of accumulator and the step counter, respectively. Output lead 102*b* is also connected to one input 152*a* of "and" gate 152. The second input 152*b* is connected to the square root program lead 123. Output connection 152*c* is connected to the clearing circuit 10*c* associated with the input register 10 of Figure 1A.

Output lead 103*b* from the third multivibrator is connected to one input of each of gates 161 through 166. These gates control the transfer of data from the master ranks to the slave ranks in the step counter and the accumulator, and the transfer of data from output register 16 and step counter master rank 20 to input register 10. Since "or" gates 171, 172 and 173, acting through "and" gates 164, 165 and 166, control gate circuits 30, 32 and 36 of Fig. 1A, it follows that only one of these three gate circuits may be operated during any one timing cycle. All the gates except 163 are two input "and" gates. Gate 163 which controls gate circuit 72 between master rank 20 and slave rank 18 of the step counter is a single input gate or non-inverting buffer stage. The second inputs 161*a* and 162*a* of gates 161 and 162, which control gate circuits 24 and 26 of Fig. 1A, are connected to the square root program lead 123. As mentioned earlier, gate circuits 24 and 26 are employed only during the square root function. The second inputs of gates 164, 165 and 166 are connected to the outputs of "or" gates 171, 172 and 173, respectively The connections to these "or" gates 171, 172 and 173 are such that only one of the three gates can have an output signal at any one time. The two inputs of "or" gate 173 are connected to the "shift right" program selection lead 127 and the multiplication program selection lead 124. Therefore gate 166 provides an output signal in response to signals from multivibrator 103 whenever either of these two program leads 124 and 127 is energized. "Or" gates 171 and 172 have three inputs each. Inputs 171*a* of "or" gate 171 is connected to the output of an "and" gate 176, and input 172*a* is connected to the output of "and" gate 178. Gates 176 and 178 form an alternative pair, one of which is providing an output signal when the other is not and vice versa. One input of each of "and" gates 176 and 178 is connected to the square root program lead 123. The other inputs to "and" gates 176 and 178 are connected to bi-stable circuit $20_{(2)}$ in step counter master rank 20. The connection to gate 176 is from the "one" side of this bi-stable circuit while the connection of gate 178 is from the "zero" side. This gate 176 will provide an output signal only if bi-stable circuit $20_{(2)}$ is registering a "one," while gate 178 will provide an output signal only if the same bi-stable circuit $20_{(2)}$ is registering a "zero."

The second inputs 171*b* and 172*b* of "or" gates 171 and 172 are connected to a second pair of alternative gates 180 and 182, respectively. These gates have their inputs connected to the division program lead 122 and to the "one" and "zero" sides, respectively, of bi-stable circuit $20_{(1)}$ in step counter master rank 20. The third input 171*c* of "or" gate 171 is connected to the "add-subtract" program lead 125. Similarly the third input of "or" gate 172 is connected to the "shift left" program lead 126.

Output 104*b* of multivibrator 104 is connected only to buffer 184 and "and" gate 186. Buffer 184 is connected to clearing circuits 14*c* and 20*c* associated with the master ranks of the accumulator and step counter of Fig. 1A. "And" gate 186, which has three inputs, has its output connected to clearing circuit 16*c* associated with output register 16. The first input of "and" gate 186 is connected to multiplication program lead 124, the third is connected to multivibrator 104, and the second is connected to the "one" side of bi-stable circuit $18_{(1)}$ in step counter slave rank 18. Thus multivibrator 104 provides the signals for clearing the master registers of Fig. 1A and, at one time during the multiplication process, for clearing the output register 16.

The signal supplied by multivibrator 106 controls the transfer of digits into the master ranks and into the output register 16. To accomplish this, output 106*b* is connected to one input of each of "and" gates 191 through 196. The outputs of these six "and" gates are connected to inputs 48*a*—50*b*, 44*b*, 34*b*, 74*b*, 70*b* (Fig. 1A) and 56*b* (Fig. 1B), respectively. Signals to the second inputs of these six "and" gates 191–196 are controlled primarily by the program selection leads of Fig. 1C. The second input of gate 196 is connected to both the square root program selection lead 122 and the division program selection lead 123 through "or" gate 198. The second input of gate 195 is connected directly to multiplication program selection lead 124 while the second input to gate 194 is connected to this same program selection lead through inverter 200. Again gates 194 and 195 are alternative gates, only one of which is operative on any one timing cycle. The second input to "and" gate 193 is connected to the output of a seven input "or" gate 202. Inputs 202*f* and 202*g* of "or" gate 202 are connected to the shift left and shift right program selection leads 126 and 127, respectively. Input 202*e* is connected to the output of "and" gate 204 in Fig. 1B which forms a part of an overflow sensing circuit. An overflow occurs when the number of digits in the number to be represented exceeds the capacity of the computer. For example, if through successive additions the sum requires 21 binary digits for proper representation, there will be an overflow of one digit since the capacity of the computer is only 20 digits. In some computers the occurrence of an overflow stops the operation of the computer. However, in the circuit of Figs. 1A, 1B and 1C a switch is provided which will permit the computer to continue to operate to provide an answer even though an overflow occurs. This arrangement is useful, for example, where the computer is employed to compute correction factors in a process or problem which cannot be interrupted. The correction factor which is obtained if an overflow occurs may be entirely incorrect but the effect of the wrong correction factor may be eliminated by a later computed correction factor in which no overflow occurs.

Input 202*d* is connected to the output of a two input "and" gate 210 which, together with "and" gate 212, forms an alternative pair. Gates 210 and 212 each have one input connected to "multiply" program lead 124. The second input of gate 212 is connected directly to the output of "or" gate 66 in Fig. 1B, while the second input of gate 210 is connected to the output of the same gate 66 through inverter 214. It is inverter 214 that causes the gates to operate in the alternative manner mentioned above. The function of gate 66 during the multiplication process will be explained later.

Input 202*c* is connected to the output of a three input "and" gate 216 which is also one half of an alternative pair, the other half being gate 218. Gates 216 and 218 are employed only in the square root operation so one input of each gate is connected to the square root program lead 123. These gates are not used on the last cycle of a square root operation. Therefore a second input of each gate is connected to the "zero" side of bi-stable circuit $18_{(20)}$ in step counter slave rank 18. If flip-flop $18_{(20)}$ registers a "one," as it will at the end of the square root operation, gates 216 and 218 become inoperative. The third input to "and" gates 216 and 218 provide the alternative operation. They are connected to the input and output, respectively, of an inverter 220 in the sensing section of Fig. 1B. Inverter 220 forms part of a circuit which senses whether the digit stored in bi-stable circuit 12*a* is the same as or different from the sign digit in the output of the adder-subtracter 40. If the digits are alike, indicating that the output of the adder-subtracter is positive, then gate 218 is made operative; otherwise gate 216 is operative.

Input 202*b* is connected to the output of "and" gate 222 which is operative only during the first cycle of the division operation. The first input of gate 222 is connected to the division program lead 122 while the second input is connected to the "one" side of flip-flop $18_{(1)}$ in step counter slave rank 18 (Fig. 1A).

Finally, input 202*a* is connected to the first of two alternative gates 224 and 226. One input of gate 224 and one input of gate 226 are connected to the input and output, respectively, of inverter 220 mentioned above in connection with the description of gates 216 and 218. The second inputs of these gates are connected to a circuit in Fig. 1B which will be described presently. This circuit causes gates 224 and 226 to be operative only during the division operation but not during the first and last cycles of this operation.

The second input of "and" gate 192 is connected to the output of a five input "or" gate 230. Three inputs, 230*a*, 230*b* and 230*d* are alternatives for inputs to "or" gate 202. These three inputs are connected to the outputs of "and" gate 226, "and" gate 218 and "and" gate 212, respectively. Input lead 230*c* is connected to the absolute magnitude-signed magnitude program selection lead 121. The fifth input 230*e* is connected to the output of "and" gate 232 (Fig. 1B) which forms a part of the overflow sensing circuit connected to inputs 202*e* of "or" gate 202.

The second input of the "and" gate 191 is connected to the output of a three input "or" gate 234. One input 234c of this "or" gate is connected to the output of "and" gate 204 in the overflow sensing circuit of Fig. 1B. Input 234a is connected to a circuit in Fig. 1B presently to be described which provides an output signal only during the first cycle of the division operation. The last input 234b is connected to an "or" gate 236 in Fig. 1B which provides an output signal to indicate the end of an operation. This completes the description of the arithmetic control section of Fig. 1C.

Attention should now be directed to the upper right hand corner of Fig. 1B where there is shown a series of "and" gates which control the operation of the add-subtract bi-stable circuit 42 and, through this bi-stable circuit, determine whether the adder-subtracter 40 of Fig. 1A will add or subtract. It should be noted that each of "and" gates 251 through 258 have one input connected to the output of buffer 146 in Fig. 1C so they are operative only at the beginning of the first cycle of a computer operation. "And" gates 251, 252, 255 and 256 have only one additional input each, these inputs being connected, respectively, to the add program selection lead 125a, the multiplication program selection lead 124, the square root program selection lead 123 and the subtract program selection lead 125b. Gates 253 and 254 have a second lead, each connected to the absolute magnitude-signed magnitude program selection lead 121, and third inputs connected to the "zero" and "one" sides, respectively, of the sign bi-stable circuit $10_{(1)}$ in input register 10.

Gates 257 and 258 are four-input "and" gates. The connection of the first inputs to buffer 146 has been described. A second input of each gate is connected to division program selection lead 122. A third input of each of these gates is also connected to bi-stable circuit $10_{(1)}$. The connection of gate 257 is to the "one" side of bi-stable circuit $10_{(1)}$ while the connection of gate 258 is to the "zero" side of this bi-stable circuit. The fourth input of each of the gates is connected to bi-stable circuit $14_{(1)}$ in the accumulator master rank 14. In this case gate 257 is connected to the "zero" side of the bi-stable circuit $14_{(1)}$ and gate 258 is connected to the "one" side of the same circuit. The outputs of "and" gates 257 and 258 are connected through an "or" gate 260 to the input of an inverter 262. "Or" gate 260 will provide an output signal if bi-stable circuits $10_{(1)}$ and $14_{(1)}$ are registering unlike digits and inverter 262 will provide the output signal if these bi-stable circuits are registering like digits.

"And" gate 264 has one input connected to multiplication lead 124, a second to the "one" side of bi-stable circuit $18_{(1)}$ in step counter slave rank 18, and a third connected to the output 163c of "and" gate 163 (Fig. 1C). The connection of gate 264 to bi-stable circuit $18_{(1)}$ limits the operative period of this gate to the last cycle of the multiplication function.

The outputs of "and" gates 251, 252, 253 and "or" gate 260 are connected through "or" gate 270 to the "zero" side of bi-stable circuit 42. A signal from "or" gate 270 will so set bi-stable circuit 42 that adder-subtracter 40 is in condition to add. "And" gates 254, 255, 256, 264 and inverter 262 are connected through "or" gate 272 to the "one" side of bi-stable circuit 42. A signal from "or" gate 272 will so set bi-stable circuit 42 that adder-subtracter 40 is caused to subtract. It should be understood that only one of the two "or" gates 270 and 272 provides an output signal at any one time.

In the lower left hand corner of Fig. 1B is a second set of circuits which operate on the first cycle of an operation. Gate circuits 281, 282 and gates 283 and 284 each have one input connected to the output of buffer 146 in Fig. 1C. A second input of gate circuit 282 is connected to the shift right and shift left program leads 126 and 127 through an "or" gate 285 which provides the necessary isolation between these two leads. Gate circuit 282 is a series of twenty "and" gates similar to gates in gate circuit 72, for example, of Fig. 1A. The third input to each gate in gate circuit 282 is connected to a separate address conductor, all twenty of which are represented by the single line 282c. One of the address conductors is selected by the programming circuits (not shown) to indicate the number of places a number is to be shifted by the computer. The outputs of the several gates in gate circuit 282 are connected to corresponding bi-stable circuits in step counter master rank 20. Multiplication program selection lead 124 is connected to the second input of "and" gate 281, and square root program selection lead 123 is connected to the second input of "and" gate 283 through "or" gate 286. The outputs of gates 281 and 283 are connected to bi-stable circuits $20_{(20)}$ and $20_{(2)}$, respectively.

Division program lead 122 is connected to the second input of "and" gate 283 through "or" gate 286 and an overflow switch 288. As will be explained later, placing switch 288 in the "out" position permits the computer to operate even if an overflow is present, while in the "in" position the operation stops and the original numbers are returned to input register 10 and output register 16 if an overflow occurs. In the "in" position, switch 288 connects the division program lead to the second input of "and" gate 284. In the "in" position switch 288 also connects the add-subtract program lead 125 to an input of "and" gate 204. The output of gate 284 is connected to bi-stable circuits $20_{(1)}$ of step counter master rank 20.

A third set of control gates is found in the middle left hand area of Fig. 1B. The function of this set of gates is to determine whether the computer will recycle or end the operation. As mentioned above, a signal from "or" gate 236 causes an "end of the operation" signal to be generated. A signal from "or" gate 290 enables the computer to recycle.

Division, square root, shift left and shift right program selection leads 122, 123, 126 and 127, respectively, are connected by way of "or" gate 292 to the input of "and" gate 294. The output of "and" gate 294 forms one input of "or" gate 236. The second input of "and" gate 294 is connected to the "one" side of bi-stable circuit $18_{(20)}$. This connection is such that "and" gate 294 will pass a signal from "or" gate 292 only on the last cycles of the division, square root, shift left and shift right programs. It is only during the last cycles of these programs that bi-stable circuit $18_{(20)}$ registers a "one."

A second input to "or" gate 236 is supplied by the output of "and" gate 296 which has its inputs connected to the multiplication program lead 124 and to the "one" side of bi-stable circuit $18_{(1)}$. Again a "one" must be registered by this bi-stable circuit to make gate 296 operative. Since the "one" progresses from right to left in the step counter slave rank 18 during the multiplication program, a "one" will be registered by bi-stable circuit $18_{(1)}$ only during the last cycle of this program. A third input of "or" gate 236 is connected to the output of gate 232 in the overflow sensing circuits. This connection causes an "end of operation" signal to be generated at the end of the one-cycle addition or subtraction program if there is no overflow. The fourth input is connected directly to the absolute magnitude-signed magnitude program lead 121. Since these programs are one-cycle programs in which no overflow can occur, it is not necessary to employ any gating from the step counter or the overflow sensing circuits. As mentioned above, the output of "or" gate 236 is connected to the inputs of "or" gate 234 and "and" gate 120 (both in Fig. 1C).

The recycle "or" gate 290 has its output connected to input 119a of gate 119 in Fig. 1C. Input 290a of "or" gate 290 has one input connected through "and" gate 300 to the multiplication program selection lead 124 and the other connected to the "zero" side of bi-stable circuit $18_{(1)}$. A "zero" must be registered by bi-stable circuit $18_{(1)}$ to make gate 300 operative. As mentioned above, this will occur on all but the last cycle of the multiplication program. "And" gate 302, which connects to input 290*b*, has one input connected to the square root, shift right and shift left program selection leads 123, 127 and 126 through "or" gate 304. The second input to gate 302 is connected to the "zero" side of bi-stable circuit $18_{(20)}$. Again a "zero" is registered by this bi-stable circuit on all but the last cycles of the square root, shift right and shift left programs.

Input 290*c* is connected to the output of a three input "and" gate 306. Two inputs to "and" gate 306 are connected to the "zero" sides of bi-stable circuits $18_{(1)}$ and $18_{(20)}$, respectively, while the third input is connected to the division program lead 122. Thus "and" gate 306 provides a signal on all division cycles except the first and last. It will be shown later that the first cycle of the division program is merely an overflow sensing step. Therefore the recycling after this first step is controlled by "and" gate 308 rather than gate 306. The output of gate 306 is also connected to the inputs of gates 224 and 226 in Fig. 1C.

The fourth input 290*d* of "or" gate 290 is connected to the output of "and" gate 308. One input of "and" gate 308 is connected to division program selection lead 122 and a second input is connected to the "one" side of bi-stable circuit $18_{(1)}$. The third input is connected to "or" gate 310 in the overflow sensing circuit. Thus "and" gate 308 will provide a signal only on the first cycle of the division program, and then only if there is no overflow.

An "and" gate 312, which has one input connected to the output of "and" gate 308 through inverter 311 and the second input connected to the "one" side of bi-stable circuit $18_{(1)}$, completes the portion of the circuit now being described. This gate 312 causes the data in the accumulator master rank 14 to be transferred to the output register 16 during the first or overflow sensing cycle of the division function if an overflow is sensed. This is accomplished by connecting the output of gate 312 to the input 234*a* of "or" gate 234 in Fig. 1C.

The group of gates in the upper left hand corner of Fig. 1B comprises the overflow sensing circuit which has been mentioned above. "And" gates 316 and 318 compare the digit registered by bi-stable circuit $12_{(1)}$ in the accumulator slave rank 12 with the digit indicated by the first, or sign, place in the adder-subtracter. As will be shown later, this amounts to a comparison of the magnitudes of the dividend and the divisor. If these digits are alike during the division function it indicates that the divisor is larger than the dividend and that there will be no overflow. More particularly, the two inputs of gate 316 are connected to the "one" side of bi-stable circuit $12_{(1)}$ while the other input is connected to the "one" side of the first digit circuit in adder-subtracter 40. The two inputs of gate 318 are connected to the "zero" sides of bi-stable circuit $12_{(1)}$ and the first digit circuit in adder-subtracter 40. The outputs of gates 316 and 318 are connected through the two-input "or" gate 310 to gate 308 described above.

The remainder of the overflow sensing circuit is devoted to determining if an overflow has occurred during an addition or subtraction program. This is accomplished by comparing in selected combinations the digits registered by bi-stable circuit $10_{(1)}$, bi-stable circuit $12_{(1)}$ and the first, or sign, circuit of adder-subtracter 40. The two inputs of gate 320 are connected to the "zero" side of bi-stable circuit $12_{(1)}$ and to the "one" side of the first digit circuit of adder-subtracter 40. The two inputs of gate 322 are connected to the "zero" side of the sign circuit of adder-subtracter 40 and to the "one" side of bi-stable circuit $12_{(1)}$. Thus one or the other of gates 320 and 322 will provide an output signal if the digits registered by bi-stable circuit $12_{(1)}$ and the first circuit of the adder-subtracter are unlike. If these digits are alike it is an immediate indication that there is no overflow on addition or subtraction.

Gates 324 and 326 further test for overflow on addition only if the digits registered by bi-stable circuit $12_{(1)}$ and the sign circuit of adder-subtracter 40 are unlike. One input of gate 324 is connected to the output of gate 320 while the other is connected to the "zero" side of bi-stable circuit $10_{(1)}$. The two inputs of gate 326 are connected to the output of gate 322 and the "one" side of bi-stable circuit $10_{(1)}$, respectively. Therefore gates 324 and 326 will provide output signals only under the following conditions.

| | Gate 324 | Gate 326 |
|---|---|---|
| Bi-stable circuit $10_{(1)}$ | 0 | 1 |
| Bi stable circuit $12_{(1)}$ | 0 | 1 |
| Add-subtract 40 | 1 | 0 |

The outputs of gates 324 and 326 are connected through "or" gate 328 to one input of "and" gate 330. The other input of "and" gate 330 is connected to the "add" program selection lead 125*a* so that gate 330 can provide an output signal only during the "add" program. The output of gate 330 is connected through "or" gate 332 to gate 204 mentioned above. Gate 204 merely provides means for blocking the overflow signal if desired. The output of gate 204 is connected to one input of gate 232 through inverter 334. If the manual overflow check switch 288 is in its upper or "out" position, gate 232 would provide an output at all times except for the connection of its second input to the add-subtract program lead 125 which permits it to have an output only on the add and subtract functions.

"And" gates 342 and 344 provide a check on overflow during the subtract function. Gate 342 has inputs connected to the output of gate 320 and the "one" side of bi-stable circuit $10_{(1)}$. Gate 344 has one input connected to the output of gate 322 and a second input connected to the "zero" side of bi-stable circuit $10_{(1)}$. Gates 342 and 344 will provide output signals only under the following conditions.

| | Gate 342 | Gate 344 |
|---|---|---|
| Bi-stable circuit $10_{(1)}$ | 1 | 0 |
| Bi-stable circuit $12_{(1)}$ | 0 | 1 |
| Add-subtract 40 | 1 | 0 |

The outputs of gates 342 and 344 are both connected to one input of "and" gate 346 through "or" gate 348. The second input of "and" gate 346 is connected to the subtract program selection lead 125*b*. The output of gate 346 is connected to an input of "or" gate 332. This completes the overflow sensing circuit.

The seven gates shown just below the add-subtract flip-flop 42 in Fig. 1B comprise a circuit for sensing the sign of the trial remainder during the division and square root programs. This is accomplished by comparing the digit registered in the auxiliary bi-stable circuit 12*a* with the sign digit in the adder-subtracter 40. Gate 350 is connected to the "one" side of the sign circuit in adder-subtracter 40 and to the "zero" side of bi-stable circuit 12*a*. Gate 352 has its two inputs connected to the opposite sides of these two circuits. The outputs of gates 350 and 352 are connected through "or" gate 354 to the input of inverter 220. It should be noted that a signal will appear at the input of inverter 220 whenever the digits in the bi-stable circuit 12*a* and adder-subtracter 40 are unlike, and a signal will appear at the output of inverter 220 if the digits are alike. As mentioned earlier, the output signals of gate 354 and inverter 220 control the operation of gates 34 and 44 of Fig. 1A through "and" gates 192 and 193 of Fig. 1C.

"And" gate 356 has one input connected to the output of "or" gate 354 and a second input connected to the "add" side of bi-stable circuit 42. Thus gate 356 may have an output only when adder-subtracter 40 is set to add. Gate 358 has one input connected to the output of inverter 220 and a second input connected to the subtract side of bi-stable circuit 42. The outputs of gates 356 and 358 are connected through "or" gate 360 to an input of "and" gate 56. As will be explained in more detail later, gate 56 controls the transfer of data from the step counter slave rank 18 to output register 16.

Turning now to the circuits at the extreme right of Fig. 1B, "and" gate 362 is provided for inserting a "one" in the first place of the shifted number during the "shift right" program provided the number to be shifted has a "one" in this position. One input of gate 362 is connected to the "shift right" program selection lead 127, and the other is connected to the "one" side of bi-stable circuit $\mathbf{14}_{(1)}$ where the first digit of the number to be shifted will appear. The output of gate 362 is connected to bi-stable circuit **14*a* in a manner to cause this bi-stable circuit to register a "one" if a signal is present at the output of gate 362. Bi-stable circuit 14*a* is connected to bi-stable circuits $\mathbf{12}_{(1)}$ and 12*a* through "and" gate 366 which also receives a control signal from "and" gate 166 of Fig. 1C. A second "and" gate 368 connects bi-stable circuit 12*a* to bi-stable circuit 14*a*. Gate 368 has its control input connected to gate 195 of Fig. 1C. Gate 366 is employed in the multiplication and shift right programs. Gate 368** is employed only during the multiplication program.

"And" gate 370 which has one input connected to buffer 146 (of Fig. 1C) the other input to program lead 123, and the output connected to bi-stable circuit $\mathbf{14}_{(1)}$ provides means for inserting a "one" in this bi-stable circuit at the beginning of the square root cycle.

Bi-stable circuit 372 is provided for storing the sign digit of the multiplier which is initially inserted in multiplier-quotient output register 16. Bi-stable circuit 372 is never cleared and data is "jam transferred" thereto through "and" gate 374 which has a second input connected to buffer 146 and a third input connected to multiplication program lead 124. In the "jam transfer" of data, the data in one circuit, whether a "one" or "zero," is transferred to and replaces any data stored in a second circuit without regard to the data previously registered in the second circuit. Thus a sign digit of "zero" in register 16 would be transferred to and would replace a digit of "one" in circuit 372. In transfer of data by transfer of "ones" only a "one" stored in the second circuit will not be disturbed by a "zero" in the first circuit. Gate 374 is operative only on the first cycle of the multiplication program.

The output of bi-stable circuit 372 is connected through "and" gate 376 to a second input of "or" gate 66. The second input of gate 376 is connected to the "one" side of bi-stable circuit $\mathbf{18}_{(1)}$ so that it is operative only on the last cycle of the multiplication program.

An "and" gate 380 is provided for injecting a "one" into the sign bi-stable circuit $\mathbf{16}_{(1)}$ of the multiplier-quotient output register 16 on the last cycle of the division program if bi-stable circuit 42 is set to the "add" state. The purpose of this insertion will be explained in more detail presently. The three inputs of gate 380 are connected to "and" gate 196 of Fig. 1C, to the "one" side of bi-stable circuit $\mathbf{18}_{(20)}$ and to the "add" side of bi-stable circuit 42.

Gate 382 is provided for transferring the sign digit from the bi-stable circuit $\mathbf{10}_{(1)}$ to bi-stable circuit $\mathbf{14}_{(1)}$ during the signed magnitude program. The three inputs to gate 382 are connected to the "one" side of bi-stable circuit $\mathbf{10}_{(1)}$, to gate 192 (Fig. 1C) and to the signed magnitude program selection lead **121*b*. The output of gate 382 is so connected to bi-stable circuit $\mathbf{14}_{(1)}$ that a signal from gate 382** will set bi-stable circuit $\mathbf{14}_{(1)}$ to register a "one."

A gate 384 is provided for inserting a "round-off" digit into bi-stable circuit $\mathbf{12}_{(2)}$ of the accumulator slave rank 12 on the first cycle of the multiplication function. It is customary in digital computers to increase the least significant digit of a final product number by one if the next less significant digit (beyond the range of the computer) would have been one. The manner in which the equivalent of this round-off is accomplished by gate 384 will be explained presently. Gate 384 is connected to bi-stable circuit $\mathbf{12}_{(2)}$ so as to set this bi-stable circuit to register "one." The three inputs to gate 384 are connected to gate 166 of Fig. 1C, to the "one" side of bi-stable circuit $\mathbf{20}_{(20)}$ and to the multiplication program selection lead 124.

Finally, for reasons which will be explained presently, an "and" gate 386 is provided which has its output so connected that bi-stable circuit **14*a* will be set to "one" upon the occurrence of an output signal. The four input leads to gate 386 are connected to the "carry" output of adder-subtracter 40, gate 192 of Fig. 1C, the "one" side of bi-stable circuit $\mathbf{10}_{(1)}$ and the multiplication program selection lead 124**.

The circuit described above is that of a general purpose computer which will perform the following functions:

(1) Determined absolute magnitude
(2) Determined signed magnitude
(3) Divide
(4) Take square root
(5) Multiply
(6) Add
(7) Subtract
(8) Shift left
(9) Shift right Many of the circuit components described are used in less than all of these operations. The following table indicates the components in Figs. 1B and 1C which may be omitted if one or more of the programs are omitted. This table will also serve as a guide to the components which are operative for any particular program. The components not listed are employed on all nine programs listed above.

FIGURE 1C

| | Absolute magnitude | Signed magnitude | ÷ | √ | × | + | − | Shift left | Shift right |
|---|---|---|---|---|---|---|---|---|---|
| 119 | ----- | ----- | X | X | X | ----- | ----- | X | X |
| 105, 114 } | X | X | X | X | X | X | X | ----- | ----- |
| 110 | ----- | ----- | ----- | ----- | X | ----- | ----- | X | X |
| 141 | X | X | X | X | ----- | X | X | X | X |
| 142 | ----- | ----- | ----- | ----- | O | ----- | ----- | ----- | ----- |
| 226 | ----- | ----- | O | ----- | ----- | ----- | ----- | ----- | ----- |
| 224 | ----- | ----- | O | ----- | ----- | ----- | ----- | ----- | ----- |
| 222 | ----- | ----- | O | ----- | ----- | ----- | ----- | ----- | ----- |
| 218 | ----- | ----- | ----- | O | ----- | ----- | ----- | ----- | ----- |
| 216 | ----- | ----- | ----- | O | ----- | ----- | ----- | ----- | ----- |
| 212 | ----- | ----- | ----- | ----- | O | ----- | ----- | ----- | ----- |
| 210 | ----- | ----- | ----- | ----- | O | ----- | ----- | ----- | ----- |
| 176 | ----- | ----- | ----- | O | ----- | ----- | ----- | ----- | ----- |
| 178 | ----- | ----- | ----- | O | ----- | ----- | ----- | ----- | ----- |
| 180 | ----- | ----- | O | ----- | ----- | ----- | ----- | ----- | ----- |
| 182 | ----- | ----- | O | ----- | ----- | ----- | ----- | ----- | ----- |
| 118 | X | X | X | X | X | X | ----- | ----- | ----- |
| 214 | ----- | ----- | ----- | ----- | O | ----- | ----- | ----- | ----- |
| 116 | ----- | ----- | ----- | ----- | O | ----- | ----- | ----- | ----- |
| 234 | X | X | X | X | X | X | X | X | X |
| 230 | X | X | X | X | X | X | X | ----- | ----- |
| 202 | ----- | ----- | X | X | X | X | X | X | X |
| 200 | ----- | ----- | X | X | ----- | ----- | ----- | X | X |
| 198 | ----- | ----- | X | X | ----- | ----- | ----- | ----- | ----- |
| 171 | ----- | ----- | X | X | ----- | X | X | ----- | ----- |
| 172 | ----- | ----- | X | X | ----- | ----- | ----- | X | ----- |
| 173 | ----- | ----- | ----- | ----- | X | ----- | ----- | ----- | X |
| 191 | X | X | X | X | X | X | X | X | X |
| 192 | X | X | X | X | X | X | X | ----- | ----- |
| 193 | ----- | ----- | X | X | X | X | X | X | X |
| 194 | ----- | ----- | X | X | ----- | ----- | ----- | X | X |

See footnotes at end of table.

FIGURE 1C

| | Absolute magnitude | Signed magnitude | ÷ | √‾ | × | + | − | Shift left | Shift right |
|---|---|---|---|---|---|---|---|---|---|
| 195 | | | | | O | | | | |
| 196 | | | X | X | | | | | |
| 186 | | | | | O | | | | |
| 184 | X | X | X | X | X | X | X | X | X |
| 161 | | | | O | | | | | |
| 162 | | | | O | | | | | |
| 163 | | | X | X | X | | | X | X |
| 164 | | | X | X | | X | X | | |
| 165 | | | X | X | | | | X | |
| 166 | | | | | X | | | | X |
| 150 | X | X | X | X | X | X | X | X | X |
| 152 | | | | O | | | | | |

X—used in programs shown.
O—used only in the one program shown.

The invention is not limited to any particular circuits or circuit components for the gates and other circuits shown in Figs. 1A, 1B and 1C. The logic diagram of Figs. 1A, 1B and 1C may be employed as a block diagram and conventional circuits substituted for each of the blocks. However, some economy in circuit components may be achieved by combining the functions or portions of the functions of two or more blocks in a single circuit. Figs. 2 through 16 illustrate certain preferred forms of circuits in which some combination of functions has been achieved. It is believed that it is unnecessary to describe these circuits in detail since they comprise mainly "and" or "or" gates of the type disclosed and claimed in the copending application of William E. Bradley and Morris Rubinoff, Serial No. 485,661, filed February 2, 1955, and bi-stable circuits of the type disclosed and claimed in the copending application of Ralph B. Brown, Serial No. 482,344, filed January 17, 1955. However, sufficient explanation will be given to permit the reader to correlate these circuits with the logic diagrams of Figs. 1A, 1B and 1C. In certain instances, one or more "and" gates may share a common transistor or two or more transistors may be arranged in parallel to cause them to perform the function of an "and" gate. This is particularly true with the circuits associated with multivibrator 106. Therefore it is not possible to group all of the circuits shown in Figs. 2 through 16 in accordance with the logic diagram. However, it is possible to group a sufficient number of circuits in each figure to permit the reader to orient himself on the logic diagram.

Turning now to Fig. 2 there is shown the first digit circuit of each register in Fig. 1A. The circuits of Fig. 2 comprise the circuits which may appear on each of the twenty cards mentioned above. It will be noted that each of the registers includes a direct coupled bi-stable circuit of two resistors and two transistors. In input register 10 for example, the bi-stable circuit comprises resistors 400 and 402 and transistors 404 and 406. As explained in greater detail in copending application Serial No. 482,344, the circuit is one in which only one transistor is conducting at a time. If transistor 404 is conducting the collector of this transistor is at a low negative potential. The low negative potential on the collector of transistor 404 causes the base of transistor 406 to be at a low potential. This causes transistor 406 to be cut-off and the collector to be at a high negative potential. The circuit is said to register a "one" if the collector of transistor 406 is at a high potential. The bi-stable circuit is said to register a "zero" when the collector of transistor 404 is at a high potential. The transistor 406 can be made conducting and transistor 404 cut off by lowering the collector potential of transistor 406. This is accomplished by supplying a negative pulse to the base of the clearing transistor **10*c*. The bi-stable circuit will stay in its "zero" or "cleared" condition even after the removal of the pulse on the base of the clearing transistor 10*c* since the base of transistor 406 is now held at a high negative potential by the high collector potential of transistor 404**.

The bi-stable circuit can be reset from its "cleared" position to the position indicating a "one" by a signal supplied to the base of transistor 22. Input lead **22*b* will be at a low potential if a "one" is to be read in through gate 22. Applying a "transfer" or "read in" pulse to the base of transistor 22 will then drop the collector potential of transistor 404 and reverse the stable state of the bi-stable circuit $\mathbf{10}_{(1)}$. If a "zero" is to be read in, i.e. bi-stable circuit $\mathbf{10}_{(1)}$ is to be left in its "cleared" state, lead 22*b* will be at a high negative potential or will be open circuited so that supplying a pulse to the base of transistor 22 will not drop the collector potential of transistor 404. Transistor 34′ in series with gate 34 illustrates one method of causing an input lead to a gate circuit to be at a low potential. A high negative potential on the base of transistor 34′** causes the collector to be at substantially the same potential as the base, i.e. at ground potential.

The adder-subtracter circuit $\mathbf{40}_{(1)}$ will not be explained in detail. Its operation may be traced by assuming a high negative potential on lead **40*e* and a low negative potential on lead 40*d*, if the circuit is set to add and the opposite magnitudes if the circuit is set to subtract. Lead 40*i* will be at a high negative potential and lead 40*j* will be at a low negative potential, if the carry or borrow from circuit $\mathbf{40}_{(2)}$ is a "one." These potentials will be reversed if the carry or borrow is a "zero." Lead 40*a′* will be at a high negative potential and lead 40*a″* will be at a low potential if input register $\mathbf{10}_{(1)}$ is registering a "one." The relative magnitude of these potentials will be reversed if a "zero" is registered in circuit $\mathbf{10}_{(1)}$. Similarly, lead 40*b′* is at a high negative potential and lead 40*b″*** is at a low potential if circuit $\mathbf{12}_{(1)}$ is registering a "one."

A carry of "one" is indicated by lead **40*f′* being at a high negative potential and lead 40*f″* being at a low potential. A sum of "one" is indicated by lead 40*c*** being at a high potential.

The other 19 digit circuits will be similar to the one shown in Fig. 2 except for the omission of some of the sensing leads which connect to circuits outside Fig. 1A. The digital capacity of the circuit of Figs. 1A, 1B and 1C may be changed by employing more or fewer of the circuits shown in Fig. 2. No change would be required in the circuits of Figs. 1B and 1C except to change the number of address conductors **282*c* of Fig. 1B and to alter the delay of multivibrator 105** to provide for any increase in ripple time. An increase in the digit capacity might require buffers of larger power handling capacity in circuits driving the gates and clearing circuits of Fig. 1A, but no change in logic would be required.

Figures 3, 4, 5:
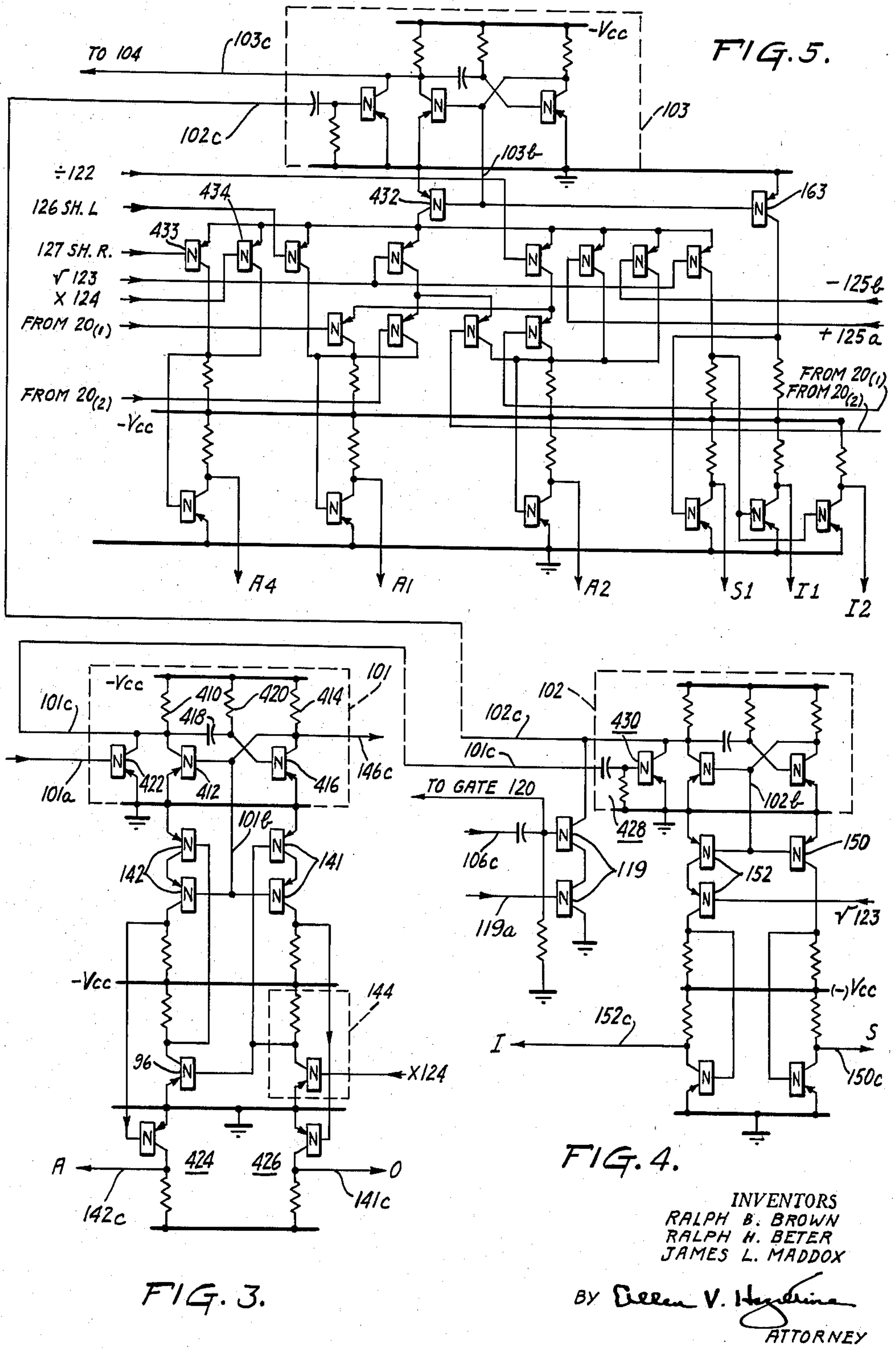
Fig. 3 is a circuit diagram of multivibrator 101 of Fig. 1C and the gate circuits associated therewith.

Fig. 3 illustrates multivibrator 101 of Fig. 1C and the circuits 141, 142, 144 and 146 associated therewith. It is believed that only the multivibrator 101 requires a detailed explanation. This multivibrator comprises two amplifier stages made up of resistor 410 and transistor 412, and resistor 414 and transistor 416, respectively. The collector of transistor 416 is directly coupled to the base of transistor 412. The collector of transistor 412 is coupled to the base of transistor 416 through capacitor 418. The base of transistor 416 is returned to the negative supply potential through resistor 420. A trigger transistor 422 is connected in shunt with transistor 412 to provide means for initiating the operation of the multivibrator. If a "begin" signal in the form of a negative pulse is supplied to the base of transistor 422, the potential on the collectors of transistors 422 and 412 will become less negative. This drop in potential is coupled through capacitor 418 to the base of transistor 416 and cuts off this transistor. When transistor 416 is cut off, the collector becomes more negative and permits transistor 412 to conduct. This permits the multi-vibrator to remain momentarily in its triggered state even though the "begin" signal is removed. Capacitor 418 charges through resistor 420 causing the potential of the base of transistor 416 to become more negative. When the base becomes sufficiently negative, transistor 416 will conduct. The drop in potential at the collector of this transistor will again cut off transistor 412 and the circuit will return to the state it was in before the "begin" pulse was supplied. The delay introduced by the multivibrator is a function of the R.C. time constant of capacitor 418 and resistor 420.

In Fig. 1C multiplication program selection lead 124 is connected directly to gate 142 and to gate 141 through an inverter 144. In Fig. 3 program selection lead 124 is connected to gate 141 through inverter 144 and to gate 142 through two inverters 144 and 96. The two inverters provide the equivalent of a direct connection. Buffer stages 424 and 426 are normally conducting but are cut off by the signals from gates 142 and 141, respectively, to produce negative going signals.

Fig. 4 shows multivibrator 102, buffer 150 and gate 152 of Fig. 1C. Recycle gate 119 is also shown in Fig. 4. Multivibrator 102 differs from multivibrator 101 only in the R.C. differentiating network 428 in the base circuit of the triggering transistor 430. It will be remembered that the signal supplied by multivibrator 101 first becomes less negative and then becomes more negative at the end of the multivibrator cycle. The initial drop in potential has no effect on multivibrator 102 except to drive transistor 430 further into the cut-off region. However, the R.C. time constant of network 428 is short compared to the period of multivibrator 101. Therefore the capacitor in network 428 discharges following the initial drop in potential and then supplies a negative pulse to the base of transistor 430 at the time the input potential again rises toward a more negative value, that is at the end of the cycle of multivibrator 101. Thus the cycle of multivibrator 102 is initiated at the end of the cycle of multivibrator 101. The "or" function of gate 108 (Fig. 1C) is provided by connecting the top collector of gate 119 to the collector of transistor 430 as shown in Fig. 4.

Fig. 5 shows multivibrator 103 and the gates associated therewith. Buffer 163 may be identified in Fig. 5 but it is more difficult to identify the other gates. For example, gates 161, 162, 164, 165 and 166 all share transistor 432. Transistor 432 together with transistors 433 and 434 form "and" gate 166. The parallel combination of transistors 433 and 434 constitutes "or" gate 173. The operation of Fig. 5 may be understood completely by reference to the logic diagram of Fig. 1C.

Figs. 6, 7 and 8 illustrate multivibrators 104, 105 and 106, respectively. The gates associated with multivibrators 104 and 105 are shown in Figs. 6 and 7 but only a portion of the gates associated with multivibrator 106 are shown in Fig. 8, the remainder of these gates being shown in Fig. 9. It is believed that Figs. 6 and 7 require no further explanation. The only portions of Fig. 8 that may require explanation are the "and" gates 192 and 193. Each of these gates comprise two transistors connected with the emitter-collector paths in parallel. This arrangement normally forms an "or" circuit. However, since both transistors are normally conducting both must be cut off to cause a rise in potential at the common collector connection. Hence, as connected in Fig. 8, these transistors perform an "and" function. Again it will be found that the circuits of Figs. 8 and 9 will operate in exactly the manner shown in the logic diagram of Fig. 1C. It is not possible to group the transistors in Figs. 8 and 9 to correspond to the diagram of Fig. 1C for the reason that a single transistor may form a part of more than one gate. However, if each transistor is considered a switch which is normally open but which is closed by a negative signal applied to the base, the reader will have no difficulty in following any desired signal path.

Fig. 10 illustrates the add-subtract selection circuits appearing in the upper right hand corner of Fig. 1B. It should be noted that gates 251, 252 and 253, and the combination including gates 257, 258 and 260, share a common transistor 440. Transistor 440 is controlled by a timing signal from multivibrator 101 of Fig. 3. A second transistor 442 is shared by gates 254, 255, 256 and the combination including gates 257, 258 and 260. The inverter 262 does not appear as such in Fig. 10 but the function of this inverter is provided for in the circuits enclosed within the broken rectangle bearing the joint reference numerals 257, 258, 260 and 262.

The circuit shown in Fig. 11 is that of the divide and square root sensing circuit found in Fig. 1B immediately below the add-subtract bi-stable circuit 42. It should be noted that only the connection to the "one" side of the adder-substracter circuit 40 is provided by lead 444. The equivalent to the connection to the "zero" side of adder-subtracter circuit 40 shown in Fig. 1B is provided by inverter stage 446. The function of "or" gate 354 is provided by the common load resistor for gates 350 and 352. Again, because of polarity considerations, the connections of the "like" and "unlike" sign leads to inverter 220 have been reversed.

Fig. 12 illustrates the circuit of the add-subtract bi-stable circuit 42 of Fig. 1B. Gates 270 and 272 supply input signals to a two-transistor bi-stable circuit 450. The left half of this bi-stable circuit 450 is connected to output lead **40*e* through a one stage buffer 452. Similarly the right half of the bi-stable circuit 454 is connected to output lead 40*d* through buffer 454. Lead 40*e* and 40*d* connect to the adder-subtracter 40** of Fig. 1B.

The overflow sensing circuit in the upper left hand corner of Fig. 1B is shown in Fig. 13. Gates 308 and 312 are also shown in Fig. 13. Many of the transistors shown in Fig. 13 form a part of more than one of the gate circuits shown in the logic diagram of Fig. 1B so that any attempt to identify all of the transistors with the gates shown in Fig. 1 would only confuse the drawing. By way of illustration, however, the gates 322, 324, 326 and 330 are shown. It should be noted that if the two transistors forming gate 320 are both in a conductive state and the additional transistor which forms a part of gate 324 is also in a conductive state, point 456 will be at a low negative potential. Point 456 will also be at a low negative potential if the transistors forming gates 322 and 326 are in a conductive state. The function of "or" gate 328 is provided for by connecting the two above-mentioned transistor paths to a common load resistor at point 456. "And" gate 330 is a conventional "and" gate with two transistors in series. However, "and" gate 204 is formed of two stransistors in parallel both of which must be in a non-conductive state in order to provide a high potential at the common collector connection. Gates 308 and 312 also appear in Fig. 13. Again "and" gate 312 comprises two transistors in parallel. One of these transistors also forms a part of the three input "and" gate 308.

Fig. 14 illustrates a preferred embodiment of the "end of operation" sensing circuits appearing at the lower left side of Fig. 1B. Fig. 14 comprises only conventional gating circuits and requires no further explanation. A few of the gates shown in Fig. 1B have been identified by reference numerals in Fig. 14. The rest may be identified by comparison of the logic diagram of Fig. 1B with the circuit diagram of Fig. 14.

Fig. 15 illustrates the auxiliary bi-stable circuits **12*a* and 14*a* and the circuits associated therewith. Bi-stable circuits 12*a* and 14*a*** are enclosed by broken line rectangles. The gate circuits are identified by reference numerals corresponding to those shown in Fig. 1B.

Fig. 16 illustrates the circuits associated with the multiplier sensing bi-stable circuit 372 and the circuits appearing at the bottom of Fig. 1B. It should be noted that two connections are made from bi-stable circuit $16_{(1)}$ to bi-stable circuit 372 to permit "jam transfer" of data, that is transfer of either a "one" or a "zero." It should also be noted that no clearing circuit is associated with bi-stable circuit 372.

As mentioned above, the operation of the invention will be described with reference to Figs. 1A, 1B and 1C only. However, it is believed that those familiar with transistor circuits will have no difficulty in following also the operation of the detailed circuits shown in Figs. 2 through 16. Again it should be remembered that, in the logic diagram of Figs. 1A, 1B and 1C, the presence of a signal is indicated by a conductor being at a high potential. All signals are presumed to be of the same polarity. The same criterion holds true generally for the circuits of Figs. 2 through 16, except where there are two alternative signals, for example "overflow" or "no overflow," lead may be utilized as a signal indicating "no overflow."

*Description of the operation*

The operation of the system of Figs. 1A, 1B and 1C will now be explained. Each function of the circuit will be explained separately starting with the "add" function. In the twenty digit computer shown in Figs. 1A, 1B and 1C a number comprises one sign digit followed by nineteen digits indicating the magnitude of the quantity to be added or subtracted. A sign digit of "zero" indicates the number is positive. Negative numbers are expressed in two's complement form so that the sign digit becomes a "one." Expressing numbers in two's complement form permits a positive number to be added to a negative number without requiring that the adder-subtracter be changed from the add setting to a subtract setting. It also has other advantages which will become apparent as the description of the operation proceeds. In the operation of the computer, numbers in the computer are normalized to be less than "one" so that the binary point follows the sign digit.

In several of the functions about to be described, one number is placed in the accumulator master rank 14 and a second number is placed in the input register 10. If, for example, the function is to be the addition of a number obtained from some external source such as the computer memory to the number resulting from the last operation of the computer, the augend will already be present in the accumulator master rank 14. The addend may be read into the input register by energizing lead 22*a* of the read-in gate 22. However, assuming that there is no data stored in the accumulator master rank 14, the augend must be read into the accumulator master rank 14 from some external source, for example the memory section. This may be done by inserting the augend into the input register and programming the computer to add. The addition of the number in the input register to a "zero" in the accumulator master rank 14 will result in the augend being transferred to the accumulator master rank 14 in a manner which will be described presently. The second number may now be read into the input register and the desired addition function performed. Occasionally it may be necessary to perform some function on two numbers, neither of which is present in the arithmetic section, when the accumulator is occupied by a third number. Circuits (not shown) associated with "computer control" may be provided for energizing clearing circuits 12*c* and 14*c* thus readying the accumulator for the reception of one of the two desired numbers.

The addition function will now be described.

*Addition*

Assuming that the augend is in the accumulator master rank 14 and the addend has been read into the input register 10, the computer is set to perform the add function by energizing program selection leads 125 and 125*a*. Energizing program lead 125*a* conditions "and" gate 251 at the top of Fig. 1B to pass a signal. Energization of program lead 125 will condition "and" gates 164 of Fig. 1C and 232 of Fig. 1B to pass a signal. Energization of program lead 125*a* will also condition "and" gate 330 in the overflow sensing circuit of Fig. 1B to pass a signal. The other gates that will be energized during the course of the add operation although not directly as a result of the energization of the program leads 125 or 125*a* are "and" gates 191 and 192 and buffers 184 and 150. Following the energization of program leads 125 and 125*a* a "begin" signal is supplied to multivibrator 101. The output signal of multivibrator 101 is supplied to buffer 146. Buffer 146 supplies a second input signal to "and" gate 251 of Fig. 1B causing gate 251 to pass a signal through "or" gate 270 and set the add-subtract bi-stable circuit 42 to the add state. Setting bi-stable circuit 42 in the add state causes lead 40*e* to be at a high potential thus setting adder-subtractor 40 to the add condition. Multivibrator 101 also supplies a signal to "and" gate 141. Since multiplication program lead 124 is not energized, inverter 144 will supply a second signal to gate 141. The signal from "and" gate 141 is applied to clearing circuit 16*c* of the output register 16. This clears the output register of any previously stored information. This completes the response of the circuit to the signal from multivibrator 101. Upon the occurrence of a signal at lead 102*b* of multivibrator 102, buffer circuit 150 energizes clearing circuits 18*c* and 12*c* of Fig. 1A. These circuits clear step counter slave rank 18 and the accumulator slave rank 12.

In the next step in the cycle the signal at lead 103*b* of multivibrator 103 causes "and" gate 164 to provide an output signal. The signal from "and" gate 164 causes "and" gate 32 of Fig. 1A to transfer the contents of the accumulator master rank 14 to the accumulator slave rank 12. It will be remembered that the transfer of a number from accumulator master rank 14 to the accumulator slave rank 12 merely duplicates in slave rank 12 the number which was present in master rank 14. It does not clear master rank 14.

Adder-subtractor 40 adds the number present in input register 10 to the number present in accumulator slave rank 12 and provides an indication of the sum at output 40*c*. Again the signal appearing at output 40*c* will comprise one sign digit followed by nineteen digits indicating the magnitude of the sum. Signals representing the sign digit are also applied to "and" gates 320 and 322 in the overflow sensing circuit. The overflow sensing circuit provides an indication of overflow when there is a negative sign in the input register 10 and in the accumulator slave rank 12 but a positive sign in the adder-subtractor 40, or when there is a positive sign in the input register 10 and accumulator slave rank 12 and a negative sign in adder-subtractor 40. Since the addition of two negative members cannot give rise to a positive number and the addition of two positive number cannot give rise to a negative number, in these two cases the sign digit in the adder-substracter is not a true sign digit. Rather it is a meaningless digit which results when the capacity of the computer is exceeded. Since both the augend and the addend are normalized to be less than "one," no overflow can occur if one of the numbers in the input register 10 or accumulator slave rank 12 is negative and the other is positive. Therefore it is not necessary to sense overflow under these conditions. Also, if the overflow sensing switch 288 is in its "out" position, "and" gate 204 will be incapable of passing a signal and no overflow will ever be indicated.

A signal on lead 104*b* from the fourth delay multivibrator causes the accumulator master rank 14 to be cleared. Step counter master rank 20 is also cleared in this operation but the step counter plays no part in the addition function.

Because there is a possibility that a carry ripple will take place during the addition process, no signal is supplied to inverter 118. This causes "and" gate 114 to be conditioned for conduction and "and" gate 110 to be incapable of passing a signal. Thus the timing pulse must pass through delay multivibrator 105 before being applied to delay multivibrator 106.

On the occurrence of a signal at the output lead 106*b* of multivibrator 106, "and" gates 191, 192 and 193 are placed in a condition where they may pass a signal. If no overflow is sensed, a signal will be supplied to the second input of gate 192 from gate 232 in the overflow sensing circuit. A signal at the output of gate 192 will permit gate 44 of Fig. 1A to transfer the sum from adder-subtractor 40 to the accumulator master rank 14. At the same time "and" gate 191 will receive a second input from the end of operation sensing circuits by way of "and" gate 232 and "or" gate 236. A signal at the output of gate 191 will cause gate 50 to transfer the sum from the accumulator master rank 14 to the output register 16. The sum of the augend and the addend are now present in accumulator master rank 14 and in the output register 16. The sum is left in these two locations so that it will be available in the accumulator master rank 14 if other operations are to be performed on it and so that it will be present in the output register 16 if it is to be read out to some other circuit such as the memory section of the computer. The signal is transferred out of register 16 through read out gate 60.

The signal from multivibrator 106 and "or" gate 236 will cause the end of operation gate 120 to provide an output signal indicating that the desired addition has been completed. It should be noted that not one of gates 300, 302, 306 and 308 receives a signal which would condition it is to pass a signal. Therefore there can be no output signal from "or" gate 290. In the absence of an output signal from "or" gate 290, recycle gate 119 cannot pass a signal. Therefore the timing chain comprising multivibrators 101 to 106 operates for only one cycle.

Suppose now that an overflow was sensed during the course of the addition operation. In this case, "and" gate 192 would not receive a signal at the second input so no transfer of information would take place from adder-substracter 40 to the accumulator master rank 14. Instead, a signal would be supplied from "and" gate 204 of Fig. 1B to the second input of "and" gate 193 of Fig. 1C. A signal from "and" gate 193 will cause the signal present in the accumulator slave rank 12 to be retransferred to the accumulator master rank 14 through gate circuit 34. "And" gate 191 again receives a signal at its second input, this time by way of an overflow signal from "and" gate 204. This causes the number present in the accumulator master rank 14 to be transferred to the output register 16. No "end of operation" signal is generated if an overflow is sensed since the second input to "and" gate 120 can come only from "or" gate 236. It should be noted that, upon the occurrence of an overflow during the addition process, the augend is returned to the accumulator master rank 14 and to the output register 16, the places it occupied before the begin signal was supplied to multivibrator 101. The fact that no "end of operation" signal occurs warns the operator of the computer than an overflow has occurred and that he must reprogram his computer so that no overflow will occur.

*Subtraction*

The subtraction function is very similar to the addition function. The circuits of Fig. 1C operate in exactly the same way. The operation of the circuit of Fig. 1A is the same except that adder-subtracter 40 is set to "subtract" by a signal from bi-stable circuit 42. Bi-stable circuit 42 is set to "subtract" by a program selection signal supplied to gate 256 by way of program lead **125*b*. In the overflow sensing circuit, gates 342, 344, 346 and 348 are active instead of gates 324, 326, 328 and 338. In the subtraction operation the minuend is placed in the accumulator master rank 14. The subtrahend is read into the input register 10. A "begin" signal is supplied to multivibrator 101 and the circuits will operate in exactly the same sequence that was followed during the addition function. The difference in the operation is that an overflow will be indicated if the minuend is positive and the subtrahend is negative and the output of the adder-subtracter 40 is negative. It can be seen by inspection that the occurrence of a negative sign in the adder-subtracter 40 under these circumstances is an indication that an overflow has occurred for the subtraction of a negative number from a positive number cannot result in a negative number. Similarly, if the minuend is negative and the subtrahend is positive and the sign from adder-subtracter 40 is positive, an overflow is again indicated. If the signs of the minuend and subtrahend** are alike, there is no need to sense overflow for if one number less than one is subtracted from another number less than one, the sum can never be greater than one.

*Multiplication*

The multiplication function is performed in the following manner. Energization of the multiplication program lead 124 results in the following changes in the circuit. "And" gate 142 is conditioned to pass a signal. However, inverter 144 prevents "and" gate 141 from passing a signal. Also in Fig. 1C, gates 195, 186, 166, 210 and 212 are conditioned to pass signals by energization of multiplication lead 124. It will be remembered that gates 210 and 212 are a pair of alternative gates which will permit either gate 192 or gate 193 to be operative but not both at the same time. In addition to the gates mentioned above, gate 191 and buffers 184, 163 and 150 will be operative during the multiplication process. In the circuit of Fig. 1B a signal on multiplication lead 124 will condition gate 252, associated with add-subtract bi-stable circuit 42, to pass a signal upon the occurrence of a second signal from multivibrator 101. This signal from gate 252 will cause the add-subtract flip-flop 42 to be set to the add position. It will be seen later that in the final cycle of the multiplication operation, add-subtract flip-flop 42 is reset to the subtract position. This occurs as a result of the signal supplied by "and" gate 264. At the end of each cycle of operation, "and" gates 296 and 300 are conditioned to pass a signal upon the occurrence of appropriate signals from bi-stable circuit $\mathbf{18}_{(1)}$ of the step counter slave rank 18. Bi-stable circuit $\mathbf{18}_{(1)}$ will register a "zero" for all cycles except the last cycle. Therefore gate 300 will normally provide an output signal which will permit recycle gate 119 to pass a signal from multivibrator 106 to multivibrator 102. On the final cycle bi-stable circuit $\mathbf{18}_{(1)}$ will register a "one" which will cause gate 296 to pass a signal to the "end of operation" gate 120 by way of "or" gate 236. At the same time the recycle gate 119 will be blocked owing to the absence of a signal from "and" gate 300. A count of the number of steps performed during the multiplication cycle and the selection of the multiplier digit is provided by inserting a "one" in bi-stable circuit $\mathbf{20}_{(20)}$ in step counter master rank 20. This "one" is inserted by way of gate 281 upon the occurrence of a signal from multivibrator 101. Energization of the multiplication lead 124 also provides one of the four necessary input signals to "and" gate 386 associated with the auxiliary bi-stable circuit **14*a***.

In performing the multiplication operation it is necessary that the multiplier be placed in the multiplier-quotient-output register 16 and that the multiplicand be placed in the input register 10. As mentioned earlier, the multiplier may already be present in the output register as a result of previous operation of the computer. If it is not so present, it should be read into this register by an addition step in the manner described above. It is to be understood that this addition step should take place before the computer is set to perform a multiplication function by energization of the multiplier program leads 124.

With the multiplier in the multiplier-quotient-output register 16 and the multiplicand in the input register 10, the begin signal may be supplied to multivibrator 101. A signal at output **101*b* of multivibrator 101** causes the following changes to take place. The adder-subtracter bistable circuit 42 is set to add, which sets adder-subtracter 40 to the add position. Gate 281 inserts a "one" in bi-stable circuit $20_{(20)}$ in the step counter master rank 20. The signal from buffer 146, associated with multivibrator 101, permits the "jam" transfer of the sign digit of the multiplier from bi-stable circuit $16_{(1)}$ to the auxiliary sign bi-stable circuit 372 by way of "and" gate 374. As mentioned above, this bi-stable circuit 372 is not cleared when output register 16 is cleared.

Three different cycles of operation are performed during the multiplication process. The first cycle follows one schedule, the second to the nineteenth cycles follow a second schedule and the twentieth cycle follows still a different schedule. During the first step of all twenty cycles, a signal from multivibrator 102 actuates clearing circuits 12*c* and 18*c* by way of buffer 150. This causes the two slave ranks of the arithmetic section to be cleared.

A signal from multivibrator 103 during the first cycle energizes gate circuit 72 by way of buffer 163. Energization of gate circuit 72 causes the "one" which is present in bi-stable circuit $20_{(20)}$ of the step counter master rank 20 to appear also at bi-stable circuit $18_{(20)}$ in step counter slave rank 18. The signal from multivibrator 103 also causes gate 166 to provide an output signal. The signal on multiplication program selection lead 124, the signal from gate 166 and the signal from the "one" side of bi-stable circuit $20_{(20)}$ all combine to cause "and" gate 384 to provide an output signal. A signal at the output of gate 384 causes the bi-stable circuit $12_{(2)}$ in the accumulator slave rank 12 to be set to register a "one." This "one" is inserted on the first cycle only. Its function is to cause the circuit to round off the final number in the desired manner. This will be explained in more detail presently. The insertion of the round-off digit from gate 384 is limited to the first cycle by reason of the fact that a "one" will be present in bi-stable circuit $20_{(20)}$ only during the first cycle of operation. It should be remembered that all other digits in the accumulator slave rank 12 will be "zero" for the reason that this slave rank was just cleared by the signal from multivibrator 102.

A signal from multivibrator 104 causes accumulator master rank 14 and step counter master rank 20 to be cleared as a result of a signal at the output of buffer 184. Gate 186 does not provide an output signal except on the final cycle of the multiplication program. The multiplication process proceeds as a series of steps in which a first partial product of the first or least significant digit of the multiplier and the multiplicand is added to the round-off digit and the first partial sum stored in the accumulator. A second partial product is then formed of the second multiplier digit and the multiplicand. This second partial product is added to the first partial sum to provide a second partial sum. If the multiplier digit in any step is "zero," then the partial product corresponding to that digit will be "zero." The addition of "zero" to the previously accumulated partial products will result in the same sum and no carry ripple is possible. Therefore, if the multiplier digit is "zero," the output of multivibrator 104 is applied directly to the input of multivibrator 106 by way of gates 110 and 112. However, if the multiplier digit is "one," it is possible that a carry ripple will take place. To allow time for this ripple, the output of multivibrator 104 is applied to the input of delay multivibrator 105 through gate 114 and the output of delay multivibrator 105 is caused to actuate multivibrator 106.

The position of the "one" in step counter slave rank 18 determines the location of the multiplier digit then being employed to develop a partial product. For example, on the first step when the least significant multiplier digit, i.e. the digit registered in bi-stable circuit $16_{(20)}$, is being employed, a "one" will be registered in bi-stable circuit $18_{(20)}$ of step counter slave rank 18. The second and all successive multiplier digits are selected by moving the "one" in the step counter slave rank 18 in the direction of the more significant digits, i.e. in the direction of bistable circuit $18_{(1)}$. The value of the selected multiplier digit is sensed by gate circuit 62. It will be remembered that gate circuit 62 is a series of twenty "and" gates having inputs connected to corresponding pairs of bi-stable circuits in output register 16 and step counter slave rank 18. Since there is only one "one" registered in step counter slave rank 18 at any one time, gate circuit 62 will have an output signal only if the selected multiplier digit is "one." It will have no output signal if the selector multiplier digit is "zero." This output signal indicating that the multiplier digit equals "one" will be applied by way of "or" gate 66 to a second input of "and" gate 212. Inverter 214 prevents a signal from being present at the output of "and" gate 210. Since no signal is present at the output of "and" gate 210, "or" gate 116 cannot supply a signal to inverter 118. In the absence of a signal to the inverter 118, the output of this inverter will be at a high potential. This high potential conditions "and" gate 114 to pass a signal from multivibrator 104. The absence of a signal from "or" gate 116 prevents "and" gate 110 from passing a signal directly from multivibrator 104 to multivibrator 106. If the multiplier digit corresponding to the "one" in the step counter slave rank 18 had been "zero," there would be no output from "and" gate 212. However, inverter 214 would cause an output to be present from "and" gate 210. The signal from "and" gate 210 would cause "and" gate 110 to be conditioned to pass a signal, but inverter 118 would have no signal at its output and "and" gate 114 would be incapable of passing a signal.

If the multiplier digit is "one" and a signal appears at the output of "and" gate 212, a signal will be supplied by way of "or" gate 230 to one input of "and" gate 192. If a multiplier digit is "zero," the signal from "and" gate 210 will be supplied by way of "or" gate 202 to one input of "and" gate 193. A signal from multivibrator 106 on the first cycle of operation causes the following operations to take place. The signal from "and" gate 195 causes the "one" present in step counter slave rank $18_{(20)}$ to be transferred to bi-stable circuit $20_{(19)}$ by way of gate circuit 70. Note that this transfer is down and one digit to the left of the original position of the "one" inserted in the step counter master rank 20. Assuming that the multiplier digit is "one," the signal from multivibrator 106 will cause "and" gate 192 to supply a signal to gate circuit 44 of Fig. 1A. Gate 144 will then transfer the sum from adder-subtracter 40 to the accumulator master rank 14. This first sum will be equal to the multiplicand plus the round-off digit which was originally inserted in the accumulator slave rank 12. This number present in the accumulator master rank 14 is the first partial sum. Also, if the sign of the number in the input register is negative and if there is a carry of "zero" in the adder, subtracter, a "one" will be injected into the bi-stable circuit 14*a* which is the auxiliary sensing bi-stable circuit of the accumulator master rank 14. This "one" is retained as the sign of the first partial sum as this partial sum is shifted right during the next cycle. It should be noted that the gating circuits associated with auxiliary bi-stable circuits 12*a* and 14*a* are made necessary by the fact that the addition of the round-off digit at the beginning of the multiplication operation may cause a positive partial sum to be registered in the accumulator even though the multiplicand in input register 10 is negative and all partial products are negative since the multiplier is assumed to be positive. For example, if the number in the input register 10 has a value less than one-half and is negative, the first partial product will be less than one-half and will be negative. However, the round-off digit added to bi-stable circuit $12_{(2)}$ has a value of $+\frac{1}{2}$. Therefore the sum of this round-off digit and the first partial product will be positive. The addition of a second negative partial product to the first partial sum may cause the new partial sum to become negative. On the other hand, if the multiplicand is greater than one-half and is negative, the sum of the first partial product and the round-off digit may be negative. It will be found that the gating circuit associated with flip-flops 12*a* and 14*a* are arranged to maintain the correct sign of a partial sum under both of these conditions.

If the multiplier digit was "zero" instead of "one," gate 192 has no output but gate 193 has an output. The signal from gate 193 causes the number present in the accumulator slave rank 12 to be transferred to the accumulator master rank 14. Again this represents the first partial sum of a partial product of "zero" and the round-off digit present in accumulator slave rank 12. It will be remembered that in binary arithmetic the partial product can have only one of two values, a value of "zero" if the multiplier digit is "zero" or a value equal to the multiplicand if the multiplier digit is "one." Therefore it is not necessary to perform any actual multiplication step. The multiplicand is merely added to the old partial sum, shifted one place to the right, to obtain the new sum if the multiplier digit is "one," or the old partial sum, shifted one place to the right is taken as the new partial sum if the multiplier digit is "zero."

As mentioned earlier, on the first nineteen cycles the recycle gate 119 is energized, which permits the signal from multivibrator 106 to be supplied to the input of multivibrator 102 so that additional cycles may take place. On the second cycle the signal from multivibrator 102 will cause accumulator slave rank 12 and step counter slave rank 18 to be cleared. A signal from multivibrator 103 will cause "and" gate circuit 72 to be energized which will result in the transfer of the "one" from bi-stable circuit $20_{(19)}$ to bi-stable circuit $18_{(19)}$. The signal from multivibrator 103 also causes gate 166 to provide an output signal. Gate 166 causes "and" gate circuit 36 to transfer the first partial sum from accumulator master rank 14 to the accumulator slave rank 12 with a one digit right shift. If a "one" is present in auxiliary bi-stable circuit 14*a*, this "one" will be transferred to auxiliary bi-stable circuit 12*a* and to bi-stable circuit $12_{(1)}$. Upon the occurrence of a signal at the output of multivibrator 104, the accumulator master rank 14 and the step counter master rank 20 will be cleared by a signal supplied by way of buffer 184. Again if the multiplier digit is "one," gate 114 will be operative and gate 110 will be inoperative.

Upon the occurrence of a signal from multivibrator 106 gate circuit 70 will be energized by a signal from "and" gate 195 and the "one" present in bi-stable circuit $18_{(19)}$ will be transferred to bi-stable circuit $20_{(18)}$ in step counter master rank 20. Again this is a one digit left shift. If the second multiplier digit is a "zero," the second partial product will be a "zero." If the second multiplier digit is a "one," the second partial product will be equal to the multiplicand. Therefore to obtain the new partial product it is only necessary either to add "zero" to the shifted first partial sum now in the accumulator slave rank 12 or to add the multiplicand to the shifted first partial sum. If the multiplier digit is a "one," gate 192 provides an output signal which causes gate circuit 44 to transfer the sum from adder-subtracter 40 to the accumulator master rank 14. This sum will be the sum of the shifted first partial sum and the multiplicand since input register 10 and accumulator slave rank 12 are always connected to adder-subtracter 40. The signal now present in the accumulator master rank 14 is now the sum of the first and second partial products and the round-off digit. If a "one" is present in auxiliary bi-stable circuit 12*a*, this "one" is transferred to auxiliary bi-stable circuit 14*a* by way of gate 368.

If a multiplier digit is "zero," gate 192 does not provide an output signal but gate 193 does provide an output signal. The signal from gate 193 causes the number in accumulator slave rank 12 to be transferred to the accumulator master rank 14 by way of gate circuit 34. Transfer of the number in the accumulator slave rank 12 to the accumulator master rank 14 is the same as adding "zero" to the number in the accumulator slave rank 12 and transferring the sum to the accumulator master rank 14.

In the twenty digit computer assumed in Figs. 1A, 1B and 1C, the cycle of operation just described will be repeated seventeen more times taking each multiplier digit in turn.

On the final or twentieth cycle the following schedule will be followed. The signal from multivibrator 102 causes accumulator slave rank 12 and step counter slave rank 18 to be cleared as before. The signal from multivibrator 103 transfers the "one" which is now present in step counter master rank bi-stable circuit $20_{(1)}$ to bi-stable circuit $18_{(1)}$. The "one" in bi-stable circuit $18_{(1)}$ and the signal from buffer 163 causes an output signal to be present at "and" gate 264 in the upper right hand corner of Fig. 1B. The signal from "and" gate 264 sets the add-subtract bi-stable circuit 42 to the "subtract" position. This sets adder-subtracter 40 to the "subtract" condition. The signal from "and" gate 166 of Fig. 1C causes gate circuit 36 of Fig. 1A to transfer the partial sum in the accumulator master rank 14 to the accumulator slave rank 12 with a one digit right shift. Again, if a "one" is present in bi-stable circuit 14*a* it will be transferred to bi-stable circuit 12*a*.

A signal from multivibrator 104 energizes the clearing circuits 14*c* and 20*c* associated with accumulator master rank 14 and step counter master rank 20. Since a "one" is present in bi-stable circuit $18_{(1)}$, a signal is present at the output of gate 186 of Fig. 1C. The signal from gate 186 actuates clearing circuit 16*c* which clears the multiplier-quotient-output register 16. It will be remembered that the twentieth digit in the multiplier is the sign digit which was "jam" transferred to bi-stable circuit 372. For this reason it is possible to clear the output register 16 at this time.

If this sign digit is a "one," the "one" present in bi-stable circuit $18_{(1)}$ will cause a signal to be present at the output of "and" gate 376. A signal at "and" gate 376 will also appear at the output of "or" gate 66. It will be remembered that it was at this point that the "multiplier equals one" signal appeared. Again, if there is a signal at the output of "or" gate 66, "and" gate 114 is conditioned for conduction but gate 110 is inoperative. If the sign digit of the multiplier is "zero," then no signal will appear at the output of "and" gate 376 and the signal from multivibrator 104 will be applied through "and" gate 110 to the input of the multivibrator 106.

If there is a "one" registered in bi-stable circuit 372, that is if the multiplier is negative and expressed in two's complement form, the signal from "or" gate 66 will cause "and" gate 212 of Fig. 1C to produce an output signal. This causes a signal to appear at the output of "and" gate 192. "And" gate 192 causes gate circuit 44 of Fig. 1A to transfer the difference of the signal in the accumulator slave rank 12 and the input register 10 to the accumulator master rank 14. This subtraction step is made necessary by the fact that a negative multiplier is expressed in two's complement form. The signal now present in accumulator master rank 14 is the final product. This final product will be in two's complement form if either the multiplier or the multiplicand is negative but not if both are positive or both are negative.

If the digit registered in multivibrator 372 is "zero," that is, the multiplier is positive, the absence of a signal from gate 66 will cause a signal to appear at the output of inverter 214 of Fig. 1C. The signal from inverter 214 and from the multiplication program selection lead 124 causes "and" gate 210 to produce an output signal. No signal will be supplied by "and" gate 212. In this case gate circuit 44 is not actuated but gate circuit 34 is actuated. This transfers the contents of the accumulator slave rank 12 directly to the accumulator master rank 14 to form the final product.

The presence of a "one" in bi-stable circuit $18_{(1)}$ causes a signal to appear at the output of "and" gate 296 in the "end of operation" gates of Fig. 1B. This signal actuates "and" gate 191 of Fig. 1C and the signal from "and" gate 191 actuates gate circuit 50 of Fig. 1A. This transfers the contents of the accumulator master rank 14 to the previously cleared output register 16. The bi-stable circuit $18_{(1)}$ no longer registers a "zero" and this prevents "and" gate 300 from generating a signal. This inactivates the recycle "and" gate 119.

The following examples are given by way of further explanation of the operation of the multiplication function of the computer. In the following example a computer having five digits including one sign digit will be assumed in order to reduce the length of the example. The operation of a twenty digit computer will proceed in exactly the same manner. The following problem is assumed.

Problem:

To multiply $-\frac{3}{8}\times\frac{7}{16}=-\frac{21}{128}$
In binary form $\frac{3}{8}=0.0110$
$\frac{7}{16}=0.0111$
Two's complement of $\frac{3}{8}=1.1010$ The problem will first be solved by multiplying the two numbers together in straight binary form, as shown in Example 1 below:

EXAMPLE 1

```
      0.0110
      0.0111
      ------
      0 0110
     00 110
    001 10
   0000 0
  0 0000
  ----------
  0.0010,1010
       1000   roundoff
  0.0011
```

$$0.0010{,}1010=\frac{1}{8}+\frac{1}{32}+\frac{1}{128}=\frac{21}{128}$$

1000 roundoff $$0.0011=\frac{1}{8}+\frac{1}{16}=\frac{24}{128}$$

Note that, in rounding off to four digits to the right of the binary point, a "one" is added to the fifth place. If the fifth place of the sum is a "one," a carry of "one" will be transferred to the fourth place to the right of the binary point. If the fifth place of the sum is "zero," no carry will be propagated to the fourth place. This is the convention which is usually assumed in rounding off binary numbers.

Example 2 illustrates the operation of a computer in which the $-\frac{3}{8}$ is the multiplicand and is expressed in two's complement form and in which the $\frac{7}{16}$ is the multiplier.

EXAMPLE 2

```
             1.1010
         ×   0.0111
             ------
             1.1010=first PP
             1     =round off
             ------
Carry=1      0.0010=first PS (positive)

             0.0001=shifted PS
             1.1010=2nd PP
             ------
Carry=0     01.1011=2nd PS (negative)

             1.1101=shifted 2PS (sign digit from 14a)
             1.1010=3rd PP
             ------
            11.0111=3 partial sum

             1.1011=shifted 3 partial sum
             0.0000=4 partial product
             ------
            11.1011=4 partial sum
```

EXAMPLE 2—Continued 1.1101=shifted 4 partial sum MP=0
so
1.1101=Final product (two's complement form)

$$\begin{array}{r}2.0000\\-1.1101\\\hline 0.0011\end{array}=-\left(\frac{1}{8}+\frac{1}{16}\right)=-\left(\frac{16+8}{128}\right)=-\frac{24}{128}$$

The example shows the addition of the round-off digit in the most significant place of the first partial sum. The subsequent shifting of this partial sum to the right will cause the round-off digit to move from the first place to the right of the binary point to the fifth place to the right of the binary point. Therefore the round-off digit in the computer eventually assumes the same position as the round-off digit in Example 1. Example 2 also illustrates the operation of the gates associated with bi-stable circuits 12*a* and 14*a*. The first partial sum is positive and results in a carry of "one" from adder-subtracter 40. A carry of "one" prevents gate 386 from having an output signal and bi-stable circuit 14*a* is left in its "zero" state. This "zero" is transferred to bi-stable circuit $12_{(1)}$ at the first actuation of gate circuit 36. A "zero" in bi-stable circuit $12_{(1)}$ indicates that the first partial sum is positive. On the second partial sum there is no carry so that a carry of "zero" is indicated by adder-subtracter 40. The carry of "zero" causes a "one" to be injected in bi-stable circuit 14*a*. The injection of a "one" at this point indicates that the second partial sum has become negative. That is, the sum of the first partial product and the second partial product is greater than the round-off digit. It will be noted that the final product has the same value as the rounded off product of Example 1 except that it is expressed in two's complement form. The reason that the product is expressed in two's complement form is that the multiplicand was negative while the multiplier was positive so that the product is negative.

Example 3 given below illustrates the operation of a computer when the positive $\frac{7}{16}$ is taken as the multiplicand and the negative $\frac{3}{8}$ is taken as the multiplier.

EXAMPLE 3

```
     0.0111
  ×  1.1010
     ------
     0.0000 =first partial product
     0.1000 =round off digit
     ------
     0.1000 =first partial sum

     0.0100 =shifted first partial sum
     0.0111 =2nd partial product
     ------
     0.1011 =2nd partial sum

     0.0101 =shifted 2nd partial sum
     0.0000 =3rd partial product
     ------
     0.0101 =3rd partial sum

     0.0010 =shifted 3rd partial sum
     0.0111 =4th partial product
     ------
     0.1001 =4th partial sum

     0.0100 =shifted 4th partial sum
     0.0111 =subtract (MP=1)
     ------
     1.1101 =final product (two's complement form)
```

Since the sign digit in bi-stable circuit $10_{(1)}$ is always "zero" indicating a positive number, all partial products will be positive. Therefore there can never be a signal at the output of "and" gate 386. Example 3 also illustrates the fact that since the multiplier is negative and a "one" appears in bi-stable circuit $16_{(1)}$, the final step in the process is the subtraction of the multiplicand from the shifted fourth partial sum. Again, this subtraction step is made necessary by the fact that the multiplier was expressed in two's complement form. The result as shown at the bottom of the Example 3 is the same answer arrived at in Examples 1 and 2. Again, the final product is expressed in two's complement form. A multiplication of two negative numbers or two positive numbers will be similar to the examples given above except that the final product will be expressed in straight binary form since the final product is positive.

*Division*

The division function is performed in nineteen steps instead of the twenty steps of the multiplication function. The division function proper is preceded by a one-step overflow sensing function which may be omitted by placing the overflow check switch 288 in the upper position. The complete 20 cycles of operation including the first or overflow sensing cycle will be described. At the end of the description the effect of placing switch 288 in the up position will be explained.

To begin the division process, the dividend is placed in the accumulator master rank 14. Again this may be done by clearing the accumulator of information and introducing the dividend in the input register and programming the computer to perform an addition step. With the dividend in the accumulator master rank 14, the divisor is read into the input register 10. The division program lead 122 is then energized and the "begin" signal is supplied to input 101*a* of multivibrator 101.

The signal from multivibrator 101 causes signals to appear at the output of buffer 146 and gate 141. The signal from buffer 146 causes "and" gate 284 to insert a "one" in bi-stable circuit $20_{(1)}$ of the step counter master rank 20. The signal from buffer 146 is also supplied to the sign comparison gates 257 and 258 in the upper right hand corner of Fig. 1B. The bi-stable circuits $10_{(1)}$ and $14_{(1)}$ are also connected to gates 257 and 258. If the signs of the dividend and the divisor are alike, no output signal will be provided by either gate 257 or gate 258 and a signal will appear at the output of inverter 262. This signal will set add-subtract bi-stable circuit 42 to the "subtract" state. If the signs of the divisor and dividend are unlike, one or the other of gates 257 and 258 will have an output signal. A signal from either of these two gates will cause a signal to appear at the output of "or" gate 260. This signal will set the add-subtract bi-stable circuit 42 to the "add" state.

The signal from "and" gate 141 of Fig. 1C is supplied to clearing circuit 16*c* and clears the output register 16.

A signal from multivibrator 102 causes buffer 150 to have an output signal. This signal is supplied to clearing circuits 12*c* and 18*c* which clear the accumulator slave rank 12 and the step counter slave rank 18, respectively.

The signal from multivibrator 103 causes buffer 163 to have an output signal. The signal from buffer 163 activates gate circuit 72 of Fig. 1A and transfers the "one" from bi-stable circuit $20_{(1)}$ to bi-stable circuit $18_{(1)}$. As usual, the "one" also remains in bi-stable circuit $20_{(1)}$. The "one" registered in bi-stable circuit $20_{(1)}$ and the signal on division lead 122 cause "and" gate 180 of Fig. 1C to provide an output signal. This output signal and the signal from multivibrator 103 cause "and" gate 164 to have an output signal. The signal from gate 164 in Fig. 1C activates gate circuit 32 of Fig. 1A and transfers the divident from accumulator master rank 14 to accumulator slave rank 12.

The signal from multivibrator 104 causes buffer 184 to have an output signal. This signal is supplied to clearing circuits 14*c* and 20*c* which clear accumulator master rank 14 and step counter master rank 20, respectively. The sign of the dividend in the accumulator slave rank 12 is compared with the sign of the sum or difference of the dividend in the accumulator slave rank 12 and the divisor in input register 10. This comparison takes place in the sign comparison circuit comprising gates 316, 318 and 310 in the upper left hand corner of Fig. 1B. It will be seen from Fig. 1B that "no overflow" will be indicated under the following conditions:

| Dividend | Divisor | Add or Subtract | Sum or Difference |
|---|---|---|---|
| + | − | Add | − |
| + | + | Subtract | − |
| − | + | Add | + |
| − | − | Subtract | + |

It will be noted that each of these four conditions indicates that the divisor is larger than the dividend. If the divisor is larger than the dividend, the quotient must be less than "one." It should be noted that it is only necessary to compare the sign of the sum or difference from adder-subtractor 40 with the sign of the dividend. If they are unlike there will be no overflow.

Since no signal is ever supplied to the input of inverter 118 during the division process, "and" gate 114 is always operative and "and" gate 110 is always inoperative. Therefore the signal from multivibrator 104 triggers multivibrator 105 and multivibrator 105, in turn, triggers multivibrator 106. This provides a long delay in case there is a borrow or a carry ripple during the addition or subtraction processes which form a part of the division program.

If there is an overflow present as indicated by the absence of a signal at the output of "or" gate 310, there will be no signal at the output of "and" gate 308. The absence of a signal from "and" gate 308 causes inverter 311 to have an output signal. This output signal, together with the "one" registered in bi-stable circuit $18_{(1)}$ causes "and" gate 312 to have an output signal. The signal from "and" gate 312 and the signal from multivibrator 106 causes "and" gate 191 to provide a signal. "And" gate 191 causes gate circuit 50 to be energized. Initially there is no signal present in the accumulator master rank 14. However, at the same time that gate circuit 50 is activated, the "one" from bi-stable circuit $18_{(1)}$ and the signal on division program selection lead 122 causes "and" gate 222 in the upper left corner of Fig. 1C to have an output signal. This signal and the signal from multivibrator 106 produce a signal at the output of gate 193. Gate 193 activates gate circuit 34 of Fig. 1A. Thus the dividend present in the accumulator slave rank 12 is transferred from slave rank 12 to the accumulator master rank 14 and from there to the output register 16 through gate circuit 50. The absence of a signal from gates 306 and 308 in Fig. 1B prevents a recycle signal from being supplied to recycle gate 119. Gate 294 requires a "one" signal from bi-stable circuit $18_{(20)}$ in order to generate an output signal. This "one" is not present until the last division cycle. Therefore no end of operation signal will be generated until then. This of course brings the operation of the computer to a stop in the same manner that it did during the add and subtract functions. It also leaves the dividend in the accumulator master rank 14 and the output register 16, and the divisor in the input register 10, the positions these numbers occupied before the "begin" signal was given.

If there is no overflow, gate 308 will have all three inputs energized and will provide an output signal. This will prevent inverter 311 from having an output signal and "and" gate 191 of Fig. 1C is not energized. Therefore there will be no transfer of the dividend from the accumulator master rank 14 to the output registers 16. Gate 193 will still be actuated so that the dividend is transferred from the accumulator slave rank 12 to the accumulator master rank 14. Inverter 200 is energized on multiplication only. In all of the division cycles it provides an output signal to gate 194. Therefore the signal from inverter 200 and from multivibrator 106 will cause "and" gate 194 to have an output signal. The signal from "and" gate 194 causes the "one" present in step counter slave rank 18 to be transferred to step counter master rank 20 with a one digit right shift. Since the "one" is located in bi-stable circuit $18_{(1)}$, it will be transferred to bi-stable circuit $20_{(2)}$ in step counter master rank 20. During the first cycle gate circuit 56 is held inoperative by the one present in bi-stable circuit $18_{(1)}$. "And" gate 380 is held inoperative by the "zero" signal in bi-stable circuit $18_{(20)}$.

A signal from "and" gate 308 will be applied through "or" gate 290 to the recycle gate 122, and the division process per se will be started.

The next eighteen cycles of the division function follow the following sequence:

A signal from multivibrator 102 causes accumulator slave rank 12 and step counter slave rank 18 to be cleared. The signal from multivibrator 103, acting through buffer 163, transfers the "one" from the step counter master rank 20 to the step counter slave rank 18. On the second cycle of operation this "one" will be in bi-stable circuit $20_{(2)}$. In the third cycle it will be in bi-stable circuit $20_{(3)}$ etc. It will be transferred to the corresponding bi-stable circuit in step counter slave rank 18 with no shift. The "zero" present in bi-stable circuit $20_{(1)}$ causes a signal to appear at the output of gate 182 of Fig. 1C. No signal will appear at the output of the alternative gate 180. The signal from gate 182 is supplied through "or" gate 172 to "and" gate 165. A signal from gate 165 actuates gate circuit 30 of Fig. 1A which transfers the dividend in the accumulator master rank 14 to the accumulator slave rank 12 with a one digit left shift. The sign digit, which appeared in bi-stable circuit $14_{(1)}$ of the accumulator master rank 14, will be transferred to the auxiliary bi-stable circuit 12*a* through gate circuit 30.

The signal from multivibrator 104, acting through buffer 184, causes accumulator master rank 14 and step counter master rank 20 to be cleared.

In response to the signal from multivibrator 106 the following functions are performed. The sign of the trial remainder in the adder-subtractor 40 is compared with the sign digit present in bi-stable circuit 12*a*. This comparison is made in gates 350 and 352 of Fig. 1B. If the subtracter bistable circuit 42 is set to subtract and the signs are alike, this indicates that the trial divisor does not exceed the dividend or partial remainder from which it is subtracted. As in regular division, this condition is indicated by introducing a "one" in the appropriate position in the quotient. This is accomplished by way of gate circuit 56. Gate 56 receives one input from "and" gate 196, a second from the "zero" side of bi-stable circuit $18_{(1)}$ which is now set to "zero" and the third input from "or" gate 360. A signal from gate 56 actuates gate circuit 54 and transfers the "one" which is in slave rank 18 to the multiplier-quotient-output register 16. On the first division cycle following the overflow sensing cycle the "one" will be transferred from bi-stable circuit $18_{(2)}$ to bi-stable circuit $16_{(2)}$. It should be noted that the same result would follow if the add-subtract bi-stable circuit 42 was set to "add" and the signs in the output of adder-subtracter 40 and in bi-stable circuit 12*a* are unlike. It can be shown that this also indicates that the divisor is less than the portion of the dividend from which it is subtracted and that a "one" should be entered in the quotient.

Assuming that the add-subtract bi-stable circuit 42 is set to subtract and that a sign from adder 40 and bi-stable circuit 12*a* are alike, the new partial remainder in the adder-subtracter 40 is transferred to accumulator master rank 14 through gate circuit 44. This is accomplished in the following manner. Gate 306 of Fig. 1B receives signals from the "zero" side of bi-stable circuits $18_{(1)}$ and $18_{(20)}$. Since both of these bi-stable circuits are set to "zero" for all but the first and last cycles, "and" gate 306 will have an output signal on all but the first and last cycles. The output signal of "and" gate 306 is supplied to the inputs of the alternative gates 224 and 226 at the top of Fig. 1C. The signal from the output signal of inverter 220 indicating like signs is supplied to the input of gate 226. The signal from gate 226 passes through "or" gate 230 and causes "and" gate 192 to provide the necessary output signal to gate circuit 44. This ends the cycle for the development of a "one" in the quotient.

Suppose now that the sign digit of the adder-subtracter 40 and the digit in bi-stable circuit 12*a* are unlike, and that bi-stable circuit 42 is set to the subtract state. Now no signal will be passed by gates 356 and 358. Therefore gate 356 will not provide a signal and a "zero' will be left in the bi-stable circuit of multiplier quotient output register 16. This indicates that the trial divisor is larger than the dividend or the partial remainder from which it is subtracted. The fact that the signs of the trial remainder and the digit in bi-stable circuit 12*a* are unlike causes gate 224 to be actuated. Gate 224 actuates gate 193. This transfers the old partial remainder in the accumulator slave rank 12 back to the accumulator master rank 14 through gate 34. It will be remembered that the partial remainder is transferred from accumulator master rank 14 to accumulator slave rank 12 with a one digit left shift. This one digit shift is equivalent to multiplying the partial remainder by two or to dividing the trial divisor by two on each cycle. The partial remainder is transferred back to accumulator master rank 14 from accumulator slave rank 12 with no shift. The trial remainder appearing at the output 40*c* of adder-subtracter 40 is ignored if the sign digit of the adder-subtracter 40 and the sign digit of bi-stable circuit 12*a* are different. This completes a cycle for the development of a "zero" in the quotient.

The quotient is built up step by step by transferring "ones" from the step counter slave rank 18 to the quotient register 16 if the trial divisor is less than the partial remainder for that particular cycle, or by leaving the bi-stable circuit in the multiplier-quotient output register 16 at "zero" if the trial divisor exceeds the partial remainder for that cycle. It should be remembered that register 16 is never cleared during the division program and that transfer is by "ones only" so that even though gate circuit 54 connects all of the bi-stable circuits in step counter slave rank 18 to multiplier-quotient output register 16, only the one bi-stable circuit in step counter slave rank 18 having a "one" therein will cause a change in the bi-stable circuits of output register 16.

The signal from "and" gate 306 on steps 2 through 19 activates the recycle gate 119 permitting the division operation to continue.

The final cycle of the division function follows the following schedule. The first three steps in response to the signals from multivibrators 102, 103 and 104 are the same as for cycles 2 through 18. The signal from multivibrator 102 causes accumulator slave rank 12 and step counter slave rank 18 to be cleared. The signal from multivibrator 103 acting through buffer 163 transfers the "one" which is now in bi-stable circuit $20_{(20)}$ to bi-stable circuit $18_{(20)}$. Gate 165 also produces an output signal which transfers the partial remainder which is present in the accumulator master rank 14 to the accumulator slave rank 12 with a one digit right shift. The transfer is made through gate circuit 30. In response to the signal from multivibrator 104, accumulator master rank 14 and step counter master rank 20 are cleared.

In response to the signal from multivibrator 106 the following operations take place. Since a "one" is present in the bi-stable circuit $18_{(20)}$ in step counter slave rank 18, a signal will be supplied to the input of "and" gate 380. A second signal will be supplied to gate 380 from gate 196 of Fig. 1C. The third input to gate 380 comes from the "add" side of the add-subtract bi-stable circuit 42. If these three inputs are energized, a "one" will be injected into the bi-stable circuit $16_{(1)}$ which is the sign bi-stable circuit of the output register. This "one" indicates that the quotient appearing in output register 16 is negative. It will be remembered that the add bi-stable circuit 42 is set to the add position only if the dividend and the divisor have unlike signs. If the dividend and the divisor have unlike signs the quotient must be negative. If the dividend and divisor have like signs the third input to gate 380 is not energized, no signal appears at the output of this gate and a "zero" is left in the sign bi-stable circuit of output register 16. The sign digit of adder-subtractor 42 will be compared with the digit in bi-stable circuit 12a on the final step also. If adder-subtracter 40 is set to add and the digits are unlike or if the adder-subtracter 40 is set to subtract and the sign digits are alike, gate 56 will be energized and a "one" will be introduced in bi-stable circuit $16_{(20)}$ of multiplier quotient output register 16. If the signs are not as mentioned above, this indicates that the final trial divisor is larger than the last partial remainder and that a "zero" should appear in the last (least significant) place of the quotient.

Since the bi-stable circlit $18_{(20)}$ is no longer set to "zero", there will be no output signal from gate 306 and recycle gate 119 will be inoperative. The "one" which is now present in bi-stable circlit $18_{(20)}$ will cause an output signal at gate 294. This output signal, operating through "or" gate 236, actuates 191 and 120. Gate 120 provides the "end of operation" signal and gate 191 transfers the quotient from output register 16 to accumulator master rank 14.

It should be noted that this transfer is in the direction opposite to the one taking place in the multiplication process. In the multiplication process the product appeared in the accumulator master rank 14 and was copied in the output register 16. In the division process the quotient is generated in quotient register 16 and the quotient is then copied in accumulator master rank 14 so that it can be used in further operations of the computer if desired. The quotient will also remain in output register 16 where it may be read out to a memory section or output circuit through gate 60.

The example shown below will illustrate some of the steps just described.

EXAMPLE

To divide 3/16 by 3/4=1/4
In binary form 3/16=0.0011=dividend
3/4=0.1100=divisor (Cycle 1)

| | |
|---|---|
| Dividend | 0.0011 |
| Subtract divisor | 0.1100 |
| Difference | 1.0111 |

Signs unlike so no overflow (Cycle 2)

Digit in 12a=0

| | |
|---|---|
| Dividend shifted one place left | Ø0.0110 |
| Trial divisor | 0.1100 |
| First trial difference | 1.1010 |

Sign of adder-subtractor and 12a unlike so enter a "zero" in quotient
Quotient=0.0XXX (Cycle 3)

| | |
|---|---|
| Dividend shifted left 1+1=2 places left | Ø0.1100 |
| Trail divisor | 0.1100 |
| 2nd trial difference | 0.0000 |

Signs alike so enter "one" in quotient
Quotient=0.01XX (Cycle 4)

| | |
|---|---|
| 2nd trial difference shifted left one place | Ø0.0000 |
| Trial divisor | 0.1100 |
| Third trial difference | 1.0100 |

Signs unlike so enter "zero" in quotient
Quotient=0.010X

EXAMPLE—Continued (Cycle 5)

| | |
|---|---|
| 2nd trial divisor shifted left 1+1=2 | Ø0.0000 |
| Trial difference | 0.1100 |
| Fourth trial difference | 1.0100 |

Signs unlike so enter "zero" in quotient
Quotient=0.0100=1/4
Output of gate 380=0 so sign digit remains "zero"

The operation of the circuit with the manual overflow check switch in the "out" position is similar to the operation described above except that the signal from multivibrator 101 at the beginning of the program causes a "one" to be inserted in bi-stable circuit $20_{(2)}$. This will cause the computer to proceed with cycles 2 through 20 as outlined above.

*Square root*

The square root function will now be explained. First it should be mentioned that the square root function employs gate circuits 24 and 26 which connect step counter master rank 20 and multiplier quotient output register 16, respectively, to input register 10. These connections are not found in the usual computer.

The square root function differs from the functions previously described in that only one initial number, the radicand, is involved in the operation. This number, i.e. the radicand, is set into the accumulator master rank 14. It will be seen presently that on the first cycle of operation the input register 10 is cleared, a step which was not performed in the previously described programs. The square root function employs an initial step, seventeen identical intermediate steps and a final step. Thus the square foot function is performed in nineteen steps rather than the twenty steps employed for multiplication or for division with overflow sensing. Throughout the square root function gate 110 is inoperative so that delay multivibrator 105 is in the circuit to allow for ripple time during the subtraction processes.

The square root operation is begun by placing the radicand in the accumulator master rank 14. Square root program leads 123 are then energized and a "begin" signal is supplied to multivibrator 101. The signal from multivibrator 101 causes buffer 146 to have an output signal. This signal causes gate 255 of Fig. 1B to set the add-subtract bi-stable circuit 42 to the subtract state. It also causes gate 370 of Fig. 1B to set bi-stable circuit $14_{(1)}$ to "zero." The computer shown in this application deals only with real numbers. Therefore it is not possible to take the square root of a negative number. However, by inserting a number in two's complement form in accumulator master rank 14 and then changing the sign digit to a "zero" by way of gate 370, the computer circuit will take the square root of $(1-n)$ where $n$ is the positive number having the same magnitude as the negative number originally in register 14, $(1-n)$ must be positive since $n$ is positive and less than "one." It will be shown that this procedure is useful in converting between the various trigonometric functions. For example, it will be remembered that in $\sin \theta=\sqrt{1-\cos^2 \theta}$. Therefore if $n=\cos^2 \theta$, $\sin \theta=\sqrt{1-n}$. The manner of converting between sines and cosines will be described in more detail presently.

Returning now to the first cycle of operation, the signal from buffer 146 causes gate circuit 283 to insert a "one" in bi-stable circuit $20_{(2)}$ of step counter master rank 20. The signal from multivibrator 101 also causes multiplier-quotient-output register 16 to be cleared.

In all nineteen cycles of the square root functions, the signal from multivibrator 102 causes accumulator slave rank 12 and step counter slave rank 18 to be cleared. It also causes gate 152 of Fig. 1C to have an output signal. The signal from gate 152 actuates clearing circuits 10c which clears the input register 10. It is only on the square root program that this register is cleared on every cycle.

On all cycles the signal from multivibrator 103, acting through buffer 163, causes the "one" present in step counter master rank 20 to be transferred to step counter slave rank 18 through gate circuit 72. It should be noted that this transfer takes place with no shift in the position of the "one." Also, on all cycles, the signal on square root program lead 123 and the signal from multivibrator 103 actuate gates 161 and 162. These gates actuate gates 24 and 26, respectively, of Fig. 1A. Gates 24 and 26 transfer the contents of step counter master rank 20 and multiplier-quotient-output register 16 to the input register 10. The transfer from register 20 to register 10 is with a one digit right shift. It is possible to transfer the contents of two registers to input register 10 simultaneously since the transfer is of "ones" only. Also it will be shown that there is no conflict in the data from step counter master rank 20 and output register 16. On the first cycle only "and" gate 176 of Fig. 1C is caused to provide an output signal in response to the "one" present in bi-stable circuit $20_{(2)}$ and the signal on square root program lead 123. The signal from "and" gate 176 and the signal from multivibrator 103 causes gate 164 to have an output signal. Gate 164 controls gate circuit 32 of Fig. 1A which transfers the data present in accumulator master rank 14 to accumulator slave rank 12 with no shift in position. On all other cycles the "zero" present in bi-stable circuit $20_{(2)}$ causes gate 178 to have an output signal. Therefore gate 165 will be actuated instead of gate 164. Gate 165 controls gate 30 of Fig. 1A which transfers the data present in accumulator master rank 14 to accumulator slave rank 12 with a one digit left shift.

The operations performed in response to the signal from multivibrator 104 are the same for all cycles. The signal from multivibrator 104 causes clearing circuits **14*c* and 20*c* to clear accumulator master rank 14 and step counter master rank 20**, respectively.

Assume now that the number in accumulator master rank 14 has been transferred to accumulator slave rank 12, that master rank 14 has been cleared, and that the "one" in the master step counter has been transferred to the input register. Note that this transfer takes place with a one digit right shift so that it will occupy bi-stable circuit $10_{(3)}$ in input register 10. The sign of the trial remainder from adder-subtracter 40 is compared with the sign of the partial remainder present in accumulator slave rank 12. The sign digit that is compared is that digit present in bi-stable circuit **12*a*. Since this is the first step the "partial remainder" will be equal to the original number. On the first step the number in bi-stable circuit 12*a* will be a "zero" since the slave rank was initially cleared and no number is transferred to this bi-stable circuit 12*a* through gate 32. These two signs are compared in the circuits just below the add-subtract bi-stable circuit 42. If the signs are unlike, indicating that the trial difference is negative, the trial root divisor in input register 10 is larger than the partial remainder in accumulator slave rank 12. If the sign of the trial difference is positive, it indicates that the trial root divisor is smaller than the partial remainder in register 12. If the signs are alike, there will be an output signal from inverter 220 which will provide one of the three input signals to gate 218. If the signs are unlike, the signal at the output of "or" gate 354 will be supplied to one input of the alternative gate 216. Gates 216 and 218 receive a second input signal from square root program lead 123. The third signal to gates 216 and 218 is provided if bi-stable circuit $18_{(20)}$ is registering a "zero." This bi-stable circuit will register a "zero" on all but the last cycle of the square root program. Therefore if the signs are alike, a signal will be supplied to one input of "and" gate 192. If they are unlike, a signal will be supplied to one input of "and" gate 193**.

Upon the occurrence of a signal from multivibrator 106, gate 192 will cause gate circuit 44 of Fig. 1A to transfer the trial remainder from adder-subtracter 40 to accumulator master rank 14 to form a new partial remainder. If the signs are unlike, gate 193 causes gate 34 to transfer the partial remainder from accumulator slave rank 12 to accumulator master rank 14. The signal in accumulator master rank 14 still forms the new partial remainder.

Since bi-stable circuit 42 is set to subtract, if the signs are alike, a signal will be supplied by "or" gate 360 to one input of "and" gate 56. "And" gate 56 gets a second signal from gate 196 of Fig. 1C and a third signal from bi-stable circuit $18_{(1)}$ in the step counter slave rank 18. Since the connection from step counter slave rank 18 to "and" gate 56 is from the "zero" side of bi-stable circuit $18_{(1)}$, a signal will always appear on this lead during the square root process. If the compared signs are alike, "and" gate 56 will supply a signal to gate circuit 54. Gate circuit 54 then transfers the "one" present in step counter slave rank 18 to multiplier-quotient-output register 16. This "one" forms the first digit of the root which will be developed in output register 16. Output register 16 is not cleared during the entire square root function. If the signs are unlike, indicating that the trial divisor was larger than the partial remainder, gate 56 does not provide a signal and the root digit in output register 16 remains at "zero."

The signal from multivibrator 106 also actuates "and" gate 194. The gate in turn causes gate circuit 74 to be actuated. This transfers the "one" in bi-stable circuit $18_{(2)}$ to step counter master rank 20 with a one digit right shift.

The "zero" present in bi-stable circuit $18_{(20)}$ causes gate 302 of Fig. 1B to provide an output signal. This signal through "or" gate 290 actuates the recycle gate 119.

The next seventeen cycles are the same as the first cycle except that the partial remainder present in accumulator master rank 14 is transferred by way of gate 30 to the accumulator slave rank 12 with a one digit left shift. Since the partial remainder in accumulator master rank 14 is always positive, the sign digit in accumulator master rank 14 is always "zero." This "zero" is transferred from bi-stable circuit $14_{(1)}$ to bi-stable circuit **12*a* when gate 30 is actuated. Therefore the sign comparison will always be between a "zero" in bi-stable circuit 12*a* and the sign digit of the adder-subtracter 40. As indicated earlier, the operations in response to the signals from multivibrators 102 and 104 are the same for the final cycle as they were for the first eighteen cycles. The operations in response to the signal from multivibrator 103** are the same for the final cycle as they were for cycles 2 through 18.

In the final cycle, at the time multivibrator 106 is actuated, the partial remainder is present in accumulator slave rank 12. The trial divisor, which is made up of "ones" and "zeros" transferred from output register 16 and a "one" from step counter master rank 20, is present in input register 10. The partially developed root is present in output register 16. This root will be complete except for the final digit. Again the sign digit of adder-subtracter 40 is compared with the digit present in bi-stable circuit **12*a*. If the signs are alike, that is if the sign digit of adder 40 is a "zero," the final "one" will be transferred from bi-stable circuit $18_{(20)}$ to output register 16. If the signs are unlike, that is if the sign from adder 40 is a "one," no transfer will take place through gate circuit 54 and the final digit of the root will be a "zero." The presence of a "one" in bi-stable circuit $18_{(20)}$ prevents any actuation of gates 216 or 218 of Fig. 1C. If there is no signal from either gate 216 or 218, there can be no signal from gates 192 and 193 and no transfer through gates 44 or 34 of Fig. 1A. The "one" present in bi-stable circuit $18_{(20)}$ also prevents an output signal from being generated by gate 302. Therefore the recycle gate 119 will not be actuated. The "one" present in bi-stable circuit $18_{(20)}$ causes an output signal at gate 294. A signal from this gate passing through "or" gate 236 causes "and" gate 191 to produce an output signal. The signal from gate 191 actuates gate 48 of Fig. 1A and transfers the root which is developed in output register 16 to the accumulator master rank 14. The root is placed in this position so that it will be ready for further operations within the computer. The signal from gate 294, also acting through "or" gate 236, actuates the "end of operation" gate 120** and causes an "end of operation" signal to be generated. This completes the operation of the square root program.

By way of further illustration of the operation of the square root program, reference should be had to the following examples. Example 1 shows the squaring of the number $$\frac{51}{64}$$

in binary form.

EXAMPLE 1

```
     0.110011 = 51/64
     0.110011
     ----------
       110011
      110011
     ----------
      10011001
    11001100
     ----------
    1111001001
   110011
     ----------
0.101000101001 = 2601/4096
```

Note that in Example 1 the partial products are summed in the manner followed by the computer during the multiplication function. Only the seven most significant digits are shown since the digits of less significance would all be "zero."

Example 2 illustrates the method of taking the square root of the binary number equivalent to $$\frac{2601}{4096}$$

by the long hand or grade school method.

EXAMPLE 2

```
 0. 1 1 0 0 1 1 = 51/64
√0.101000101001 = 2601/4096
   010000000000  First trial divisor
   ------------
    11000101001  First partial remainder
    10100000000  Second trial divisor
   ------------
    00100101001  Second partial remainder
       11000100
   ------------
      001100101
        1100101
   ------------
              0
```

In this method the digits are paired off starting at the binary point and working toward the right. The first trial divisor of .01 is then subtracted from the first pair of binary digits. If the first partial remainder is positive, a "one" is inserted as the first root digit. If the first partial remainder is negative, a "zero" is inserted as the first root digit. The partially developed root, in this case the single "one" digit, is then multiplied by 2 and a "one" is added to the right of the least significant digit to form the new trial divisor. In Example 2 multiplying root digit 1 by 2 produces the number 10. Adding a 1 to the right of the least significant digit produces the new trial divisor 101. The second trial divisor is then subtracted from the first partial remainder to produce the second partial remainder. If this partial remainder is positive, a second "one" is inserted in the root. The square root operation is continued by multiplying the root which now comprises the number 11 by 2 to produce the number 110. It can be seen by inspection that if a "one" is added to the number 110 to form a trial divisor 1101, this number will be larger than the second partial remainder. Therefore a "zero" is inserted in the root. The new root of 110 is multiplied by 2 to provide the number 1100. Again it will be seen that the addition of a "one" to the right of the least significant digit in the root will still result in a trial divisor larger than the second partial remainder, and the fourth digit of the root becomes a "zero." This operation is continued in this manner until the entire root has been developed. It should be noted that taking the square root in this manner follows exactly the same procedure as taking the square root of a decimal number by the long hand method. The only difference lies in the fact that the number added to the right of the least significant digit of the doubled root during the decimal operation may have any value from "zero" to "nine." In the binary system it can have only the values "one" or "zero."

Example 3 shows the process of taking square root by the computer method.

EXAMPLE 3

| | | |
|---|---|---|
| | 0. 1 1 0 0 1 1 | =51/64 |
| | √0. 10 10 00 10 10 01 | =2601/4096 |
| Subtract | 0 01 00 00 00 00 00 | First trial divisor |
| | 0 01 10 00 10 10 01 | First partial remainder |
| | 0 11 00 01 01 00 10 | FPR shifted L1 |
| Subtract | 0 10 10 00 00 00 00 | Second trial divisor |
| | 0. 00 10 01 01 00 10 | Second partial remainder |
| | 0. 01 00 10 10 01 00 | SPR shifted L1 |
| Subtract | 0 11 01 00 00 00 00 | Third trial divisor |
| | 1 01 11 10 10 01 00 | Negative partial remainder |
| | 0 10 01 01 00 10 00 | SPR shifted L1+1 |
| Subtract | 0 11 00 10 00 00 00 | Fourth trial divisor |
| | 1 11 00 11 00 10 00 | Negative partial remainder |
| | 1 00 10 10 01 00 00 | SPR shifted L1+1+1 |
| Subtract | 0 11 00 01 00 00 00 | Fifth trial divisor |
| | 0 01 10 01 01 00 00 | Third partial remainder |
| | 0 11 00 10 10 00 00 | TPR shifted L1 |
| Subtract | 0 11 00 10 10 00 00 | Sixth trial divisor |
| | 0 00 00 00 00 00 00 | |
| Subtract | 0 11 00 11 01 | Seventh trial divisor |
| | 1 00 11 00 11 | Negative partial remainder |

It should be noted that in Example 2 the first digit of the trial divisor always progresses to the right by one digit on each step, that is it moves one digit to the right with respect to the partial remainder. In the computer method it is more convenient to maintain the first digit of the trial divisor in a fixed position and to shift the partial remainders to the left by one digit each time. It is not possible to do the equivalent procedure in taking the square root of a decimal number since the first digit of the trial root may move one or two digits to the right with respect to the partial remainder depending on whether or not a carry is present when the partial root is doubled. Note that the first trial divisor comprises a "one" in the third place, that is the second place to the right of the binary point. It will be remembered that this corresponds to the "one" transferred from bi-stable circuit $18_{(2)}$ in step counter slave rank 18 to the input register 10 with a one digit right shift. Note that the sign digit of the first partial remainder is a "zero." Therefore the first digit of the root is a "one." Note also that the first partial remainder is shifted to the left one digit. It will be remembered that this shift takes place as the partial remainder is transferred from accumulator master rank 14 to accumulator slave rank 12 through gate circuit 30. It should also be noted that the trial divisor in binary square root is always equal to "zero" or the number formed by doubling the root and adding a "one" to the right of the least significant place. In the binary system a partial root of 11 is multiplied by 2 to obtain the number 110. A "one" is added to the right of the "zero" and the number is multiplied by this "one." Multiplying 1101 by 1 gives the same result 1101. If the added digit is "zero," multiplying 1100 by 0 gives a product of 0. It should be noted in Example 3 that the third subtraction step gives rise to a negative partial remainder as indicated by the "one" to the left of the binary point. Since this partial remainder is negative, it is ignored and a new partial remainder is developed by shifting the second partial remainder one digit to the left. In the computer this is accomplished in the following way. The second partial remainder in accumulator slave rank 12 is transferred back to accumulator master rank 14 through gate circuit 34 on the occurrence of a "one" in the sign place of adder-subtracter 40. This partial remainder is then transferred back to the accumulator slave rank 12 through gate 30 which provides the one digit left shift. Note that since the partial remainder resulting from the third subtraction step is negative, a "zero" is inserted in the third place of the root digit. The next partial remainder is also negative so it, also, is ignored and a new remainder is developed by shifting the second partial remainder to the left one additional digit. Again a "zero" is inserted in the root. This operation continues until the entire root has been developed. It should be noted that the partial remainders resulting from the seventh and all successive subtraction steps will be negative so that the root will be completed with a series of "zeros" in the less significant digits.

It was mentioned earlier that the circuits which change the sign digit of a negative number to a "zero" before the square root operation is started are employed in making trigonometric conversions. Assume for the moment that it is known that cos $\theta=\frac{1}{2}$ and the value of sin $\theta$ is to be determined. It is known that sin $\theta=\sqrt{1-\cos^2\theta}$. However, the computer cannot perform the operation $1-\cos^2\theta$ since it will accept only numbers less than "one." Therefore the operation $0-\cos^2\theta$ is performed to obtain $-\cos^2\theta$. The sign digit of the two's complement form of $-\cos^2\theta$ is then changed to a "zero" to obtain the equivalent of the number $1-\cos^2\theta$. This is illustrated by the following specific example.

Suppose $\cos\theta=\frac{1}{2}=0.100$ in binary form
$\cos^2\theta=\frac{1}{4}=0.010$
$0-\cos^2\theta=-\frac{1}{4}=1.110$ in 2's complement form changing the sign digit to a "zero"
$1-\cos^2\theta=0.110=+\frac{3}{4}=1-\frac{1}{4}$
$\sin\theta=\sqrt{0.110}$ The square root principles and circuits described above are equally applicable to numbers normalized to values other than less than one. Normalizing the numbers to a value less than one merely simplifies the proper grouping of the digits with respect to the binary point and it automatically places the binary point in the proper place in the root. However, with the addition of appropriate circuits for sensing the number of significant digits to the left of the binary point and for inserting the binary point in the proper position in the extracted root, the principles described above may be employed in floating point or integral computers.

*Shift right and shift left*

The shift right and shift left functions are performed by first inserting the number to be shifted in the accumulator master rank 14. The number is then transferred to the accumulator slave rank 12 through gate circuit 30 if a left shift is ordered, or through gate circuit 36 if a right shift is ordered. The number in the accumulator slave rank 12 is then shifted back to accumulator master rank 14 through gate circuit 34. This transfer from the accumulator master rank 14 to the accumulator slave rank 12 and back to accumulator master rank 14 is continued for as many steps as the number of places the number is to be shifted. The number of steps in the shifting function is determined by the signal supplied to gate 282. Gate 282 receives one signal from the shift right program lead 126 or the shift left program lead 127. It receives a second signal from buffer 146 which is energized by multivibrator 101. The third input 282*c* comprises up to twenty address conductors, any one of which may be energized. For example, if address conductor 11 is energized, gate 282 will inject a "one" into bi-stable circuit $20_{(11)}$ of step counter master rank 20. The circuit will then go through ten steps before this one reaches bi-stable circuit $20_{(20)}$. If the address conductor 6 is energized, a circuit will go through fifteen cycles before the "one" is finally shifted to bi-stable circuit $20_{(20)}$. Assuming the number is inserted in step counter master rank 14 and a "one" is inserted in the bi-stable circuit $20_{(1)}$ by gate 282, the operation of the circuit will proceed as follows. The signal from multivibrator 102 clears step counter slave rank 18 and accumulator slave rank 12. The signal from multivibrator 103 causes a signal to appear at the output of buffer 163. This signal causes the "one" in step counter master rank 20 to be transferred to bi-stable circuit $18_{(1)}$ in step counter slave rank 18. If the shift left program lead 126 is energized, gate 165 will provide an output signal. A signal from gate 165 will actuate gate 30 of Fig. 1A and the information in accumulator master rank 14 will be transferred to the accumulator slave rank 12 with a one digit left shift. If a right shift is ordered and the number to be shifted is a positive number, as indicated by a "zero" in bi-stable circuit $14_{(1)}$, the operation will be exactly the same except that gate 165 is actuated instead of gate 164. Gate 165 causes gate circuit 36 to transfer the information in the accumulator master rank 14 to the accumulator slave rank 12 with a one digit right shift. The signal from multivibrator 104 causes accumulator master rank 14 and step counter master rank 20 to be cleared. Since no carry can be present during the shift right and shift left operations, the signal from multivibrator 104 will pass through "and" gate 110 and "or" gate 112 to the input of multivibrator 106. On all except the last cycle, the signal from multivibrator 106 actuates gate 194 in Fig. 1C. Gate 194 controls gate 74 of Fig. 1A which transfers the "one" from step counter slave rank 18 to step counter master rank 20 with a one digit right shift. Gate 193 is also actuated which transfers the contents of the accumulator slave rank 12 to the accumulator master rank 14. As long as there is a "zero" registered in bi-stable circuit $18_{(20)}$, gate 302 will supply an output signal to "or" gate 290 which controls the operation of recycle gate 119, and the circuit will recycle. On the final cycle the first three operations performed in response to the signal from multivibrators 102, 103 and 104 will be exactly the same. However, on the signal from multivibrator 106, in addition to the transfer of the shifted number from the accumulator slave rank 12 to the accumulator master rank 14, the "one" present in bi-stable circuit $18_{(20)}$ of step counter slave rank 18 will cause gate 294 to provide an output signal and will cause gate 302 to be inoperative. The signal from gate 294 will actuate the "end of operation" gate 120 to provide an "end of operation" signal. It will also cause gate 191 of Fig. 1C to provide an output signal. Gate 191 controls the operation of gate circuit 50 of Fig. 1 which transfers the shifted number from the accumulator master rank 14 to the output register 16 where it may be read out through gate circuit 60 if desired.

If the number present in accumulator master rank 14 is negative, gate 362 will cause a "one" to be inserted in bi-stable circuit 14*a*. On the shift right function only the "one" from bi-stable circuit 14*a* will be transferred to bi-stable circuit 12*a* and to bi-stable circuit $12_{(1)}$ through gate 366 and gate circuit 36. The "one" present in bi-stable circuit $12_{(1)}$ will be transferred back to bi-stable circuit $14_{(1)}$ through gate 34. Bi-stable circuit 14*a* will again be reset to indicate a "one." Therefore, if a negative number is shifted to the right, a series of "ones" will be inserted in place of the "zeros" which are inserted when a positive number is shifted to the right. This operation is made necessary by the two's complement form of representation of negative numbers.

*Signed magnitude and absolute magnitude*

Positive numbers appear in the computer as straight binary digits. Negative numbers are present in two's complement form. It is sometimes desirable to determine the absolute magnitude of a number when it is not known whether the number is positive or negative. If it is desired to obtain only the magnitude of the number without regard to sign, the number is first read into the input register 10. The absolute magnitude program lead 121 is energized and a "begin" signal is supplied to multivibrator 101. In response to the signal from multivibrator 101 the output register 16 is cleared and one of gates 253 and 254 is actuated. Gate 253 will be actuated if the sign of the number in input register 10 is positive, that is if the sign digit is "zero." Gate 254 will be actuated if the number in input register 10 is negative. A signal from gate 253 will set bi-stabe circuit 42 to the "add" state and a signal from gate 254 will set it to the "subtract" state.

Step counter slave rank 18 and accumulator slave rank 12 are cleared in response to the signal from multivibrator 102. No circuits are actuated in response to the signal from multivibrator 103. In response to the signal from multivibrator 104, the accumulator master rank 14 and step counter master rank 20 are cleared. Therefore all registers are cleared except input register 10. Delay multivibrator 105 is in the circuit since the add-subtract operation may result in a carry or borrow ripple. If the number in the input register 10 is positive, adder-subtracter 40 will add the number in the input register 10 to the "zeros" present in accumulator slave rank 12. In response to the signal from multivibrator 106 the signal from gate 192 will cause the output of adder-subtracter 40 to be transferred through gate 44 through the accumulator master rank 14. The "end of operation" gate 120 is energized directly through "or" gate 236 so only one cycle will be performed. The signal from gate 236 also causes gate 191 to produce an output signal when a second signal is present from multivibrator 106. Gate 191 causes gate 50 to transfer the contents of the accumulator master rank 14 to output register 16 where it may be read out through gate 60. It will be noted that if the number in input register 10 is positive, the same number will appear in the accumulator master rank 14 and in output register 16.

If the number in input register 10 is negative, adder-subtracter 40 will subtract the number in input register 10 from the "zeros" in accumulator slave rank 12. Again the difference will be transferred by way of gate 44 to accumulator master rank 14 in response to a signal from multivibrator 106. The number that is transferred to accumulator master rank 14 is a positive number having the same magnitude as the negative number expressed in two's complement form which was inserted in input register 10. Again gate 50 is actuated, which transfers the contents of accumulator master rank 14 to output register 16.

If it is desired to know the sign of the number as well as the magnitude of the number, program lead 121 is energized as before. Program lead 121*a*, which forms one input to gate 382 of Fig. 1B, is also energized. If the number present in input register 10 is positive, gate 382 will have no output signal and the number finally appearing in accumulator master rank 14 and output register 16 will be the same as before. However, if the number in input register 10 is negative, a "one" will appear in bi-stable circuit $10_{(1)}$. This "one" and a signal from gate circuit 192 will cause a signal to appear at the output of gate 382 during the period of operation of multivibrator 106. The signal from gate 382 will set bi-stable circuit $14_{(1)}$ to indicate a "one." Therefore the number appearing in accumulator master rank 14 has a magnitude equal to the absolute magnitude of the number in input register 10 and has a sign digit of "one" if the number in input register 10 is negative and a sign digit of "zero" if the number in input register 10 is positive. The number that finally appears in accumulator master rank 14 and output register 16 should not be used in further computations within the computer since it represents a negative number but is not in two's complement form.

While the invention has been described with reference to the preferred embodiments thereof, it will be apparent that various modifications and other embodiments thereof will occur to those skilled in the art within the scope of the invention. Accordingly we desire the scope of our invention to be limited only by the appended claims.

What is claimed is:

1. In a parallel, asynchronous, binary computer including a multidigit, parallel storage, input register, a multidigit, parallel storage, output register, and means including at least a third multidigit register for performing the parallel subtraction of a number stored in said third register from a number stored in said input register, the combination of a non-coded step counter having a plurality of outputs which are energized singly in a preselected sequence to indicate the steps of a subroutine, signal actuatable means for transferring signals representing "ones" only from said output register to said input register, second and third signal actuatable means connecting the outputs of said step counter to selected digit positions in said output and input registers, respectively, and means for actuating said signal actuatable means in a preselected sequence, whereby said computer is arranged to extract the true square root of a binary number.

2. A circuit for taking the square root of a binary number comprising an input register, binary numbers being represented in said input register and other registers of said circuit with digits in descending order of significance from left to right, means for setting said input register to represent said binary number, a first signal actuatable means for clearing said input register, a double rank accumulator register including a slave rank register and a master rank register, first normally blocked gate means connected for the parallel transfer of signals representing digits from said accumulator master rank register to said accumulator slave rank register with a one digit left shift, second normally blocked gate means connected for the parallel transfer of signals representing digits between corresponding digit elements of said accumulator slave rank register and said accumulator master rank register, second and third signal actuatable means for clearing said slave rank and said master rank registers, a subtracter circuit directly coupled to said input register and said accumulator slave rank register, a third normally blocked gate circuit connected for the parallel transfer of the output signals of said subtracter to said accumulator master rank register, an output register, fourth signal actuatable means for clearing said output register, a fourth normally blocked gate circuit connected for the parallel transfer of signals representing digits from said output register to said accumulator master rank register, a fifth normally blocked gate circuit connected for the parallel transfer of signals representing digits from said output register to corresponding digit units of said input register, a double rank step counter comprising a slave rank, a master rank, a sixth normally blocked gate circuit connected for the parallel transfer of signals representing digits from said step counter master rank to corresponding digit units of said step counter slave rank, a seventh normally blocked gate circuit connected for the parallel transfer of signals representing digits from said step counter slave rank to said step counter master rank with a one digit right shift, an eighth normally blocked gate circuit connected for the parallel transfer of signals representing digits from said master rank step counter to said input register with a one digit right shift, fifth and sixth signal actuatable means for clearing said step counter slave rank and said step counter master rank respectively, a ninth normally blocked gate circuit connected for the parallel transfer of signals representing "ones" digits only from said step counter slave rank to corresponding digit units in said output register, means for inserting a signal representing a "one" in the second digit unit from the left in said step counter master rank, means associated with said accumulator slave rank and said subtracter for comparing the representation of the left most digit of the word transferred from said accumulator master rank to said accumulator slave rank with the representation of the left most digit in the output of said subtracter, means associated with said last-mentioned means for holding said ninth gate and said third gate inoperative if said last-mentioned digits are unlike and said second gate inoperative if said digits are alike, and means for cyclically activating said gates and said clearing means in the following four interval sequence to obtain the square root: clearing means one, two and five in the first interval; gates six, five, eight, two in the first cycle and gates six, five, eight and one in succeeding cycles, during the second interval; clearing means three and six during the third interval; gates three, seven, five and nine if the compared digits are alike and two and five if the compared digits are unlike, during the fourth interval; and means for actuating said fourth gate means in the final cycle to transfer signals representing digits from said output register to said accumulator master rank register.

3. A computer circuit for taking the square root of a binary number comprising a step counter including a master rank register and a slave rank register, an output register, an accumulator including an accumulator slave rank register and an accumulator master rank register, an input register, each of said registers including $a$ bi-stable elements, where $a$ is an integer greater than one, a subtracter having $a$ stages each connected to a separate bi-stable element of said accumulator slave rank and a corresponding bi-stable element of said input register, first gate means connected for the parallel transfer of signals representing digits from said step counter master rank to said step counter slave rank, second gate means connected for the parallel transfer of signals representing digits from said step counter slave rank to said step counter master rank with a one digit right shift, third gate means connected for the parallel transfer of signals representing "ones" only from said step-counter slave rank to said output register, fourth gate means connected for the parallel transfer of signals representing "ones" only from said step counter master rank to said input register, fifth gate means connected for the parallel transfer of signals representing "ones" only from said output register to said input register, sixth gate means connected for the parallel transfer of signals representing digits from said accumulator master rank to said accumulator slave rank with a one digit left shift, seventh gate means connected for the parallel transfer of signals representing digits from said accumulator slave rank to said accumulator master rank, eighth gate means connected for the parallel transfer of signals representing digits from the output of said subtracter to said accumulator master rank, means for clearing said input register, timer means associated with said eight gate means and said clearing means, said timer means being arranged to control the operation of said first, second, fourth, fifth and sixth gates and said clearing means, means for sensing the relative magnitudes of the numbers registered by said input register and said accumulator slave rank, said last-mentioned means and said timer means being connected to control jointly, the operation of said third and eighth gate means if the number registered by said input register is larger than the number registered by said accumulator slave rank and to control jointly the operation of said seventh gate means if the number registered by said input register is smaller than the number registered by said accumulator slave rank, means for initially inserting the radicand in said accumulator slave rank register, and means for initially inserting a signal representing a "one" in a selected bi-stable element of said step counter.

4. A computer system for taking the square root of a binary number comprising first, second and third registers, each including at least $a$ bi-stable elements which may be separately set to register the digits "zero" and "one," where $a$ is an integer greater than one, the bi-stable elements of each of said registers being herein numbered in order from one to $a$ for purpose of reference, said numbering starting with the highest order bi-stable element first normally blocked signal transfer gate means connecting each of said bi-stable elements of said second register to the correspondingly numbered bi-stable element of said first register, second normally blocked signal transfer gate means connecting each of said bi-stable elements except the $a^{th}$ of said third register to the next higher numbered bi-stable circuit of said first register, said gates being connected for the transfer of "ones" only from said second and third registers to said first register upon the actuation of said first and second gate means, means including third signal transfer gate means connecting each bi-stable element of said third register to a correspondingly numbered bi-stable element in said second register, means for causing a selected bi-stable element of said third register to register a "one," means for causing said bi-stable elements of said third register to cause said "one" to progress to successively higher numbered bi-stable elements of said third register, an accumulator having a master rank and a slave rank, each rank having a plurality of bi-stable elements which may be separately set to register the digits "zero" and "one," a binary subtracter circuit connected to said slave rank and to said first register, means associated with said subtracter circuit for sensing the sign of the difference resulting from the subtraction of the number in said input register from the number in said slave rank, means including a fourth signal transfer gate means associated with said sign sensing means, said slave rank, said master rank and said subtracter for selectively transferring the result of said subtraction or the number present in said slave rank to said master rank, fifth signal transfer gate means connecting each bi-stable element in said master rank to the next lower numbered bi-stable element in said slave rank, means responsive to the output of said sign sensing means for controlling the operation of said third gate means, and timing means associated with said five gate means for actuating said gate means in a preselected sequence.

5. A computer system for taking the square root of a binary number comprising first, second and third registers, each register including at least $a$ bi-stable elements which may be set to register the digits "zero" and "one," where $a$ is an integer greater than one, the bi-stable elements in each register being hereinafter referenced by the numbers one to $a$, said numbering starting with the highest order bi-stable element and proceeding in order to the lowest order element, first signal actuatable gate means connecting said bi-stable elements of said second register to corresponding bi-stable elements of said first register, second signal actuatable gate means connecting each of said bi-stable elements except the $a^{th}$ of said third register to the next higher numbered bi-stable element of said first register, means including third gate means actuatable by a timing signal and a second signal connecting each bi-stable element of said third register to a correspondingly numbered bi-stable element of said second register, said first, second and third gate means being connected for the transfer of "ones" only in response to a signal supplied thereto, means for causing a selected one of said bi-stable elements of said third register to register a "one," signal actuatable means associated with said third register for resetting said bi-stable elements therein in sequence, thereby to cause the "one" registered therein to progress to successively higher numbered bi-stable elements in said third register, a fourth register including at least $a$ bi-stable elements, means associated with said fourth register for initially setting the bi-stable elements of said register to indicate the radicand, means for subtracting the number registered in said first register from the number registered in said fourth register, means for comparing the magnitude of the number registered in said first register with the number registered in said fourth register, means responsive to the output of said comparing means and an actuating signal for resetting said fourth register to indicate, alternatively, twice the number just previously registered therein if the number registered in said first register is greater than the number registered in said fourth register or twice the difference resulting from the subtraction of the number registered in said first register from the number registered in said fourth register if the number registered in said fourth register is greater than the number registered in said first register, time signal generating means associated with said first gate means, said second gate means, said third gate means, said means for resetting said third register, and said means for resetting said fourth register, for supplying periodic timing signals thereto, and means connecting said comparing means to said third gate means for supplying said second signal thereto.

6. A computer system for taking the square root of a binary number comprising first, second, third and fourth registers, each register including at least $a$ bi-stable elements, each of which may be set to represent the digits "zero" and "one" where $a$ is an integer greater than one, the individual bi-stable elements in each register being hereinafter referenced in order by the numbers one to $a$, the highest order bi-stable element being referenced as one, timer means providing at first and second outputs thereof first and second periodic timing signals of substantially the same frequency but different phases, first signal actuatable gate means connecting said bi-stable elements of said second register to corresponding bi-stable elements of said first register, second signal actuatable gate means connecting each of said bi-stable elements except the $a^{th}$ of said third register to the next higher numbered bi-stable element of said first register, means connecting said first output of said timer means to said first and second gate means to control the operation thereof, means including third gate means connecting each bi-stable element of said third register to a correspondingly numbered bi-stable element of said second register, said first, second and third gate means being connected for the transfer of "ones" only, means for causing a selected one of said bi-stable elements of said third register to register a "one," means associated with at least said first output of said timing means and said third register to cause the "one" registered in said third register to progress to successively higher numbered bi-stable circuits at the frequency of said timing signal and to cause all other bi-stable circuits of said third register to register a "zero," means associated with said fourth register for initially setting the bi-stable elements of said fourth register to indicate the radicand, means connected to said first register and said fourth register for subtracting the number registered in said first register from the number registered in said foutrh register, means for comparing the magnitude of the number registered in said first register with the number registered in said fourth register, means responsive to the output of said comparing means and said output signals of said timer means for resetting said fourth register to indicate alternatively, twice the number just previously registered therein if the number registered in said first register is greater than the number registered in said fourth register or twice the difference resulting from the subtraction of the number in said first register from the number in said fourth register if the number registered in said fourth register is greater than the number registered in said first register, and means responsive to the output of said comparing means and said second output of said timer means for controlling the operation of said third gate means.

7. A computer system for taking the square root of a binary number comprising first, second and third registers, each register including at least $a$ bi-stable elements, each of which may be set to register the digits "zero" and "one" where $a$ is an integer greater than one, the individual bi-stable elements being hereinfater referenced in order by the numbers one to $a$, the highest order bi-stable circuit being referenced as one timer means providing at first and second outputs thereof first and second periodic timing signals of the same frequency but different phase, signal stepping circuit means responsive to a signal from said timer means, said signal stepping circuit means having $a$ outputs and being constructed and arranged to cause a signal to appear at one output at a time, said signal first appearing at said first output and progressing to said $a^{th}$ output in synchronism with $a$ periods of the signals generated by said timer means, first signal actuatable gate means connecting said bi-stable elements of said second register to corresponding bi-stable elements of said first register, second signal actuatable gate means connecting each of said outputs except the $a^{th}$ of said signal stepping circuit means to the next higher numbered bi-stable element of said first register, means connecting said first output of said timer means to said first and second gate means to control the operation thereof, means including third gate means connecting each output of said signal stepping circuit means to the correspondingly numbered bi-stable element of said second register, said signal at an output of said signal stepping circuit means being such as to set the associated bi-stable elements of said first and second registers to register a "one," said first, second and third gate means being connected for the transfer of "ones" only, means assoicated with said third register for initially setting the bi-stable elements of said third register to indicate the radicand, subtracter means connected to said first and third registers for providing a signal representative of the difference between the number registered in said first register and the number registered in said third register, comparing means associated with said first and said third registers and providing a first signal if the number registered in said first register is greater than the number registered in said third register and a second signal if the number registered in said third register is greater than the number registered in said first register, means responsive to said first signal of said comparing means and at least one of said output signals of said timer means for resetting said third register to indicate twice the number previously registered therein, means connected to the output of said substracter means and responsive to said second signal of said comparing means and at least one of said output signals of said timer means for resetting said third register to indicate twice the difference resulting from the subtraction of the number in said first register from the number in said third register, and means responsive to said second signal of said comparing means and said second output of said timer means for controlling the operation of said third gate means.

8. A computer system for taking the square root of a binary number in which $n$ is the highest integral power of the radix represented by a "one," said system comprising first, second and third registers, each register including at least $a$ bi-stable elements, each of which may be set to register the digits "zero" and "one" where $a$ is a integer greater than one, the individual bi-stable elements being hereinafter referenced by the numbers one to $a$, the digits of the number being so arranged that the powers of the radix decrease as the reference number of the elements increase, timer means providing, at first and second outputs thereof, first and second periodic timing signals of the same frequency but different phase, signal stepping circuit means responsive to a signal from said timer means, said signal stepping circuit means having $a$ outputs and being constructed and arranged to cause a signal to appear at one output at a time, said signal first appearing at the output corresponding to the digit $2^d$, where $d$ is the largest even integer not greater than $n$, and progressing one output in the direction of said $a^{th}$ output for each period of the signals generated by said timer means, first signal actuatable gate means connecting said bi-stable elements of said second register to corresponding bi-stable elements of said first register, second signal actuatable gate means connecting each of said outputs except the $a^{th}$ of said signal generating means to the next higher numbered bi-stable element of said first register, means connecting said first output of said timer means to said first and second gate means to control the operation thereof, means including third gate means connecting each output of said signal stepping circuit means to the correspondingly numbered bi-stable element of said second register, said signal at an output of said first circuit means being such as to set the associated bi-stable elements of said first and second registers to register a "one," said first, second and third gate means being connected for the transfer of "ones" only, means associated with said third register for initially setting the bi-stable elements of said third register to indicate the radicand, subtracter means connected to said first and third registers and providing at an output circuit thereof signals representing the difference between the number registered in said third register and the number registered in said first register, comparing means associated with said first and said third registers and providing a first signal if the number registered in said first register is greater than the number registered in said third register and a second signal if the number registered in said third register is greater than the number registered in said first register, means responsive to said first signal from said comparing means and at least one of said output signals from said timer means for resetting said third register to indicate twice the number previously registered therein, means connected to said output circuit of said subtracter means and responsive to said second signal from said comparing means and at least one of said output signals from said timer means for resetting said third register to indicate twice the difference resulting from the subtraction of the number in said first register from the number in said third register, and means responsive to said second signal from said comparing means and said second output signal from said timer means for controlling the operation of said third gate means.

9. A computer system for taking the square root of a binary number, comprising first, second and third binary number registers, timer means providing at first and second outputs thereof first and second periodic signals of the same frequency but different phase, signal stepping circuit means associated with said timer means and having a number of outputs equal to the number of digits registered by each of said three registers, said signal stepping circuit means providing a signal at only one output at a time, said signal progressing from one output to the next in synchronism with the changing periods of the signals generated by said timer means, first means for transferring "ones" only from said second register to said first register, second means for transferring the signal from said output of said signal stepping circuit means to said first register with a one digit shift in the direction of lesser significance, means connecting said first output of said timer means to said first and second transfer means to control the operation thereof, third means for transferring the signal at said outputs of said signal stepping circuit means to said second register, said signal at the outputs of said signal stepping circuit means being registered as a "one" by said first and second registers, means for initially reading the radicand into said third register, subtracter means connected to said first and third registers and providing at an output circuit thereof signals representing the difference between the number registered in said third register and the number registered in said first register, comparing means associated with said first and said third registers and providing a first signal if the number registered in said first register is greater than the number registered in said third register, and a second signal if the number registered in said third register is greater than the number registered in said first register, means responsive to said first signal from said comparing means and at least one said output signals from said timer means for resetting said third register to indicate twice the number previously registered therein, means connected to the output of said subtractor means and responsive to said second signal from said comparing means and at least one of said output signals from said timer means for resetting said third register to indicate twice the difference resulting from the subtraction of the number in said first register from the number in said third register, and means responsive to said second signal from said timer means for controlling the operation of said third transfer means.

10. A computer system for taking the square root of a binary number, comprising first, second and third binary number registers, first circuit means having a plurality of outputs and including signal actuatable means for causing said outputs to be energized singly in a preselected succession, first signal actuatable means for transferring signals representing "ones" only from said second register to said first register, second signal actuatable means connecting the outputs of said first circuit means to selected digit positions of said first register, third signal actuatable means connecting the outputs of said first circuit means to the digit positions in said second register next higher than said selected digit positions of said first register, means for initially reading the radicand into said third register, subtraction means providing a signal indicative of the difference resulting from the subtraction of the number registered in said first register from the number registered in said third register, signal actuatable means responsive to the signal from said subtraction means indicating the sign of said difference for resetting said third register to register twice the said difference in response to a signal representing a first sign for said difference or twice the number previously registered therein in response to a signal representing the opposite sign for said difference, means responsive to the signal from said subtraction means indicating the sign of said difference for inhibiting the transfer of signals from said first circuit means to said second register for the sign of said difference resulting in the resetting of said register to twice the number previously registered therein, timing signal generating means and means connecting said timing signal generating means to said signal actuatable means individually, thereby to cause said signal actuatable means to be operated in a preselected sequence.

11. In a binary digital computer, a novel accumulator comprising a slave rank register and a master rank register, each including *a* bi-stable elements which may be separately set to register the digits "zero" and "one," means for individually clearing said master rank register and said slave rank register, first gate means connected for the parallel transfer of signals representing digits in either direction between said slave rank register and said master rank register, second gate means connected for the parallel transfer of signals representing digits from said master rank register to said slave rank register with a one digit right shift, third gate means connected for the parallel transfer of signals representing digits from said master rank register to said slave rank register with a one digit left shift, an auxiliary bi-stable element connected to said third gate means for receiving and registering the signals representing the digit not accommodated by said slave rank register by reason of said one digit left shift, a second auxiliary bi-stable element, said first auxiliary bi-stable element being connected to said means for clearing said slave rank register and said second auxiliary bi-stable element being connected to said means for clearing said master rank register, said second bi-stable element being further connected to an input of said second gate means thereby to cause the signals representing the digit registered in said second auxiliary bi-stable element to be transferred to the first bi-stable element of said slave rank register upon the actuation of said second gate means, fourth gate means connected for the transfer of a signal representing a digit from said first auxiliary bi-stable element to said second auxiliary bi-stable element, fifth gate means connected for the transfer of a signal representing a digit from said second auxiliary bi-stable element to said first auxiliary bi-stable element, and means independent of the aforementioned gate means for selectively setting said second auxiliary bi-stable element to register a "one."

12. A binary computer system comprising first, second, third, fourth, fifth and sixth binary digit registers, first, second, third, fourth, fifth, sixth, seventh, eighth, ninth, tenth, and eleventh signal actuatable gate circuits, said first gate circuit being connected for the transfer of digits from said sixth register to said first register with a one digit right shift, said second gate circuit being connected for the transfer of digits from said fourth register to said first register, said third gate circuit being connected for the transfer of digits from said third register to said second register with a one digit left shift, said fourth gate circuit being connected for the transfer of digits in either direction between said second register and said third register, said fifth gate circuit being connected for the transfer of digits from said third register to said second register with a one digit right shift, an adder-subtracter connected to said first register and said second register, said sixth gate circuit being connected for the transfer of the output of said adder-subtracter to said third register, said seventh gate circuit being connected for the transfer of digits in either direction between said third and fourth registers, said eighth gate circuit being connected for the transfer of digits from said fifth register to said fourth register, said ninth gate circuit being connected for the transfer of digits from said fifth register to said sixth register with a one digit left shift, said tenth gate circuit being connected for the transfer of digits from said sixth register to said fifth register, said eleventh gate circuit being connected for the transfer of digits from said fifth register to said sixth register with a one digit right shift, each of said gate circuits being connected for the parallel transfer of signals representing digits between the abovementioned circuits associated therewith, said first, second and eighth gate circuits being connected for the parallel transfer of signals representing "ones" only, means associated with said six registers for clearing said registers in a selected order, first sign comparing means associated with said first register and said second register, said first sign comparing means providing an output signal indicative of the relative values of the sign digits present in said first and second registers, second sign comparing means connected to said second register and said adder-subtracter, said second sign comparing means providing an output signal indicative of the relative values of the sign digits registered by said adder-subtracter and said second register, means for generating a plurality of timing signals, means connecting said timing signal generating means to said gate circuits to control the operation thereof in a predetermined sequence, means responsive to the output signals of said first and second sign comparing means for rendering selected ones of said gate circuits inoperative to pass signals, means for supplying a signal to be processed to said first register and means for obtaining an output signal from said fourth register.

13. A circuit for taking the square root of a binary number comprising an input register, binary numbers being represented in said input register and in other registers of said circuit with digits in descending order of significance from left to right, means for setting said input register to represent said binary number, a first signal actuatable means for clearing said input register, a double rank accumulator register including a slave rank register and a master rank register, first normally blocked gate means connected for the parallel transfer of signals representing digits from said accumulator master rank register to said accumulator slave rank register with a one digit left shift, second normally blocked gate means connected for the parallel transfer of signals representing digits between corresponding digit elements of said accumulator slave rank register and said accumulator master rank register, second and third signal actuatable means for clearing said slave rank and said master rank registers, a subtracter circuit directly coupled to said input register and said accumulator slave rank register, a third normally blocked gate circuit connected for the parallel transfer of the output signals of said subtracter to said accumulator master rank register, an output register, a fourth normally blocked gate circuit connected for the parallel transfer of signals representing digits from said output register to corresponding digit units of said input register, a double rank step counter comprising a slave rank, a master rank, a fifth normally blocked gate circuit connected for the parallel transfer of signals representing digits from said step counter master rank to corresponding digit units of said step counter slave rank, a sixth normally blocked gate circuit connected for the parallel transfer of signals representing digits from said step counter slave rank to said step counter master rank for the one digit right shift, a seventh normally blocked gate circuit connected for the parallel transfer of signals representing digits from said master rank step counter to said input register with a one digit right shift, fourth and fifth signal actuatable means of clearing said step counter slave rank and said step counter master rank respectively and eighth normally blocked gate circuit connected for the parallel transfer of signals representing "one" digits only from said step counter slave rank to corresponding digit units in said output register, means for inserting a signal representing a "one" in the second digit unit from the left in said step counter master rank, means associated with said accumulator slave rank and said subtracter for comparing the representation of the left most digit of the word transferred from said accumulator master rank to said accumulator slave rank with the representation of the left most digit in the output of said subtracter, means associated with said last-mentioned means for holding said eighth gate and said third gate inoperative if said last-mentioned digits are unlike and said second gate inoperative if said dgits are alike, and means for cyclically activating said gates and said clearing means in the following four interval sequence to obtain the square root: clearing means 1, 2 and 4 in said first interval; gates 5, 4, 7 and 2 in the first cycle and gates 5, 4, 7 and 1 in succeeding cycles, during the second interval; clearing means 3 and 5 during the third interval; gates 3, 6 and 8 if the compared digits are alike and 2 and 6 if the compared digits are unlike during the fourth interval.

References Cited in the file of this patent

UNITED STATES PATENTS

| | | |
|---|---|---|
| 2,615,127 | Edwards | Oct. 21, 1952 |
| 2,666,575 | Edwards | Jan. 19, 1954 |
| 2,767,908 | Thomas | Oct. 23, 1956 |

FOREIGN PATENTS

| | | |
|---|---|---|
| 997,473 | France | Sept. 12, 1951 |
| 410,129 | Great Britain | May 9, 1934 |

OTHER REFERENCES

Progress Report on the Argonne-Oak Ridge Digital Computer, by Argonne National Laboratory, March 5, 1951, pages 24–29, 36, 38–44.

Sixth Interim Progress Report on the Physical Realization of an Electronic Computing Instrument. Institute for Advanced Study. Princeton, New Jersey, September 1951, pp. 8 to 11, 14, and 15 relied on.

Everett: The Whirlwind I Computer. Electrical Engineering, August 1952, pages 681 to 686, page 682 relied on.

Chu: The Oak Ridge Automatic Computer. Proceedings of Association for Computing Machinery. September 1952. Pages 142–147.

Richards: Arithmetic Operations in Digital Computers, Van Nostrand Co., February 1955. Pages 292, 295.

Lenaerts Automatic Square Rooting. Electronic Engineering. July 1955. Pages 287–289. Vol. 27, No. 329.